(12) United States Patent
Imamura

(10) Patent No.: US 11,336,821 B2
(45) Date of Patent: *May 17, 2022

(54) CAMERA SYSTEM, CAMERA, INTERCHANGEABLE LENS, AND COMPATIBILITY DETERMINATION METHOD OF CAMERA SYSTEM

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 16/999,991

(22) Filed: Aug. 21, 2020

(65) Prior Publication Data

US 2020/0382698 A1 Dec. 3, 2020

Related U.S. Application Data

(63) Continuation of application No. 16/447,504, filed on Jun. 20, 2019, now Pat. No. 10,785,408, which is a
(Continued)

(30) Foreign Application Priority Data

Jan. 27, 2017 (JP) .............................. JP2017-013512

(51) Int. Cl.
*H04N 5/232* (2006.01)
*G03B 17/14* (2021.01)
(Continued)

(52) U.S. Cl.
CPC ......... *H04N 5/23227* (2018.08); *G03B 17/14* (2013.01); *G03B 17/56* (2013.01); *H04N 5/225* (2013.01)

(58) Field of Classification Search
CPC ............... H04N 5/23227; H04N 5/225; H04N 5/23209; G03B 17/14; G03B 17/56; G03B 17/565; G03B 2206/00
See application file for complete search history.

(56) References Cited

U.S. PATENT DOCUMENTS 4,896,181 A 1/1990 Saegusa
5,255,043 A 10/1993 Kawasaki
(Continued)

FOREIGN PATENT DOCUMENTS

CN 1470931 A 1/2004
CN 101266395 A 9/2008
(Continued)

OTHER PUBLICATIONS

Chinese Office Action and Search Report dated Sep. 30, 2020 for counterpart Application No. 201780084791.2 along with an English translation.
(Continued)

*Primary Examiner* — Jason A Flohre
(74) *Attorney, Agent, or Firm* — Birch, Stewart, Kolasch & Birch, LLP

(57) ABSTRACT

Provided are a camera system, a camera, an interchangeable lens, and a compatibility determination method of a camera system capable of simply and quickly determining compatibility between the camera and the interchangeable lens. An eleventh contact (CC11) provided in a camera (10) and an eleventh contact (LC11) provided in an interchangeable lens (100) are composed of contacts in which an open drain output is possible. In a case where the camera (10) supports a specific function, the eleventh contact (CC11) on a camera-side is set to a first polarity. In a case where the camera (10) does not support the specific function, the eleventh contact (CC11) on the camera side is set to a second polarity. In a case where the interchangeable lens (100) supports the
(Continued)

specific function, the eleventh contact (LC11) on an interchangeable lens-side is set to the first polarity. In a case where the interchangeable lens (100) does not support the specific function, the eleventh contact (LC11) on the interchangeable lens side is set to the second polarity. The eleventh contact (CC11) on the camera side and the eleventh contact (LC11) on the interchangeable lens side, which are mutually connected, are at the first polarity only in a case where both contacts are at the first polarity. Therefore, in a case where the polarities of the eleventh contact (CC11) on the camera side and the eleventh contact (LC11) on the interchangeable lens side are detected, it is possible to determine presence or absence of compatibility in both the camera (10) and the interchangeable lens (100).

22 Claims, 15 Drawing Sheets

Related U.S. Application Data continuation of application No. PCT/JP2017/047321, filed on Dec. 28, 2017.

(51) Int. Cl.
    *G03B 17/56*     (2021.01)
    *H04N 5/225*     (2006.01)

(56) References Cited

U.S. PATENT DOCUMENTS

| | | | |
|---|---|---|---|
| 7,522,828 | B2 | 4/2009 | Doi et al. |
| 10,785,408 | B2 * | 9/2020 | Imamura .............. G03B 17/565 |
| 2007/0147815 | A1 | 6/2007 | Tanaka |
| 2008/0226280 | A1 | 9/2008 | Numako et al. |
| 2012/0033955 | A1 | 2/2012 | Okada |
| 2013/0002897 | A1 | 1/2013 | Imafuji et al. |
| 2013/0028590 | A1 | 1/2013 | Hasuda et al. |
| 2013/0077952 | A1 | 3/2013 | Sugiyama et al. |
| 2014/0293122 | A1 | 10/2014 | Imamura |
| 2014/0300768 | A1 | 10/2014 | Imamura |
| 2015/0116592 | A1 | 4/2015 | Suzuki |
| 2015/0130993 | A1 | 5/2015 | Pan |
| 2016/0191781 | A1 | 6/2016 | Tohyama |
| 2016/0195794 | A1 | 7/2016 | Zhao et al. |
| 2016/0227084 | A1 | 8/2016 | Imamura et al. |

FOREIGN PATENT DOCUMENTS

| | | |
|---|---|---|
| CN | 102854705 A | 1/2013 |
| CN | 102890391 A | 1/2013 |
| CN | 102890393 A | 1/2013 |
| CN | 103501402 A | 1/2014 |
| CN | 103959161 A | 7/2014 |
| CN | 104040424 A | 9/2014 |
| CN | 104272181 A | 1/2015 |
| CN | 205142300 U | 4/2016 |
| JP | 10-161221 A | 6/1998 |
| JP | 2005-266524 A | 9/2005 |
| JP | 2010-204430 A | 9/2010 |
| JP | 2011-154111 A | 8/2011 |
| JP | 2012-154967 A | 8/2012 |
| JP | 2013-25234 A | 2/2013 |
| JP | 2013-175977 A | 9/2013 |
| JP | 2014-78892 A | 5/2014 |
| JP | 2015-184660 A | 10/2015 |

OTHER PUBLICATIONS

German Office Action for corresponding German Application No. 112017006938.6, dated May 19, 2020, with an English translation.
International Preliminary Report on Patentability and Written Opinion of the International Searching Authority (forms PCT/IB/373, PCT/ISA/237 and PCT/IB/326), dated Aug. 8, 2019, for corresponding International Application No. PCT/JP2017/047321, with a Written Opinion translation.
International Search Report (form PCT/ISA/210), dated Mar. 27, 2018, for corresponding International Appiication No. PCT/JP2017/047321, with an English translation.
U.S. Office Action for U.S. Appl. No. 16/447,504, dated May 13, 2020 (Notice of Allowance).

* cited by examiner

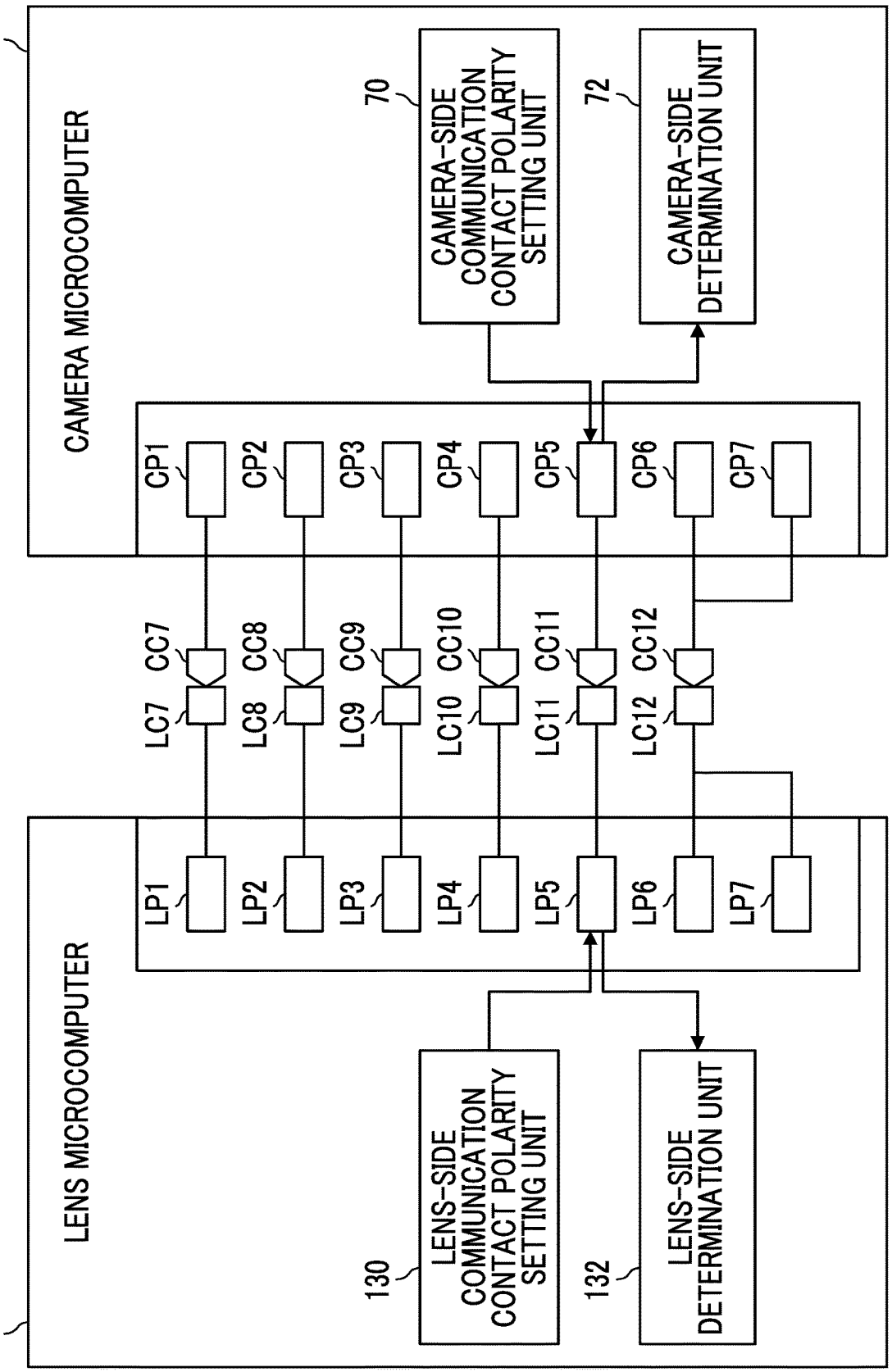

FIG. 11

| SUPPORT SITUATION TO SPECIFIC FUNCTION | | POLARITY OF CAMERA-SIDE COMMUNICATION CONTACT AND POLARITY OF LENS-SIDE COMMUNICATION CONTACT |
|---|---|---|
| CAMERA | INTERCHANGEABLE LENS | |
| NON-SUPPORT OUTPUT SETTING: LOW LEVEL | NON-SUPPORT OUTPUT SETTING: LOW LEVEL | DETECTED POLARITIES: LOW LEVEL NO COMPATIBILITY |
| NON-SUPPORT OUTPUT SETTING: LOW LEVEL | SUPPORT OUTPUT SETTING: HIGH LEVEL | DETECTED POLARITIES: LOW LEVEL NO COMPATIBILITY |
| SUPPORT OUTPUT SETTING: HIGH LEVEL | NON-SUPPORT OUTPUT SETTING: LOW LEVEL | DETECTED POLARITIES: LOW LEVEL NO COMPATIBILITY |
| SUPPORT OUTPUT SETTING: HIGH LEVEL | SUPPORT OUTPUT SETTING: HIGH LEVEL | DETECTED POLARITIES: HIGH LEVEL WITH COMPATIBILITY | ively
CAMERA SYSTEM, CAMERA, INTERCHANGEABLE LENS, AND COMPATIBILITY DETERMINATION METHOD OF CAMERA SYSTEM

CROSS-REFERENCE TO RELATED APPLICATIONS

The present application is a Continuation application of U.S. application Ser. No. 16/447,504 filed on Jun. 20, 2019 which is a Continuation of PCT International Application No. PCT/JP2017/047321 filed on Dec. 28, 2017 claiming priority under 35 U.S.C. § 119(a) to Japanese Patent Application No. 2017-013512 filed on Jan. 27, 2017. Each of the above applications is hereby expressly incorporated by reference, in their entirety, into the present application.

BACKGROUND OF THE INVENTION

1. Field of the Invention

The present invention relates to a lens-interchangeable camera system, a camera, an interchangeable lens, and a compatibility determination method of a lens-interchangeable camera system.

2. Description of the Related Art

In a lens-interchangeable camera system, a camera and an interchangeable lens are used in various combinations. As a result, a new type of camera and an old type of interchangeable lens may be used in combination.

There is a case where the new type of camera has a new function. In this case, there is a case where the function cannot be used with the old type of interchangeable lens. Similarly, there is a case where a function included in a new type of interchangeable lens cannot be used with an old type of camera.

Therefore, in the lens-interchangeable camera system, presence or absence of compatibility in both the camera and the interchangeable lens is determined at the time of activation of the system. For example, in a camera system disclosed in JP2010-204430A, predetermined information is transmitted and received between the camera and the interchangeable lens at the time of activation thereof to determine the presence or absence of the compatibility.

SUMMARY OF THE INVENTION

However, in the configuration of transmitting and receiving the predetermined information between the camera and the interchangeable lens to determine the compatibility as in the camera system disclosed in JP2010-204430A, communication between the camera and the interchangeable lens is required to be established or the information is required to be transmitted and received each other. Therefore, there is a disadvantage that it takes time to determine the compatibility. Further, as a result, there is a disadvantage that it takes time to activate the system.

The invention is made in consideration of such circumstances, and an object of the invention is to provide a camera system, a camera, an interchangeable lens, and a compatibility determination method of a camera system capable of simply and quickly determining compatibility between the camera and the interchangeable lens.

Means for solving the above problem is as follows.

(1) A camera system comprises a camera and an interchangeable lens to be attachably and detachably attached to the camera. The camera comprises a camera-side communication contact, a camera-side communication contact polarity setting unit that sets a polarity of the camera-side communication contact to a first polarity or a second polarity, in which the polarity of the camera-side communication contact is set to the first polarity in a case where the camera supports a specific function and the polarity of the camera-side communication contact is set to the second polarity in a case where the camera does not support the specific function, and a camera-side determination unit that detects the polarity of the camera-side communication contact to determine that the interchangeable lens supports the specific function in a case where the detected polarity is the first polarity. The interchangeable lens comprises a lens-side communication contact to be connected to the camera-side communication contact in a case where the interchangeable lens is attached to the camera, a lens-side communication contact polarity setting unit that sets a polarity of the lens-side communication contact to the first polarity or the second polarity, in which the polarity of the lens-side communication contact is set to the first polarity in a case where the interchangeable lens supports the specific function and the polarity of the lens-side communication contact is set to the second polarity in a case where the interchangeable lens does not support the specific function, and a lens-side determination unit that detects the polarity of the lens-side communication contact to determine that the camera supports the specific function in a case where the detected polarity is the first polarity. Both the camera-side communication contact and the lens-side communication contact are at the first polarity only in a case where both contacts are set to the first polarity in a mutually connected state and are at the second polarity in a case where at least one contact is set to the second polarity.

According to this aspect, the compatibility is determined based on the polarities of the camera-side communication contact and the lens-side communication contact. Here, an operation is performed in which both the camera-side communication contact and the lens-side communication contact are at the first polarity only in the case where both contacts are set to the first polarity in a mutually connected state and are at the second polarity in the case where at least one contact is set to the second polarity. It functions as a so-called logic product. Such a function can be realized by constituting the camera-side communication contact and the lens-side communication contact with contacts in which an open drain output is possible. The polarity of the camera-side communication contact is set to the first polarity in a case where the camera itself supports the specific function, and the polarity of the camera-side communication contact is set to the second polarity in a case where the camera does not support the specific function. The same is with the interchangeable lens, and the polarity of the lens-side communication contact is set to the first polarity in a case where the interchangeable lens itself supports the specific function, and the polarity of the lens-side communication contact is set to the second polarity in a case where the interchangeable lens does not support the specific function. In this case, the polarities of the camera-side communication contact and the lens-side communication contact are the first polarity only in the case where both the camera and the interchangeable lens support the specific function. In other cases, the polarities of the camera-side communication contact and the lens-side communication contact are the second polarity. Therefore, in a case where states of the polarities of the camera-side communication contact and the lens-side communication contact are determined, it is possible to determine the compatibility. That is, it is possible to determine that there is the compatibility in the case where the polarities of the camera-side communication contact and the lens-side communication contact are the first polarity and there is no compatibility in the case where the polarities of the camera-side communication contact and the lens-side communication contact are the second polarity. The case where there is no compatibility refers to the case where at least one of the camera or the interchangeable lens does not support the specific function. In this manner, according to this aspect, since the compatibility can be determined based on the polarities of the camera-side communication contact and the lens-side communication contact, it is possible to simply and quickly determine the compatibility between the camera and the interchangeable lens.

(2) In the camera system according to (1) described above, the camera-side communication contact and the lens-side communication contact are respectively one of a plurality of contacts to be used in a case where the camera and the interchangeable lens perform serial communication. The camera further comprises a camera-side communication setting unit that performs a communication setting of the plurality of contacts to be used in the case of performing the serial communication with the interchangeable lens after the determination by the camera-side determination unit. The interchangeable lens further comprises a lens-side communication setting unit that performs a communication setting of the plurality of contacts to be used in the case of performing the serial communication with the camera after the determination by the lens-side determination unit.

According to this aspect, one of the plurality of contacts to be used in the case where the camera performs the serial communication with the interchangeable lens is used as the camera-side communication contact and the lens-side communication contact to determine the compatibility. Accordingly, there is no need to separately comprise the camera-side communication contact and the lens-side communication contact and thus it is possible to simplify the configuration. The contacts used as the camera-side communication contact and the lens-side communication contact are used for the communication which is the original usage after the compatibility determination.

(3) The camera system according to (1) or (2) described above further comprises an accessory to be attachably and detachably attached between the camera and the interchangeable lens. In a case where the accessory is attached, the specific function is a function of communicating with the attached accessory.

According to this aspect, the accessory is included in the camera system. In the camera and the interchangeable lens, the presence or absence of the function of communicating with the attached accessory is determined as the presence or absence of the support for the specific function. Accordingly, it is possible to simply and quickly determine whether the camera and the interchangeable lens can communicate with the accessory in the case where the accessory is attached.

(4) In the camera system according to (3) described above, the camera further comprises a camera-side extension communication contact. The interchangeable lens further comprises a lens-side extension communication contact to be connected to the camera-side extension communication contact in a case of being attached to the camera. The accessory comprises an accessory-side first extension communication contact to be connected to the camera-side extension communication contact in a case of being attached to the camera and an accessory-side second extension communication contact to be connected to the lens-side extension communication contact in a case where the interchangeable lens is attached. In a case where the interchangeable lens is directly attached to the camera, the camera communicates with the interchangeable lens through the camera-side extension communication contact and the lens-side extension communication contact. In the case where the accessory is attached and both the camera and the interchangeable lens support the specific function, the camera communicates with the accessory through the camera-side extension communication contact and the accessory-side first extension communication contact and the interchangeable lens communicates with the accessory through the lens-side extension communication contact and the accessory-side second extension communication contact.

According to this aspect, the camera is provided with the camera-side extension communication contact, and the interchangeable lens is provided with the lens-side extension communication contact. In the case where the interchangeable lens is attached to the camera, the camera-side extension communication contact and the lens-side extension communication contact are mutually connected. In the case where the interchangeable lens is directly attached to the camera, the camera communicates with the interchangeable lens through the camera-side extension communication contact and the lens-side extension communication contact. Further, the accessory is provided with the accessory-side first extension communication contact to be connected to the camera-side extension communication contact in the case of being attached to the camera and the accessory-side second extension communication contact to be connected to the lens-side extension communication contact in the case where the interchangeable lens is attached. In the case where the accessory is attached and both the camera and the interchangeable lens support the specific function, that is, in the case where both the camera and the interchangeable lens support the function of communicating with the accessory, the camera communicates with the accessory through the camera-side extension communication contact and the accessory-side first extension communication contact. Further, the interchangeable lens communicates with the accessory through the lens-side extension communication contact and the accessory-side second extension communication contact.

(5) In the camera system according to (4), in the case where the accessory is attached and both the camera and the interchangeable lens support the specific function, the camera communicates with the accessory through the camera-side extension communication contact and the accessory-side first extension communication contact to acquire information on the accessory from the accessory.

According to this aspect, in the case where the accessory is attached and both the camera and the interchangeable lens support the specific function, that is, both the camera and the interchangeable lens support the function of communicating with the accessory, the camera communicates with the accessory through the camera-side extension communication contact and the accessory-side first extension communication contact to acquire the information on the accessory from the accessory. Accordingly, it is possible to acquire the information on the accessory on the camera side.

(6) In the camera system according to (5) described above, in the case where the accessory is attached and both the camera and the interchangeable lens support the specific function, the interchangeable lens communicates with the accessory through the lens-side extension communication contact and the accessory-side second extension communication contact to transmit information on the interchangeable lens to the accessory, and the accessory communicates with the camera through the accessory-side first extension communication contact and the camera-side extension communication contact to add the information on the accessory to the information on the interchangeable lens received from the interchangeable lens and to transmit the added information to the camera.

According to this aspect, in the case where the accessory is attached and both the camera and the interchangeable lens support the specific function, that is, both the camera and the interchangeable lens support the function of communicating with the accessory, the interchangeable lens communicates with the accessory through the lens-side extension communication contact and the accessory-side second extension communication contact to transmit the information on the interchangeable lens to the accessory. Further, the accessory communicates with the camera through the accessory-side first extension communication contact and the camera-side extension communication contact to add the information on the accessory to the information on the interchangeable lens received from the interchangeable lens and to transmit the added information to the camera. Accordingly, it is possible to acquire the pieces of information on the interchangeable lens and the accessory at the same time on the camera side.

(7) In the camera system according to (5) or (6) described above, the camera acquires the information on the accessory and then communicates with the interchangeable lens through the camera-side extension communication contact, the accessory-side first extension communication contact, the accessory-side second extension communication contact, and the lens-side extension communication contact to acquire information on a state of the interchangeable lens from the interchangeable lens.

According to this aspect, the camera acquires the information on the accessory and then communicates with the interchangeable lens through the camera-side extension communication contact, the accessory-side first extension communication contact, the accessory-side second extension communication contact, and the lens-side extension communication contact to acquire information on the state of the interchangeable lens from the interchangeable lens. Accordingly, it is possible to effectively use the extension communication contacts also after the acquisition of the information on the accessory.

(8) In the camera system according to any one of (4) to (7) described above, the interchangeable lens further comprises a lens-side extension communication contact polarity setting unit that sets a polarity of the lens-side extension communication contact to a first polarity. The accessory further comprises an accessory-side first extension communication contact polarity setting unit that sets a polarity of the accessory-side first extension communication contact to a second polarity. The camera further comprises an accessory detection unit that detects a polarity of the camera-side extension communication contact to detect the attachment of the accessory. The accessory detection unit determines that the accessory is attached in a case where the polarity of the camera-side extension communication contact is the first polarity and determines that the accessory is not attached in a case where the polarity of the camera-side extension communication contact is the second polarity to detect the attachment of the accessory.

According to this aspect, the lens-side extension communication contact polarity setting unit that sets the polarity of the lens-side extension communication contact to the first polarity and the accessory-side first extension communication contact polarity setting unit that sets the polarity of the accessory-side first extension communication contact to the second polarity are further provided. The camera detects the polarity of the camera-side extension communication contact to detect the attachment of the accessory. Specifically, it is determined that the accessory is attached in the case where the polarity of the camera-side extension communication contact is the first polarity and determined that the accessory is not attached in the case where the polarity of the camera-side extension communication contact is the second polarity to detect the attachment of the accessory. Accordingly, it is possible to simply and quickly detect the presence or absence of the attachment of the accessory.

(9) A camera to which an interchangeable lens is attachably and detachably attached comprises a camera-side communication contact to be connected to a lens-side communication contact provided in the interchangeable lens in a case where the interchangeable lens is attached, a camera-side communication contact polarity setting unit that sets a polarity of the camera-side communication contact to a first polarity or a second polarity, in which the polarity of the camera-side communication contact is set to the first polarity in a case where the camera supports a specific function and the polarity of the camera-side communication contact is set to the second polarity in a case where the camera does not support the specific function, and a camera-side determination unit that detects the polarity of the camera-side communication contact to determine that the interchangeable lens supports the specific function in a case where the detected polarity is the first polarity. A polarity of the lens-side communication contact is set to the first polarity in a case where the interchangeable lens supports the specific function and the polarity of the lens-side communication contact is set to the second polarity in a case where the interchangeable lens does not support the specific function. Both the camera-side communication contact and the lens-side communication contact are at the first polarity only in a case where both contacts are set to the first polarity in a mutually connected state and are at the second polarity in a case where at least one contact is set to the second polarity.

According to this aspect, since the compatibility can be determined based on the polarity of the camera-side communication contact, it is possible to simply and quickly determine the compatibility with the interchangeable lens.

(10) In the camera according to (9) described above, the camera-side communication contact is one of a plurality of contacts to be used in a case where the camera performs serial communication with the interchangeable lens. The camera further comprises a camera-side communication setting unit that performs a communication setting of the plurality of contacts to be used in the case of performing the serial communication with the interchangeable lens after the determination by the camera-side determination unit.

According to this aspect, one of the plurality of contacts to be used in the case where the camera performs the serial communication with the interchangeable lens is used as the camera-side communication contact to determine the compatibility. Accordingly, there is no need to separately comprise the camera-side communication contact and thus it is possible to simplify the configuration. The contact used as the camera-side communication contact is used for the communication which is the original usage after the compatibility determination.

(11) An interchangeable lens to be attachably and detachably attached to a camera comprises a lens-side communication contact to be connected to a camera-side communication contact provided in the camera in a case where the camera is attached, a lens-side communication contact polarity setting unit that sets a polarity of the lens-side communication contact to a first polarity or a second polarity, in which the polarity of the lens-side communication contact is set to the first polarity in a case where the interchangeable lens supports a specific function and the polarity of the lens-side communication contact is set to the second polarity in a case where the interchangeable lens does not support the specific function, and a lens-side determination unit that detects the polarity of the lens-side communication contact to determine that the camera supports the specific function in a case where the detected polarity is the first polarity. A polarity of the camera-side communication contact is set to the first polarity in a case where the camera supports the specific function and the polarity of the camera-side communication contact is set to the second polarity in a case where the camera does not support the specific function. Both the camera-side communication contact and the lens-side communication contact are at the first polarity only in a case where both contacts are set to the first polarity in a mutually connected state and are at the second polarity in a case where at least one contact is set to the second polarity.

According to this aspect, since the compatibility can be determined based on the polarity of the lens-side communication contact, it is possible to simply and quickly determine the compatibility with the camera.

(12) In the interchangeable lens according to (11) described above, the lens-side communication contact is one of a plurality of contacts to be used in a case where the interchangeable lens performs serial communication with the camera. The interchangeable lens further comprises a lens-side communication setting unit that performs a communication setting of the plurality of contacts to be used in the case of performing the serial communication with the camera after the determination by the lens-side determination unit.

According to this aspect, one of a plurality of contacts to be used in the case where the interchangeable lens performs the serial communication with the camera is used as the lens-side communication contact to determine the compatibility. Accordingly, there is no need to separately comprise the lens-side communication contact and thus it is possible to simplify the configuration. The contact used as the lens-side communication contact is used for the communication which is the original usage after the compatibility determination.

(13) A compatibility determination method of a camera system comprising a camera and an interchangeable lens to be attachably and detachably attached to the camera comprises a step of attaching the interchangeable lens to the camera, a step of setting a polarity of the camera-side communication contact provided in the camera to a first polarity or a second polarity, in which the polarity of the camera-side communication contact is set to the first polarity in a case where the camera supports a specific function and the polarity of the camera-side communication contact is set to the second polarity in a case where the camera does not support the specific function, a step of setting a polarity of the lens-side communication contact provided in the interchangeable lens to the first polarity or the second polarity, in which the polarity of the lens-side communication contact is set to the first polarity in a case where the interchangeable lens supports the specific function and the polarity of the lens-side communication contact is set to the second polarity in a case where the interchangeable lens does not support the specific function, a step of determining whether the interchangeable lens attached to the camera supports the specific function based on the polarity of the camera-side communication contact, in which it is determined that the interchangeable lens supports the specific function in a case where the polarity of the camera-side communication contact is the first polarity, and a step of determining whether the camera to which the interchangeable lens is attached supports the specific function based on the polarity of the lens-side communication contact, in which it is determined that the camera supports the specific function in a case where the polarity of the lens-side communication contact is the first polarity. Both the camera-side communication contact and the lens-side communication contact are at the first polarity only in a case where both contacts are set to the first polarity in a mutually connected state and are at the second polarity in a case where at least one contact is set to the second polarity.

According to this aspect, the polarity of the camera-side communication contact is set to the first polarity in the case where the camera supports the specific function, and the polarity of the camera-side communication contact is set to the second polarity in the case where the camera does not support the specific function. Further, the polarity of the lens-side communication contact is set to the first polarity in the case where the interchangeable lens supports the specific function, and the polarity of the lens-side communication contact is set to the second polarity in the case where the interchangeable lens does not support the specific function. Here, both the camera-side communication contact and the lens-side communication contact are at the first polarity only in the case where both contacts are set to the first polarity in a mutually connected state and are at the second polarity in the case where at least one contact is set to the second polarity. Therefore, in the case where states of the polarities of the camera-side communication contact and the lens-side communication contact are determined, it is possible to determine the compatibility. Specifically, it is determined that the interchangeable lens supports the specific function only in the case where the polarity of the camera-side communication contact is the first polarity on the camera side. Further, it is determined that the camera supports the specific function only in the case where the polarity of the lens-side communication contact is the first polarity on the interchangeable lens side. In this manner, according to this aspect, since the compatibility can be determined based on the polarities of the camera-side communication contact and the lens-side communication contact, it is possible to simply and quickly determine the compatibility between the camera and the interchangeable lens.

(14) In the compatibility determination method of a camera system according to (13) described above, the camera-side communication contact and the lens-side communication contact are one of a plurality of contacts to be used in a case where the camera performs serial communication with the interchangeable lens. The compatibility determination method further comprises a step of performing a communication setting of the plurality of contacts to be used in the case where the camera performs serial communication with the interchangeable lens after the step of determining whether the interchangeable lens attached to the camera supports the specific function and the step of determining whether the camera to which the interchangeable lens is attached supports the specific function.

According to this aspect, one of the plurality of contacts to be used in the case where the camera performs the serial communication with the interchangeable lens is used as the camera-side communication contact and the lens-side communication contact to determine the compatibility. Accordingly, there is no need to separately comprise the camera-side communication contact and the lens-side communication contact and thus it is possible to simplify the configuration. The contacts used as the camera-side communication contact and the lens-side communication contact are used for the communication which is the original usage after the compatibility determination.

(15) In the compatibility determination method of a camera system according to (13) or (14) described above, the camera system further comprises an accessory to be attachably and detachably attached between the camera and the interchangeable lens. In a case where the accessory is attached between the camera and the interchangeable lens, the specific function is a function of communicating with the attached accessory.

According to this aspect, the accessory is included in the camera system. In the camera and the interchangeable lens, the presence or absence of the function of communicating with the attached accessory is determined as the presence or absence of the support for the specific function. Accordingly, it is possible to simply and quickly determine whether the camera and the interchangeable lens can communicate with the accessory in the case where the accessory is attached.

(16) In the compatibility determination method of a camera system according to (15) described above, in the case where the accessory is attached and both the camera and the interchangeable lens support the specific function, further comprises a step of performing communication between the camera and the accessory through the camera-side extension communication contact provided in the camera and the accessory-side first extension communication contact provided in the accessory, and a step of performing communication between the interchangeable lens and the accessory through the lens-side extension communication contact provided in the interchangeable lens and the accessory-side second extension communication contact provided in the accessory.

According to this aspect, in the case where the accessory is attached and both the camera and the interchangeable lens support the specific function, that is, in the case where both the camera and the interchangeable lens support the function of communicating with the accessory, the camera communicates with the accessory through the camera-side extension communication contact and the accessory-side first extension communication contact. Further, the interchangeable lens communicates with the accessory through the lens-side extension communication contact and the accessory-side second extension communication contact.

(17) In the compatibility determination method of a camera system according to (16) described above, in the step of performing the communication between the interchangeable lens and the accessory, information on the interchangeable lens is transmitted to the accessory. In the step of performing the communication between the camera and the accessory, information on the accessory is added to the information on the interchangeable lens received from the interchangeable lens and the added information is transmitted to the camera.

According to this aspect, in the step of performing the communication between the interchangeable lens and the accessory, the information on the interchangeable lens is transmitted to the accessory. The accessory adds own information to the information on the interchangeable lens received from the interchangeable lens and transmits the added information to the camera. Accordingly, it is possible to acquire the pieces of information on the interchangeable lens and the accessory at the same time on the camera side.

(18) The compatibility determination method of a camera system according to (17) described above further comprises a step of performing communication between the camera and the interchangeable lens through the camera-side extension communication contact, the accessory-side first extension communication contact, the accessory-side second extension communication contact, and the lens-side extension communication contact to acquire information on a state of the interchangeable lens by the camera after the information on the accessory and the information on the interchangeable lens are acquired.

According to this aspect, after the information on the accessory and the information on the interchangeable lens are acquired, the camera communicates with the interchangeable lens through the camera-side extension communication contact, the accessory-side first extension communication contact, the accessory-side second extension communication contact, and the lens-side extension communication contact to acquire the information on the state of the interchangeable lens from the interchangeable lens. Accordingly, it is possible to effectively use the extension communication contacts also after the acquisition of the pieces of information on the accessory and the interchangeable lens.

According to the invention, it is possible to simply and quickly determine the compatibility between the camera and the interchangeable lens.

BRIEF DESCRIPTION OF THE DRAWINGS

FIG. 10 is a block diagram of a function related to compatibility determination provided in the camera and the interchangeable lens.

FIG. 11 is a table showing a relationship between output settings of a camera-side communication contact and a lens-side communication contact according to a support situation to a specific function and detected polarities.

DESCRIPTION OF THE PREFERRED EMBODIMENTS

Hereinafter, preferable embodiments for implementing the invention will be described with reference to accompanying drawings.

First Embodiment

[Configuration of Camera System]

A lens-interchangeable camera system is configured to comprise at least one camera and at least one interchangeable lens.

Figure 1:
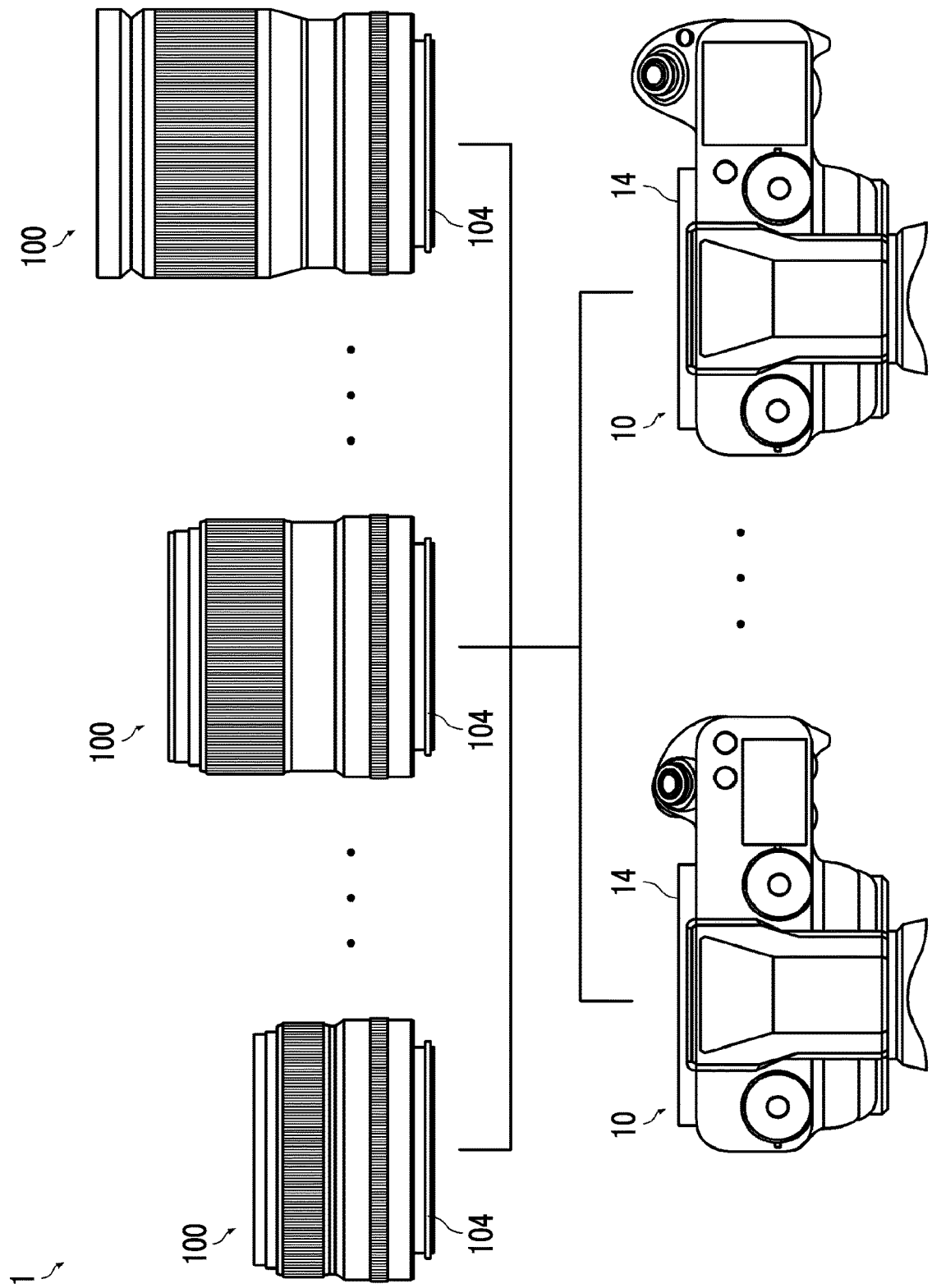
FIG. 1 is a system configuration diagram showing an example of a lens-interchangeable camera system.

FIG. 1 is a system configuration diagram showing an example of the lens-interchangeable camera system.

A camera system 1 shown in FIG. 1 is configured to comprise a plurality of cameras 10 and a plurality of interchangeable lenses 100.

The plurality of cameras 10 are respectively composed of a digital camera. Each camera 10 has a different specification or function. For example, each camera 10 is different in the number of effective pixels of an image sensor, settable imaging sensitivity, settable photometry method, settable exposure control method, shutter type, settable shutter speed, the number of continuous shots, settable focus mode, settable white balance, and the like. Each camera 10 comprises a common camera-side mount 14. Therefore, the same interchangeable lens 100 can be attached to each camera 10.

The plurality of interchangeable lenses 100 are respectively composed of lenses having different specifications. For example, there is a difference in a focal length, the presence or absence of a camera shake correction function, or the like. Each interchangeable lens 100 comprises a common lens-side mount 104. The lens-side mount 104 has a structure corresponding to a camera-side mount 14. Therefore, each interchangeable lens 100 can be attached to any camera 10.

«Camera-Side Mount»

Figure 2:
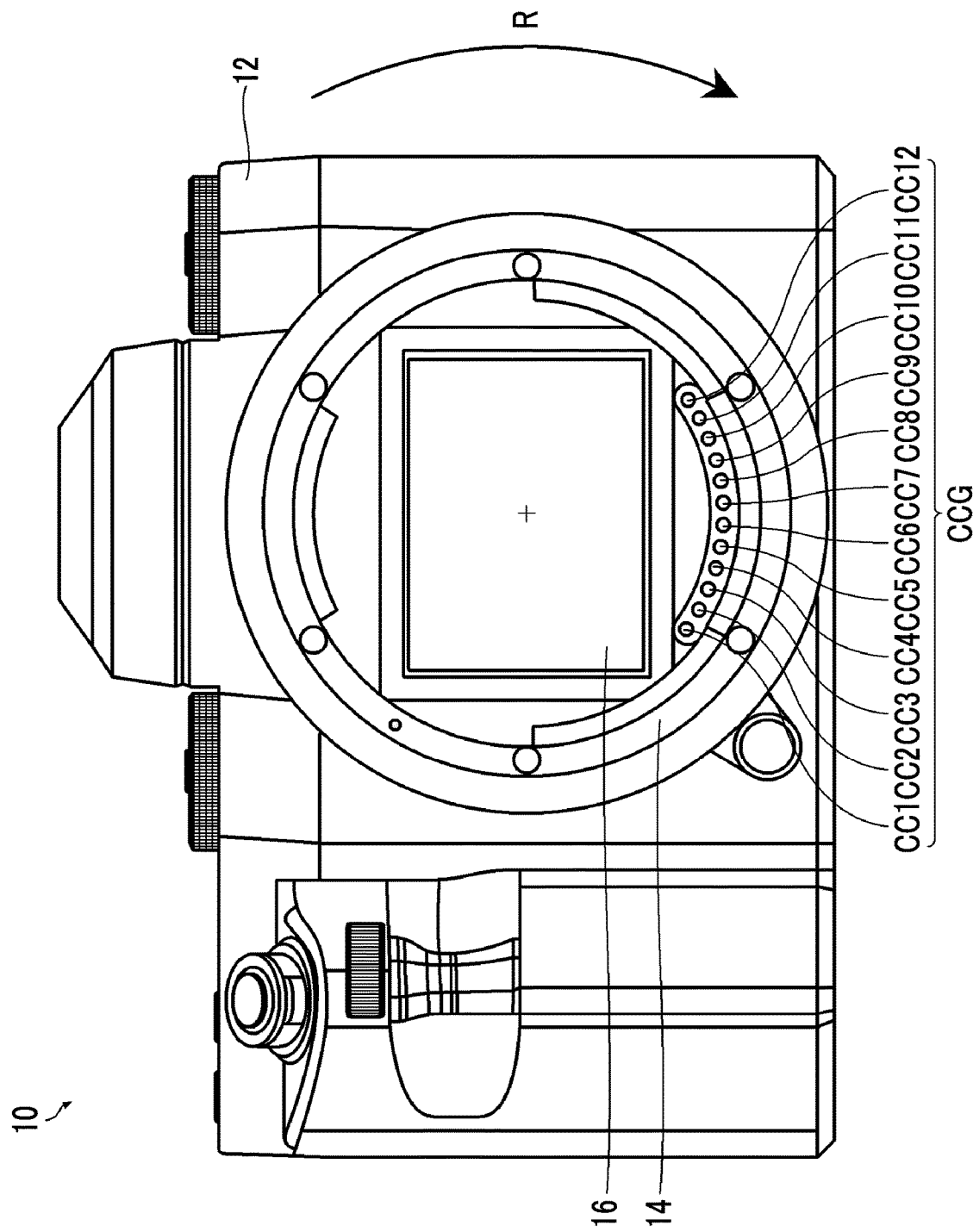
FIG. 2 is a front view of a camera-side mount.

FIG. 2 is a front view of the camera-side mount.

Each camera 10 comprises the camera-side mount 14 on a front portion of a camera body 12 of the camera. The camera-side mount 14 is an attachment part of the interchangeable lens 100. The camera-side mount 14 is composed of a known bayonet mount. In FIG. 2, a direction indicated by an arrow R (clockwise direction) is a rotation direction of the interchangeable lens 100 in a case where the interchangeable lens 100 is attached to the camera 10.

The camera-side mount 14 is provided with a camera-side contact group CCG composed of a plurality of contacts CC1 to CC12. The plurality of contacts CC1 to CC12 constituting the camera-side contact group CCG are disposed at a constant interval on the circumference of one circle with an imaging optical axis as the center. A function of each of the contacts CC1 to CC12 will be described below.

«Lens-Side Mount»

Figure 3:
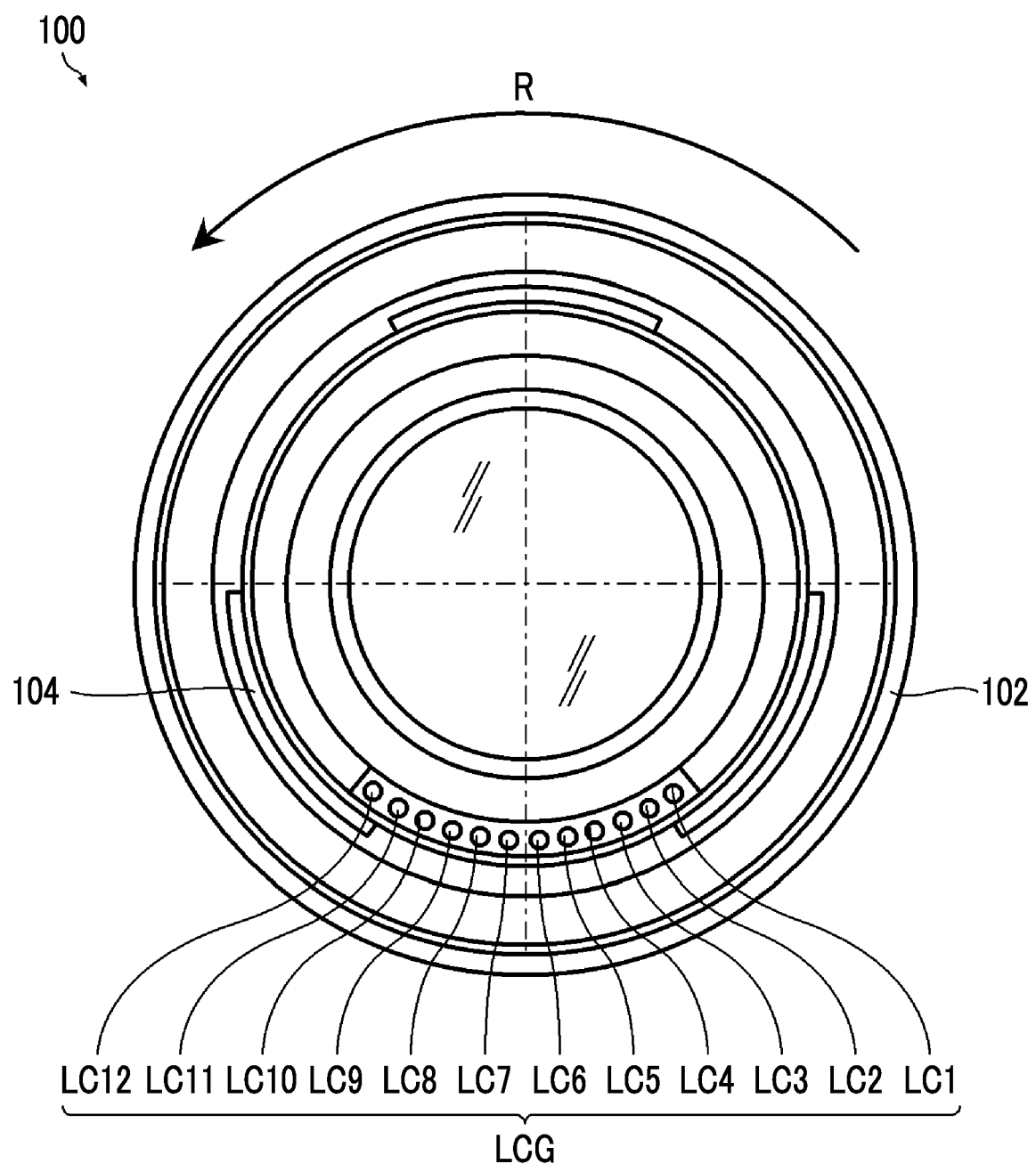
FIG. 3 is a front view of a lens-side mount.

FIG. 3 is a front view of the lens-side mount.

The interchangeable lens 100 comprises the lens-side mount 104 on the base end portion of a lens barrel 102 of the interchangeable lens 100. The lens-side mount 104 is composed of a bayonet mount corresponding to the camera-side mount 14 provided in the camera 10. In FIG. 3, a direction indicated by an arrow R (counterclockwise direction) is the rotation direction of the interchangeable lens 100 in the case where the interchangeable lens 100 is attached to the camera 10 (rotation direction of lens-side mount 104 in case where lens-side mount 104 is attached to camera-side mount 14).

The lens-side mount 104 is provided with a lens-side contact group LCG composed of a plurality of contacts LC1 to LC12. The lens-side contact group LCG is provided corresponding to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

In the case where the interchangeable lens 100 is attached to the camera 10, each of the contacts LC1 to LC12 of the lens-side contact group LCG is connected to the corresponding contacts CC1 to CC12 of the camera-side contact group CCG. That is, the first contact LC1 of the lens-side contact group LCG is connected to the first contact CC1 of the camera-side contact group CCG, the second contact LC2 of the lens-side contact group LCG is connected to the second contact CC2 of the camera-side contact group CCG, . . . , and the twelfth contact LC12 of the lens-side contact group LCG is connected to the twelfth contact CC12 of the camera-side contact group CCG.

A function of each of the contacts LC1 to LC12 constituting the lens-side contact group LCG will be described below.

«Electric Configuration of Camera»

Here, a main electric configuration of the camera 10 commonly provided in each camera 10 will be described.

Figure 4:
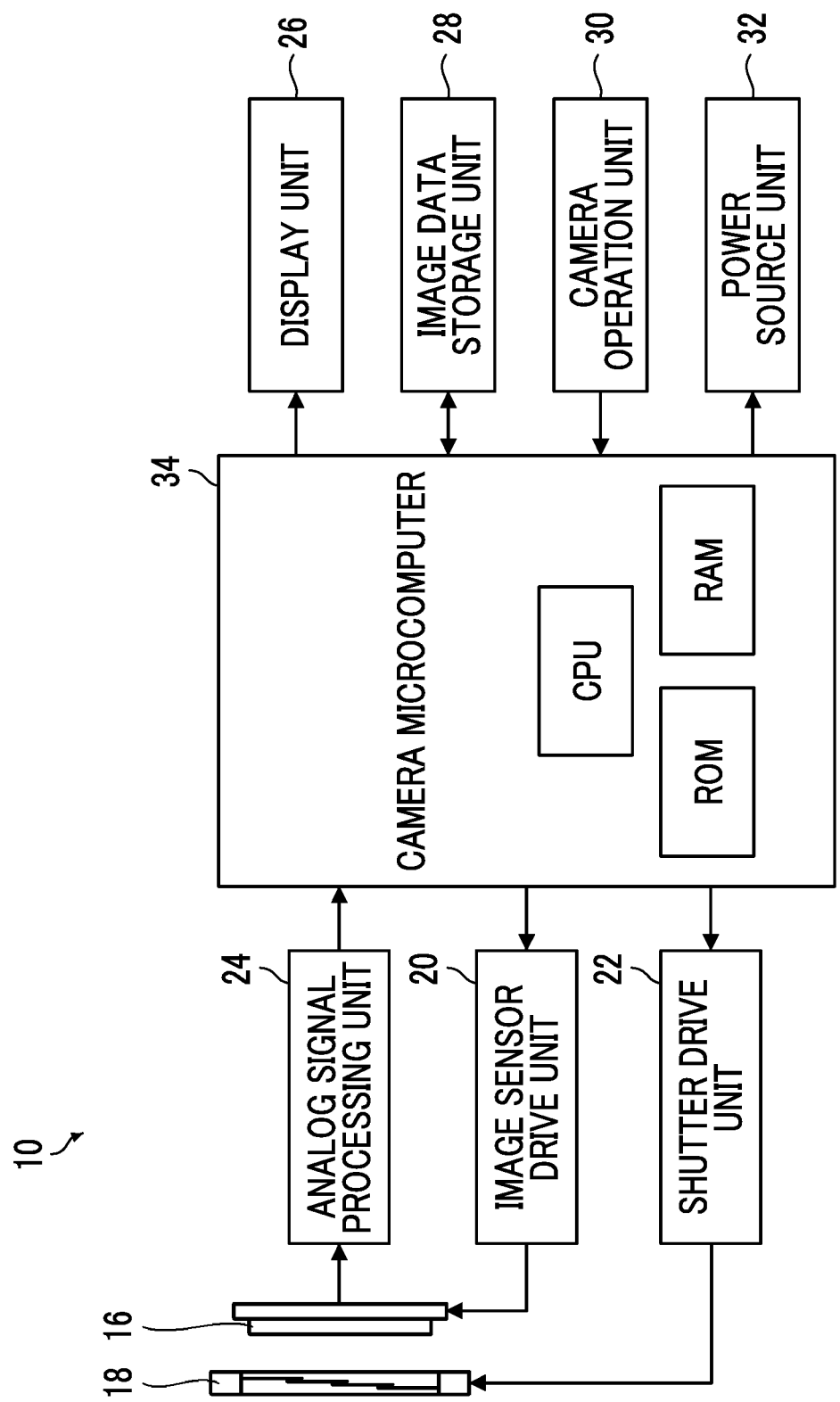
FIG. 4 is a block diagram showing a main electric configuration of a camera.

FIG. 4 is a block diagram showing the main electric configuration of the camera.

As shown in FIG. 4, the camera 10 comprises an image sensor 16, a shutter 18, an image sensor drive unit 20, a shutter drive unit 22, an analog signal processing unit 24, a display unit 26, an image data storage unit 28, a camera operation unit 30, a power source unit 32, and a camera microcomputer 34.

<Image Sensor>

The image sensor 16 converts an optical image of a subject formed through the interchangeable lens into an electric signal and outputs the converted signal. A known image sensor such as a charged coupled device (CCD) image sensor or a complementary metal oxide semiconductor (CMOS) image sensor is used as the image sensor 16.

<Image Sensor Drive Unit>

The image sensor drive unit 20 is composed of a drive circuit of the image sensor 16. The image sensor drive unit 20 drives the image sensor 16 in response to an instruction from the camera microcomputer 34.

<Shutter>

The shutter 18 is an optical path opening and closing apparatus that adjusts an exposure time to the image sensor 16. The shutter 18 is composed of, for example, a square focal plane shutter and is disposed right before the image sensor 16.

<Shutter Drive Unit>

The shutter drive unit 22 is composed of a drive circuit that drives a charging motor, an electromagnetic, or the like provided in the shutter 18. The shutter drive unit 22 drives the charging motor, the electromagnetic, or the like in response to the instruction from the camera microcomputer 34.

<Analog Signal Processing Unit>

The analog signal processing unit 24 takes in an analog image signal output from the image sensor 16, performs predetermined signal processing (for example, correlative double sampling processing, amplifying processing, or the like), and then converts the analog image signal into a digital image signal and outputs the digital image signal.

<Display Unit>

The display unit 26 is composed of a monitor and a drive circuit of the monitor. The monitor is composed of, for example, a liquid crystal display (LCD) and is provided on a back surface of the camera body.

<Image Data Storage Unit>

The image data storage unit 28 is a storage unit of captured image data. The image data storage unit 28 comprises a memory card and a socket for attaching the memory card. Reading and writing of the image data with respect to the memory card are controlled by the camera microcomputer 34.

<Camera Operation Unit>

The camera operation unit 30 is an operation unit of the camera 10 and is composed of various operation buttons and a circuit that detects operation of the operation buttons and outputs operation signals to the camera microcomputer 34. The operation buttons provided in the camera 10 include a power button, a release button, and the like.

<Power Supply Unit>

The power source unit 32 generates and supplies pieces of power required for operations of the camera 10 and the interchangeable lens 100 under the control of the camera microcomputer 34.

Figure 5:
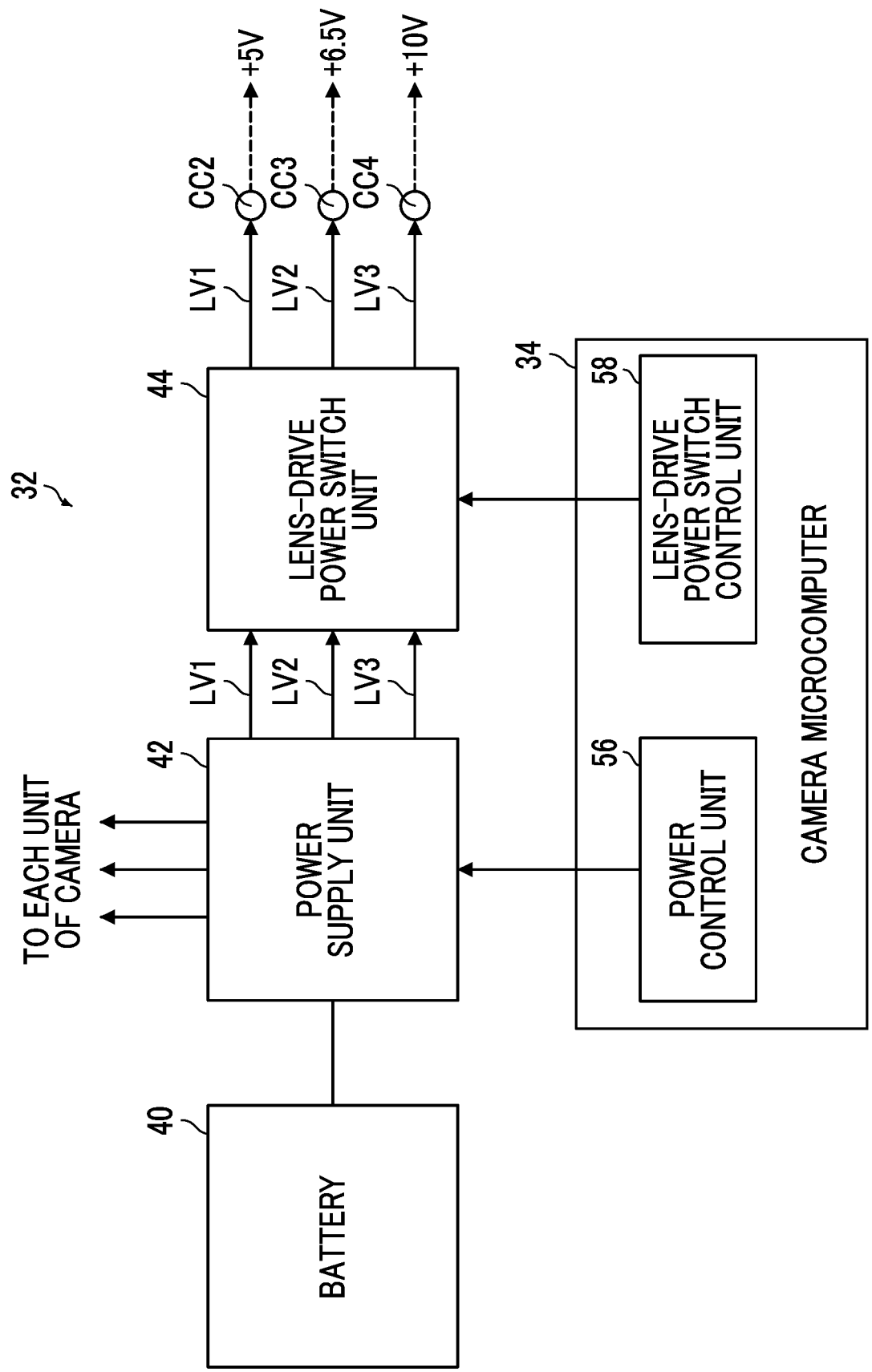
FIG. 5 is a block diagram showing an electric configuration of a power source unit.

FIG. 5 is a block diagram showing an electric configuration of the power source unit.

As shown in FIG. 5, the power source unit 32 comprises a battery 40, a power supply unit 42, and a lens-drive power switch unit 44.

The battery 40 is power of the camera 10 and the interchangeable lens 100. The battery 40 is attachably and detachably mounted on a battery chamber (not shown) provided in the camera body.

The power supply unit 42 generates various pieces of power required for the operations of the camera 10 and the interchangeable lens 100 from the battery 40 and supplies the pieces of power to each unit under the control of the camera microcomputer 34. The power supply unit 42 is composed of, for example, a DC-DC converter (DC: direct current).

In the camera 10 of the embodiment, a plurality of pieces of lens-drive power having different voltages are generated as the power supplied to the interchangeable lens 100. In the camera 10 of the embodiment, first lens-drive power LV1 having the voltage of +5 V, second lens-drive power LV2 having the voltage of +6.5 V, and third lens-drive power LV3 having the voltage of +10 V are generated.

As described below, the first lens-drive power LV1 having the lowest voltage is supplied to the second contact CC2 of the camera-side contact group CCG. The second lens-drive power LV2 is supplied to the third contact CC3 of the camera-side contact group CCG. The third lens-drive power LV3 having the highest voltage is supplied to the fourth contact CC4 of the camera-side contact group CCG.

The lens-drive power switch unit 44 individually turns on and off the supplying of the plurality of pieces of lens-drive power LV1, LV2, and LV3 to be supplied from the power supply unit 42 in response to the instruction from the camera microcomputer 34. Accordingly, it is possible to individually turn on and off the supplying of the pieces of lens-drive power LV1, LV2, and LV3 to be supplied from the power supply unit 42 to the plurality of contacts CC2, CC3, and CC4 of the camera-side contact group CCG.

<Camera Microcomputer>

The camera microcomputer 34 is a control unit of the camera 10 that integrally controls the operation of the camera 10. The camera microcomputer 34 comprises a central processing unit (CPU), a read only memory (ROM), and a random access memory (RAM/memory capable of writing and reading data), and executes a prescribed program to provide various functions. The ROM stores various pieces of data and the like required for the control in addition to various programs executed by the CPU.

Figure 6:
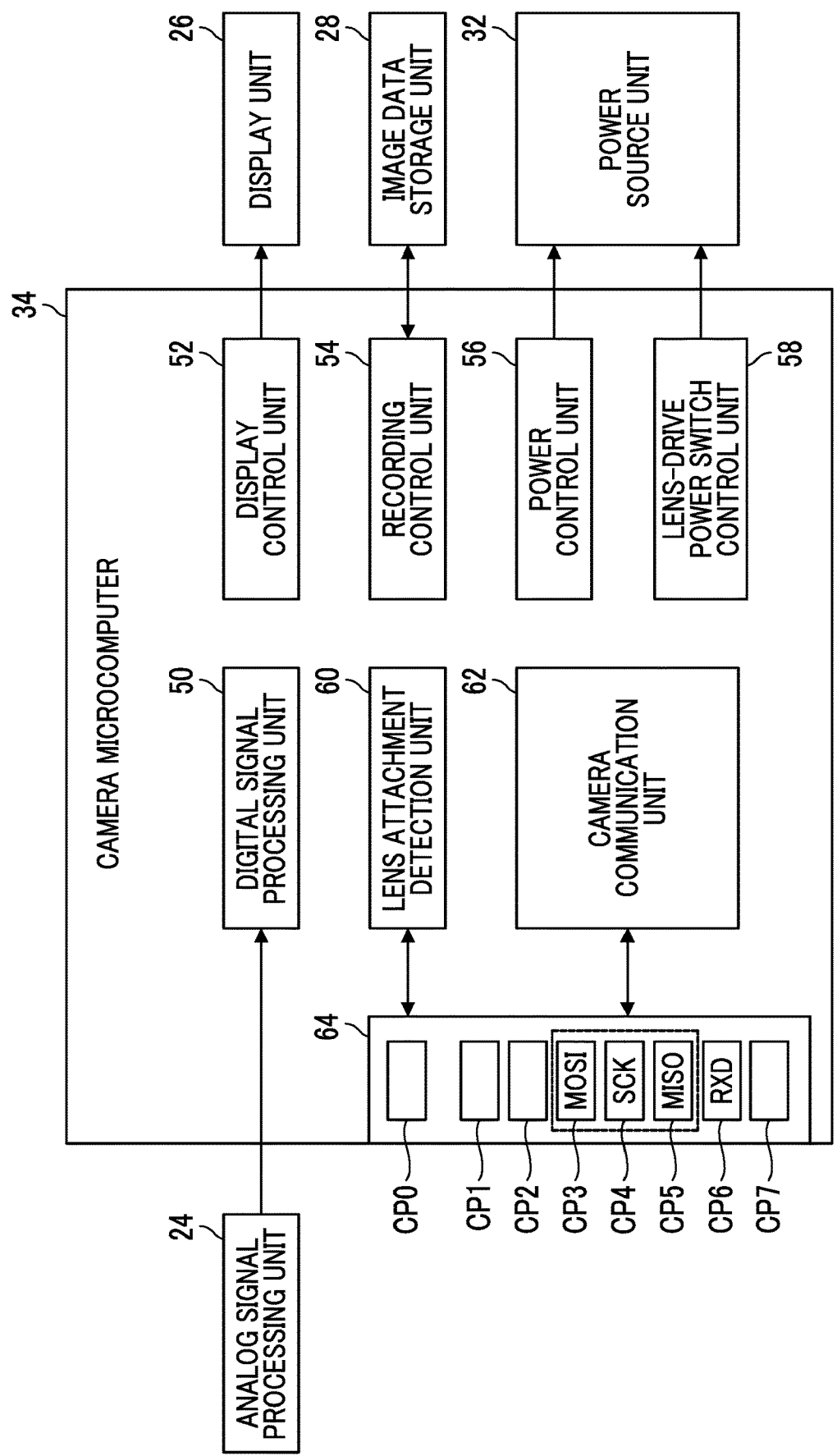
FIG. 6 is a block diagram showing an example of a function realized by a camera microcomputer.

FIG. 6 is a block diagram showing an example of a function realized by the camera microcomputer.

As shown in FIG. 6, the camera microcomputer 34 executes the prescribed program to function as a digital signal processing unit 50, a display control unit 52, a recording control unit 54, a power control unit 56, a lens-drive power switch control unit 58, a lens attachment detection unit 60, a camera communication unit 62, and the like.

The digital signal processing unit 50 takes in the digital image signal output from the analog signal processing unit 24 and performs predetermined signal processing to generate the image data.

The display control unit 52 displays predetermined information on the monitor provided in the display unit 26. For example, in a case where a playback mode is set, an image read from the memory card is displayed on the monitor. Further, in a case where an imaging mode is set, an image captured by the image sensor 16 is displayed in real time. Furthermore, in a case where various settings are performed, a setting screen is displayed on the monitor.

The recording control unit 54 performs the reading and writing of the image data with respect to the memory card attached to the socket of the image data storage unit 28.

The power control unit 56 controls the power supply unit 42 to control the supplying of the power to each unit.

The lens-drive power switch control unit 58 controls the lens-drive power switch unit 44 to control the supplying of the lens-drive power. Specifically, the lens-drive power switch control unit 58 individually turns on and off the supplying of the pieces of lens-drive power LV1, LV2, and LV3 to be supplied from the power supply unit 42 to the plurality of power contacts (second contact CC2, third contact CC3, and fourth contact CC4) of the camera-side contact group CCG to control the supplying of the lens-drive power. Accordingly, it is possible to selectively supply the lens-drive power.

The lens attachment detection unit 60 detects the attachment of the interchangeable lens 100. The lens attachment detection unit 60 detects a polarity of a lens detection port CP0 provided in a camera microcomputer input and output port 64 to determine the presence or absence of the attachment of the interchangeable lens 100.

The camera communication unit 62 communicates with the interchangeable lens 100 attached to the camera 10. The communication is performed through the camera microcomputer input and output port 64. The camera microcomputer input and output port 64 is provided with a plurality of communication ports CP1 to CP7 for communicating with the interchangeable lens 100.

Here, the first communication port CP1 is a communication port for notifying the camera 10 of a state from the interchangeable lens 100. In particular, the first communication port CP1 is used as a port to give a notification that a predetermined function of the interchangeable lens 100 is in operation in the camera system 1 of the embodiment. For example, the first communication port CP1 is used as a port to give a notification that a stop motor is in operation.

The second communication port CP2 is a communication port for transmitting a vertical synchronizing (V SYNC) signal from the camera 10 to the interchangeable lens 100.

The third communication port CP3, the fourth communication port CP4, and the fifth communication port CP5 are communication ports for performing synchronous serial communication by three lines (hereinafter referred to as three-line serial communication) with the interchangeable lens 100. Specifically, the third communication port CP3, the fourth communication port CP4, and the fifth communication port CP5 are the communication ports constituting a serial peripheral interface (SPI) which is a synchronous serial communication interface.

The third communication port CP3 is a communication port (master out slave in (MOSI) port) for transmitting a signal from the camera 10 as an SPI master to the interchangeable lens 100 as an SPI slave.

Further, the fourth communication port CP4 is a communication port (serial clock (SCK) port) for transmitting a clock signal for synchronization from the camera 10 as the SPI master to the interchangeable lens 100 as the SPI slave.

Further, the fifth communication port CP5 is a communication port (master in slave out (MISO) port) for transmitting a signal from the interchangeable lens 100 as an SPI slave to the camera 10 as an SPI master. An open drain output is possible in this fifth communication port CP5. This point will be described below.

The sixth communication port CP6 is also a communication port for performing the serial communication with the interchangeable lens 100 and is a communication port for performing unidirectional serial communication. More specifically, the sixth communication port CP6 is a communication port for performing start-stop synchronous serial communication by a single line (hereinafter referred as to single-line serial communication) and is a communication port that constitutes a universal asynchronous receiver transmitter (UART). In particular, in the camera system 1 of the embodiment, the sixth communication port CP6 functions as a received exchange data (RXD/data reception) port and is used as a communication port for receiving a signal transmitted from the interchangeable lens 100.

The seventh communication port CP7 is a communication port for notifying the camera 10 of the state from the interchangeable lens 100.

In a case where the camera communication unit 62 performs the three-line serial communication with the interchangeable lens 100 using the third communication port CP3, the fourth communication port CP4, and the fifth communication port CP5, the camera communication unit 62 performs a setting required for establishing the communication. That is, the camera communication unit 62 functions as a camera-side communication setting unit.

Further, the communication with the interchangeable lens 100 and an electric connection with the interchangeable lens 100 through the mount will be described below in detail.

The basic configuration as the digital camera is described above, and each camera may further comprise an individual function.

«Electric Configuration of Interchangeable Lens»

Here, a main electric configuration commonly provided in each interchangeable lens 100 will be described.

Figure 7:
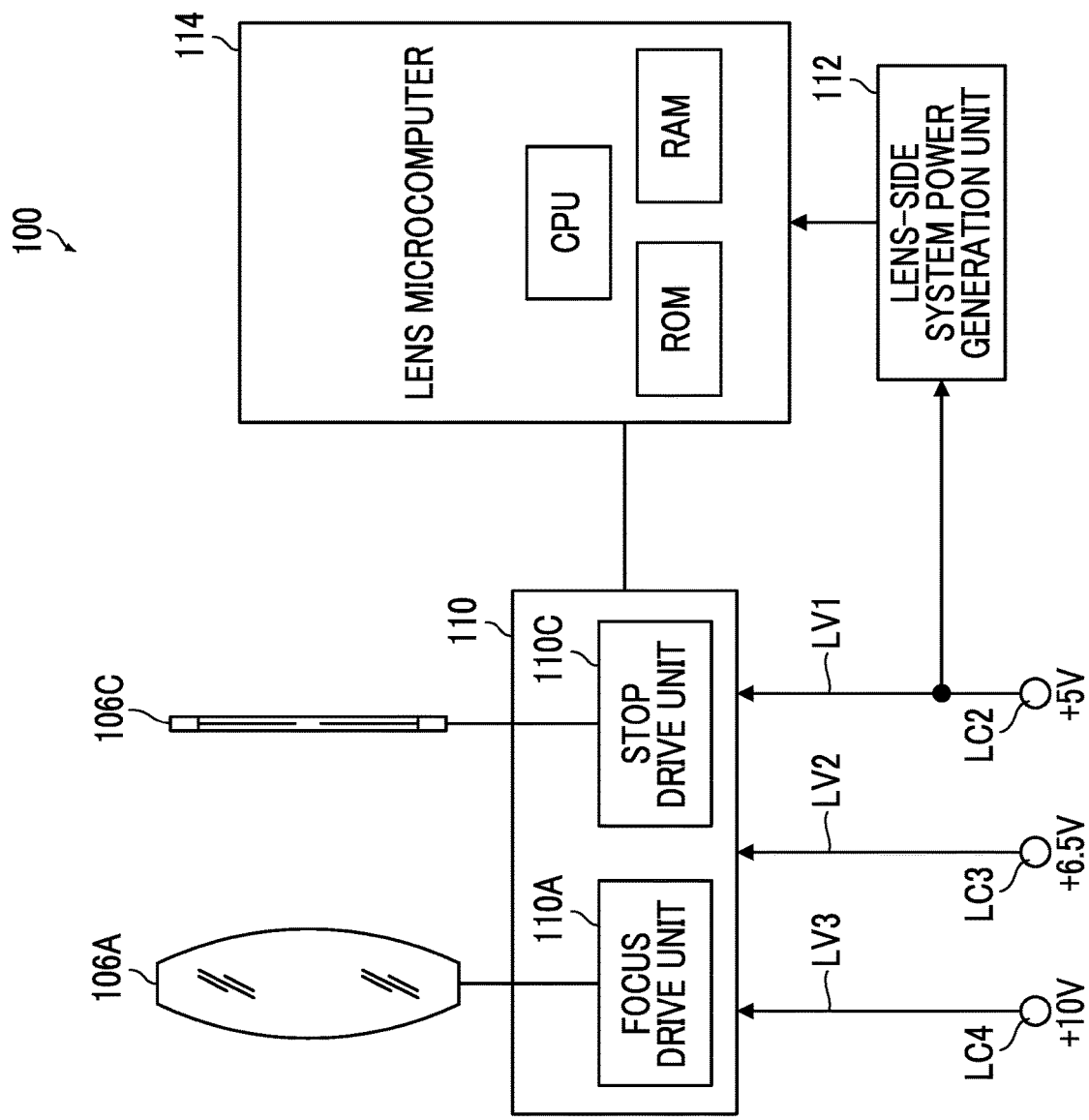
FIG. 7 is a block diagram showing a main electric configuration of an interchangeable lens.

FIG. 7 is a block diagram showing the main electric configuration of the interchangeable lens. FIG. 7 shows the electric configuration of the interchangeable lens comprising an auto focus (AF) mechanism and the stop.

As shown in FIG. 7, the interchangeable lens 100 comprises a lens drive unit 110, a lens-side system power generation unit 112, and a lens microcomputer 114.

<Lens Drive Unit>

The lens drive unit 110 drives optical members constituting the interchangeable lens 100 in response to an instruction from the lens microcomputer 114.

As described above, the interchangeable lens 100 shown in FIG. 7 comprises the AF function and the stop. Therefore, the interchangeable lens 100 of this example is provided with a focus drive unit 110A and a stop drive unit 110C as the lens drive unit 110.

The focus drive unit 110A drives a focus lens 106A which is the optical member for focusing. The focus drive unit 110A is configured to comprise a focus motor (for example, ultrasonic motor) for driving the focus lens and a drive circuit of the focus motor. The focus drive unit 110A drives the focus motor in response to the instruction from the lens microcomputer 114 to operate the focus lens 106A.

The stop drive unit 110C drives the stop which is the optical member for light amount adjustment. The stop drive unit 110C is configured to comprise the stop motor for driving a stop 106C and a drive circuit of the stop motor. The stop drive unit 110C drives the stop motor in response to the instruction from the lens microcomputer 114 to operate the stop 106C.

As described below, the plurality of pieces of lens-drive power LV1 (+5 V), LV2 (+6.5 V), and LV3 (+10 V) having different voltages are supplied from a plurality of the contacts LC2 to LC4 (power contacts) of the lens-side contact group LCG to the lens drive unit 110. Any of the plurality of supplied pieces of lens-drive power LV1, LV2, and LV3 is supplied to each drive unit of the lens drive unit 110. For example, the third lens-drive power LV3 having the highest voltage is supplied to the focus drive unit 110A, and the first lens-drive power LV1 having the lowest voltage is supplied to the stop drive unit 110C.

<Lens-Side System Power Generation Unit>

The lens-side system power generation unit 112 generates system power for operating the lens microcomputer 114. The lens-side system power generation unit 112 generates the system power by using the lens-drive power to be supplied from the camera 10.

Here, the lens microcomputer 114 is configured to operate at a voltage lower than each drive unit constituting the lens drive unit 110. For example, the lens microcomputer 114 is configured to operate at +3.3 V.

The lens-side system power generation unit 112 generates the system power (+3.3 V) by using the lens-drive power LV1 (+5 V) having the lowest voltage among the plurality of pieces of lens-drive power LV1 to LV3 to be supplied from the camera 10, and supplies the generated system power to the lens microcomputer 114. In this case, the lens-side system power generation unit 112 generates the system power by a voltage drop caused by a resistor. Accordingly, it is possible to prevent the occurrence of noise accompanied by the generation of the system power.

An LDO regulator may be exemplified as an apparatus that generates the system power by the voltage drop caused by the resistor. The LDO regulator is one of a linear regulator and converts an input voltage into a desired output voltage by consuming input power using on-resistance of a switching element such as a power MOSFET or power transistor.

<Lens Microcomputer>

The lens microcomputer 114 is a control unit of the interchangeable lens 100 that integrally controls the operation of the interchangeable lens 100. The lens microcomputer 114 controls the operation of the interchangeable lens 100 based on the instruction from the camera microcomputer 34.

The lens microcomputer 114 comprises a CPU, a ROM, and a RAM, and executes a prescribed program to provide various functions. The ROM stores various pieces of data and the like required for the control in addition to various programs executed by the CPU.

Figure 8:
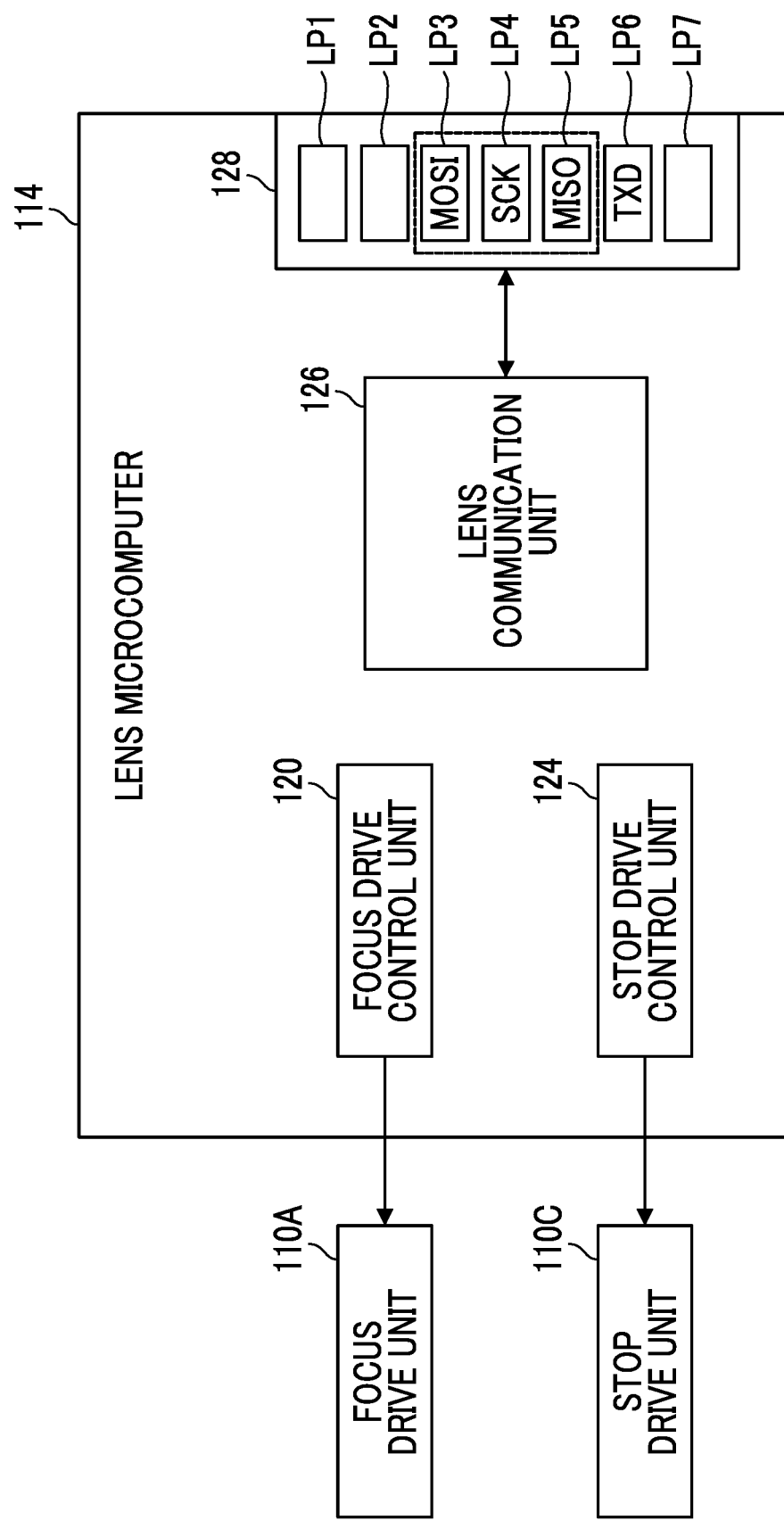
FIG. 8 is a block diagram showing an example of a function realized by a lens microcomputer.

FIG. 8 is a block diagram showing an example of a function realized by the lens microcomputer.

As shown in FIG. 8, the lens microcomputer 114 executes the prescribed program to function as a focus drive control unit 120, a stop drive control unit 124, a lens communication unit 126, and the like.

The focus drive control unit 120 controls the focus drive unit 110A in response to the instruction from the camera microcomputer 34 to operate the focus lens 106A.

The stop drive control unit 124 controls the stop drive unit 110C in response to the instruction from the camera microcomputer 34 to operate the stop 106C.

The lens communication unit 126 communicates with the camera 10 to which the interchangeable lens 100 is attached. The communication is performed through a lens microcomputer input and output port 128. The lens microcomputer input and output port 128 is provided with a plurality of communication ports LP1 to LP7 for communicating with the interchangeable lens 100. The communication ports LP1 to LP7 are provided corresponding to the plurality of communication ports CP1 to CP7 provided in the camera microcomputer input and output port 64 of the camera microcomputer 34.

Therefore, the first communication port LP1 is used for giving a notification of the state of the camera 10, and the second communication port LP2 is used for receiving the VSYNC signal transmitted from the camera 10.

Further, the third communication port LP3, the fourth communication port LP4, and the fifth communication port LP5 are used for the three-line serial communication with the camera 10. The open drain output is possible in the fifth communication port LP5. This point will be described below.

Further, the sixth communication port LP6 is a communication port for performing the single-line serial communication with the camera 10 and is a communication port that constitutes the UART. In particular, in the camera system 1 of the embodiment, the sixth communication port LP6 is used as a transmit exchange data (TXD/data transmission) port. That is, the sixth communication port LP6 is used as a communication port for transmitting the signal to the camera 10.

Further, the seventh communication port LP7 is used for notifying the camera 10 of the state.

The communication with the camera 10 and the electric connection to the camera 10 through the mount will be described below in detail.

In a case where the lens communication unit 126 performs the three-line serial communication with the camera 10 using the third communication port LP3, the fourth communication port LP4, and the fifth communication port LP5, the lens communication unit 126 performs a setting required for establishing the communication. That is, the lens communication unit 126 functions as a lens-side communication setting unit.

The interchangeable lens 100 can comprise, for example, a camera shake correction mechanism and the like in addition to the basic configuration described above.

«Electric Connection between Camera and Interchangeable Lens»

Figure 9:
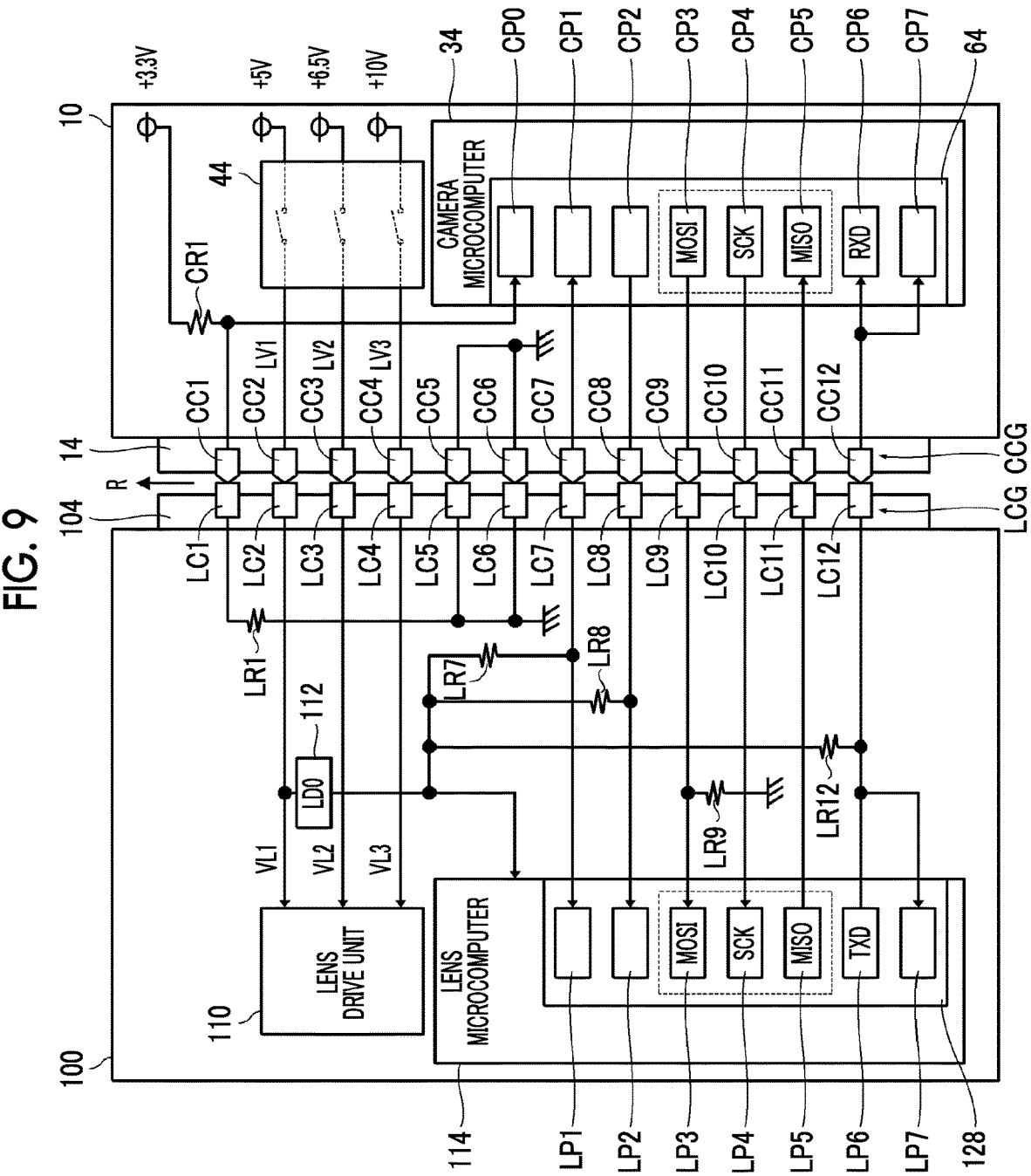
FIG. 9 is a diagram showing an electric connection between the camera and the interchangeable lens.

FIG. 9 is a diagram showing an electric connection between the camera and the interchangeable lens.

As shown in FIG. 9, the camera 10 and the interchangeable lens 100 are electrically connected through the camera-side contact group CCG provided in the camera-side mount 14 and the lens-side contact group LCG provided in the lens-side mount 104.

In FIG. 9, a direction indicated by an arrow R is the rotation direction of the interchangeable lens 100 in the case where the interchangeable lens 100 is attached to the camera 10. Therefore, in the case where the interchangeable lens 100 is attached to the camera 10, the lens-side contact group LCG moves in the direction indicated by the arrow R in FIG. 9 with respect to the camera-side contact group CCG.

<Camera-Side Contact Group>

The camera-side contact group CCG is composed of the twelve contacts CC1 to CC12. Each of the contacts CC1 to CC12 has the same shape and is disposed at a constant interval on the same circumference.

(A) First Contact CC1

The first contact CC1 is a lens detection contact for detecting the attachment of the interchangeable lens 100. The first contact CC1 is connected to the lens detection port CP0 of the camera microcomputer 34. Further, the first contact CC1 is connected to the power supply unit 42 (refer to FIG. 5) through a pull-up resistor CR1 and is pulled up to predetermined potential (for example, +3.3 V).

(B) Second Contact CC2 to Fourth Contact CC4

The second contact CC2, the third contact CC3, and the fourth contact CC4 are a plurality of power contacts for supplying the plurality of pieces of lens-drive power LV1, LV2, and LV3 to the interchangeable lens 100.

Here, the second contact CC2 is a first power contact for supplying the first lens-drive power LV1 to the interchangeable lens. The second contact CC2 is connected to the power supply unit 42 through the lens-drive power switch unit 44 (refer to FIG. 5). The first lens-drive power LV1 having the lowest voltage from the power supply unit 42 is supplied to the second contact CC2. The lens-drive power switch unit 44 turns on and off the supplying of the first lens-drive power LV1 to the second contact CC2 in response to the instruction from the camera microcomputer 34.

Further, the third contact CC3 is a second power contact for supplying the second lens-drive power LV2 to the interchangeable lens. The third contact CC3 is connected to the power supply unit 42 through the lens-drive power switch unit 44 (refer to FIG. 5). The second lens-drive power LV2 is supplied from the power supply unit 42 to the third contact CC3. The lens-drive power switch unit 44 turns on and off the supplying of the second lens-drive power LV2 to the third contact CC3 in response to the instruction from the camera microcomputer 34.

Further, the fourth contact CC4 is a third power contact for supplying the third lens-drive power LV3 to the interchangeable lens. The fourth contact CC4 is connected to the power supply unit 42 through the lens-drive power switch unit 44 (refer to FIG. 5). The third lens-drive power LV3 having the highest voltage from the power supply unit 42 is supplied to the fourth contact CC4. The lens-drive power switch unit 44 turns on and off the supplying of the third lens-drive power LV3 to the fourth contact CC4 in response to the instruction from the camera microcomputer 34.

(C) Fifth Contact CC5 and Sixth Contact CC6

The fifth contact CC5 and the sixth contact CC6 are respectively ground contacts and are both grounded.

(D) Seventh Contact CC7 to Twelfth Contact CC12

The seventh contact CC7 to the twelfth contact CC12 are communication contacts for communicating with the interchangeable lens 100.

Here, the seventh contact CC7 is the communication contact for giving a notification of the state from the interchangeable lens 100 to the camera 10. The seventh contact CC7 is connected to the first communication port CP1 of the camera microcomputer 34. As described above, the first communication port CP1 of the camera microcomputer 34 is used for giving a notification that the predetermined function of the interchangeable lens 100 is in operation.

The eighth contact CC8 is a communication contact for transmitting the VSYNC signal from the camera 10 to the interchangeable lens 100. The eighth contact CC8 is connected to the second communication port CP2 of the camera microcomputer 34.

The ninth contact CC9, the tenth contact CC10, and the eleventh contact CC11 are communication contacts for respectively performing the three-line serial communication with the interchangeable lens 100. The ninth contact CC9 is connected to the third communication port CP3 (MOSI port) of the camera microcomputer 34. The tenth contact CC10 is connected to the fourth communication port CP4 (SCK port) of the camera microcomputer 34. The eleventh contact CC11 is connected to the fifth communication port CP5 (MISO port) of the camera microcomputer 34.

Here, as described above, the fifth communication port CP5 of the camera microcomputer 34 is composed of a port in which the open drain output is possible. Therefore, the eleventh contact CC11 connected to the fifth communication port CP5 (MISO port) of the camera microcomputer 34 is composed of a contact in which the open drain output is possible. The eleventh contact CC11 is an example of a camera-side communication contact, and it is determined whether the interchangeable lens 100 attached to the camera 10 supports the specific function based on the polarity of this eleventh contact CC11. This point will be described below in detail.

Further, the ninth contact CC9, the tenth contact CC10, and the eleventh contact CC11 are examples of the plurality of contacts to be used in a case where the camera 10 and the interchangeable lens 100 perform the serial communication.

The twelfth contact CC12 is an example of a camera-side extension communication contact. The twelfth contact CC12 is a contact for performing the single-line serial communication with the interchangeable lens 100 and is a contact for notifying the camera 10 of the state from the interchangeable lens 100. The twelfth contact CC12 is connected to the sixth communication port CP6 and the seventh communication port CP7 of the camera microcomputer 34.

The plurality of contacts CC1 to CC12 constituting the camera-side contact group CCG are disposed in an order of the first contact CC1, the second contact CC2, . . . , the eleventh contact CC11, and the twelfth contact CC12 with respect to the rotation direction R of the interchangeable lens 100 in the case where the interchangeable lens 100 is attached to the camera 10. Therefore, the camera-side contact group CCG is disposed in the order of the lens detection contact (first contact CC1), the plurality of power contacts (second contact CC2 to fourth contact CC4), the plurality of ground contacts (fifth contact CC5 and sixth contact CC6), and the plurality of communication contacts (seventh contact CC7 to twelfth contact CC12).

<Lens-Side Contact Group>

The lens-side contact group LCG corresponds to the camera-side contact group CCG. Therefore, the lens-side contact group LCG is configured to have the same number of contacts as the contacts constituting the camera-side contact group CCG, and each of the contacts LC1 to LC12 is disposed at the same interval as the contacts CC1 to CC12 constituting the camera-side contact group CCG.

(A) First Contact LC1

The first contact LC1 is a lens detection contact corresponding to the lens detection contact (first contact CC1) on the camera side. Therefore, in the case where the interchangeable lens 100 is attached to the camera 10, the first contact LC1 is connected to the first contact CC1 on the camera side. The first contact LC1 is grounded through a pull-down resistor LR1 and is pulled down to ground potential.

(B) Second Contact LC2, Third Contact LC3, and Fourth Contact LC4

The second contact LC2, the third contact LC3, and the fourth contact LC4 are the plurality of power contacts corresponding to the plurality of power contacts (second contact CC2, third contact CC3, and fourth contact CC4) on the camera side. Therefore, in the case where the interchangeable lens 100 is attached to the camera 10, the second contact LC2 is connected to the second contact CC2 on the camera side and the third contact LC3 is connected to the third contact CC3 on the camera side. Further, the fourth contact LC4 is connected to the fourth contact CC4 on the camera side.

As described above, the second contact CC2 on the camera side is the first power contact for supplying the first lens-drive power LV1 (+5 V) having the lowest voltage. Therefore, in the case where the interchangeable lens 100 is attached to the camera 10, the first lens-drive power LV1 having the lowest voltage is supplied to the second contact LC2.

The lens-side system power generation unit 112 is connected to the second contact LC2 in the interchangeable lens. The lens-side system power generation unit 112 generates the system power (+3.3 V) by using the first lens-drive power LV1 (+5 V) to be supplied from the second contact LC2 and supplies the generated system power to the lens microcomputer 114.

Further, the third contact CC3 on the camera side is the second power contact for supplying the second lens-drive power LV2 (+6.5 V). Therefore, in the case where the interchangeable lens 100 is attached to the camera 10, the second lens-drive power LV2 is supplied to the third contact LC3.

Further, the fourth contact CC4 on the camera side is the third power contact for supplying the lens-drive power LV3 (+10 V) having the highest voltage. Therefore, in the case where the interchangeable lens 100 is attached to the camera 10, the third lens-drive power LV3 having the highest voltage is supplied to the fourth contact CC4 on the camera side.

(C) Fifth Contact LC5 and Sixth Contact LC6

The fifth contact LC5 and the sixth contact LC6 are two ground contacts respectively corresponding to the two ground contacts (fifth contact CC5 and sixth contact CC6) on the camera side. Therefore, in the case where the interchangeable lens 100 is attached to the camera 10, the fifth contact LC5 is connected to the fifth contact CC5 on the camera side, and the sixth contact LC6 is connected to the sixth contact CC6 on the camera side.

(D) Seventh Contact LC7 to Twelfth Contact LC12

The seventh contact LC7 to the twelfth contact LC12 are the plurality of communication contacts corresponding to the plurality of communication contacts (seventh contact CC7 to twelfth contact CC12) on the camera side. Therefore, in the case where the interchangeable lens 100 is attached to the camera 10, the seventh contact LC7 is connected to the seventh contact CC7 on the camera side, and the eighth contact LC8 is connected to the eighth contact CC8 on the camera side. Further, the ninth contact LC9 is connected to the ninth contact CC9 on the camera side, and the tenth contact LC10 is connected to the tenth contact CC10 on the camera side. Furthermore, the eleventh contact LC11 is connected to the eleventh contact CC11 on the camera side, and the twelfth contact LC12 is connected to the twelfth contact CC12 on the camera side.

As described above, the seventh contact CC7 on the camera side is the communication contact for giving the notification of the state from the interchangeable lens 100 to the camera 10. Therefore, the seventh contact LC7 is also used as the communication contact for giving the notification of the state from the interchangeable lens 100 to the camera 10. The seventh contact LC7 is connected to the first communication port LP1 of the lens microcomputer 114.

Further, the eighth contact CC8 on the camera side is a communication contact for transmitting the VSYNC signal from the camera 10 to the interchangeable lens 100. Therefore, the eighth contact LC8 is used as a communication contact for receiving the VSYNC signal transmitted from the camera-side. The eighth contact LC8 is connected to the second communication port LP2 of the lens microcomputer 114.

Further, the ninth contact CC9, the tenth contact CC10, and the eleventh contact CC11 on the camera side are communication contacts for respectively performing the three-line serial communication with the interchangeable lens 100. Therefore, the ninth contact LC9, the tenth contact LC10, and the eleventh contact LC11 are also used as the communication contacts for performing the three-line serial communication with the camera 10. The ninth contact LC9 is connected to the third communication port LP3 of the lens microcomputer 114. The tenth contact LC10 is connected to the fourth communication port LP4 of the lens microcomputer 114. The eleventh contact LC11 is connected to the fifth communication port LP5 of the lens microcomputer 114.

Here, as described above, the fifth communication port LP5 of the lens microcomputer 114 is composed of a port in which the open drain output is possible. Therefore, the eleventh contact LC11 connected to the fifth communication port LP5 (MISO port) of the lens microcomputer 114 is composed of a contact in which the open drain output is possible. The eleventh contact LC11 is an example of the lens-side communication contact, and it is determined whether the camera 10 which is an attachment destination supports the specific function based on the polarity of this eleventh contact LC11. This point will be described below in detail.

Further, the ninth contact LC9, the tenth contact LC10, and the eleventh contact LC11 are examples of the plurality of contacts to be used in the case where the camera 10 and the interchangeable lens 100 perform the serial communication.

Further, the twelfth contact CC12 on the camera side is a contact for performing the single-line serial communication with the interchangeable lens 100 and a contact for notifying the camera 10 of the state from the interchangeable lens 100. Therefore, the twelfth contact LC12 also functions as the contact for performing the single-line serial communication with the camera 10 and the contact for notifying the camera 10 of the state. The twelfth contact LC12 is connected to the sixth communication port LP6 and the seventh communication port LP7 of the lens microcomputer 114. The twelfth contact LC12 is an example of a lens-side extension communication contact.

As shown in FIG. 9, the seventh contact LC7, the eighth contact LC8, and the twelfth contact LC12 among the plurality of contacts (seventh contact LC7 to twelfth contact LC12) constituting the communication contact are respectively connected to the lens-side system power generation unit 112 through pull-up resistors LR7, LR8, and LR12, and are pulled up to potential (for example, +3.3 V) of the system power to be supplied from the lens-side system power generation unit 112.

Further, the ninth contact LC9 among the plurality of contacts (seventh contact LC7 to twelfth contact LC12) constituting the communication contact is grounded through a pull-down resistor LR9 and is pulled down to the ground potential.

The plurality of contacts LC1 to LC12 constituting the lens-side contact group LCG are also disposed in the same arrangement as the plurality of contacts CC1 to CC12 constituting the camera-side contact group CCG. That is, the plurality of contacts LC1 to LC12 are disposed in an order of the first contact LC1, the second contact LC2, . . . , the eleventh contact LC11, and the twelfth contact LC12 with respect to the rotation direction R of the interchangeable lens 100 in the case where the interchangeable lens 100 is attached to the camera 10. Therefore, the lens-side contact group LCG is also disposed in the order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12).

《Function Related to Compatibility Determination》

FIG. 10 is a block diagram of a function related to compatibility determination provided in the camera and the interchangeable lens.

<Compatibility Determination Function Provided on Camera Side>

As described above, the camera 10 determines whether the eleventh contact CC11 functions as the camera-side communication contact and the interchangeable lens 100 attached to the camera 10 supports the specific function based on the polarity of the eleventh contact CC11.

A function to be a determination target is set in advance. In the camera system 1 of the embodiment, an example of the function to be the determination target is a function of transmitting lens information from the interchangeable lens 100 to the camera 10 by using the camera-side extension communication contact (twelfth contact CC12) and the lens-side extension communication contact (twelfth contact LC12). In a case where both the camera 10 and the interchangeable lens 100 support the function, the lens information is transmitted from the interchangeable lens 100 to the camera 10 by the single-line serial communication by using the camera-side extension communication contact (twelfth contact CC12) and the lens-side extension communication contact (twelfth contact LC12). The camera 10 receives the transmitted lens information to acquire the lens information of the attached interchangeable lens 100. This point will be described below in detail.

The eleventh contact CC11 is connected to the fifth communication port CP5 (MISO port) of the camera microcomputer 34. As described above, the fifth communication port CP5 is a port in which the open drain output is possible.

The camera microcomputer 34 has a function of setting the polarity of the fifth communication port CP5 to the HIGH level which is the first polarity or the LOW level which is the second polarity. This function is provided by a camera-side communication contact polarity setting unit 70. The camera microcomputer 34 executes a predetermined program to function as the camera-side communication contact polarity setting unit 70. In a case where the camera 10 supports the specific function, the camera-side communication contact polarity setting unit 70 sets the polarity of the fifth communication port CP5 to the HIGH level which is the first polarity. On the other hand, in a case where the camera 10 does not support the specific function, the camera-side communication contact polarity setting unit 70 sets the polarity of the fifth communication port CP5 to the LOW level which is the second polarity.

The fifth communication port CP5 of the camera microcomputer 34 is set to the HIGH level (first polarity) to set the eleventh contact CC11 to the HIGH level (first polarity). Further, the fifth communication port CP5 of the camera microcomputer 34 is set to the LOW level (second polarity) to set the eleventh contact CC11 to the LOW level (second polarity).

Further, the camera microcomputer 34 has a function of detecting the polarity of the fifth communication port CP5 and of determining whether the interchangeable lens 100 attached to the camera 10 supports the specific function based on the detected polarity. This function is provided by a camera-side determination unit 72. The camera microcomputer 34 executes a predetermined program to function as the camera-side determination unit 72. The camera-side determination unit 72 detects the polarity of the fifth communication port CP5 and determines that the interchangeable lens 100 attached to the camera 10 supports the specific function only in a case where the detected polarity is at the HIGH level (first polarity).

The eleventh contact CC11 is set to the HIGH level (first polarity) to set the fifth communication port CP5 of the camera microcomputer 34 to the HIGH level (first polarity). Further, the eleventh contact CC11 is set to the LOW level (second polarity) to set the fifth communication port CP5 of the camera microcomputer 34 to the LOW level (second polarity).

<Compatibility Determination Function Provided on Interchangeable Lens Side>

As described above, the interchangeable lens 100 determines whether the eleventh contact LC11 functions as the lens-side communication contact and the camera 10 which is the attachment destination supports the specific function based on the polarity of the eleventh contact LC11.

The eleventh contact LC11 is connected to the fifth communication port LP5 (MISO port) of the lens microcomputer 114. As described above, the fifth communication port LP5 is the port in which the open drain output is possible.

The lens microcomputer 114 has a function of setting the polarity of the fifth communication port LP5 to the HIGH level which is the first polarity or the LOW level which is the second polarity. This function is provided by a lens-side communication contact polarity setting unit 130. The lens microcomputer 114 executes a predetermined program to function as the lens-side communication contact polarity setting unit 130. In a case where the interchangeable lens 100 supports the specific function, the lens-side communication contact polarity setting unit 130 sets the polarity of the fifth communication port LP5 to the HIGH level which is the first polarity. On the other hand, in a case where the interchangeable lens 100 does not support the specific function, the lens-side communication contact polarity setting unit 130 sets the polarity of the fifth communication port LP5 to the LOW level which is the second polarity.

The fifth communication port LP5 of the lens microcomputer 114 is set to the HIGH level (first polarity) to set the eleventh contact LC11 to the HIGH level (first polarity). Further, the fifth communication port LP5 of the lens microcomputer 114 is set to the LOW level (second polarity) to set the eleventh contact LC11 to the LOW level (second polarity).

Further, the lens microcomputer 114 has a function of detecting the polarity of the fifth communication port LP5 and of determining whether the camera 10 which is an attachment destination supports the specific function based on the detected polarity. This function is provided by a lens-side determination unit 132. The lens microcomputer 114 executes a predetermined program to function as the lens-side determination unit 132. The lens-side determination unit 132 detects the polarity of the fifth communication port LP5 and determines that the camera 10 which is the attachment destination supports the specific function only in a case where the detected polarity is at the HIGH level (first polarity).

The eleventh contact LC11 is set to the HIGH level (first polarity) to set the fifth communication port LP5 of the lens microcomputer 114 to the HIGH level (first polarity). Further, the eleventh contact LC11 is set to the LOW level (second polarity) to set the fifth communication port LP5 of the lens microcomputer 114 to the LOW level (second polarity).

<Polarities of Camera-Side Communication Contact and Lens-Side Communication Contact>

In the case where the interchangeable lens 100 is attached to the camera 10, the eleventh contact CC11 on the camera side which is the camera-side communication contact is connected to the eleventh contact LC11 on the interchangeable lens side which is the lens-side communication contact. As a result, the fifth communication port CP5 of the camera microcomputer 34 is connected to the fifth communication port LP5 of the lens microcomputer 114.

Here, as described above, the open drain output is possible in the fifth communication port CP5 of the camera microcomputer 34 and the fifth communication port LP5 of the lens microcomputer 114. In a case where the fifth communication port CP5 and the fifth communication port LP5 are respectively set to the HIGH level (first polarity) or the LOW level (second polarity), the polarities thereof are set as follows. That is, the polarities of both the fifth communication port CP5 and the fifth communication port LP5 are at the HIGH level (first polarity) only in a case where both the fifth communication port CP5 and the fifth communication port LP5 are set to the HIGH level (first polarity). The polarities of both the fifth communication port CP5 and the fifth communication port LP5 are at the LOW level (second polarity) in a case where at least one of the fifth communication port CP5 or the fifth communication port LP5 is set to the LOW level (second polarity). Therefore, in a case where the polarities of the fifth communication port CP5 of the camera microcomputer 34 and the fifth communication port LP5 of the lens microcomputer 114 after the output setting are detected, it is possible to determine whether both the camera 10 and the interchangeable lens 100 support the specific function, that is, whether there is the compatibility.

The camera-side determination unit 72 detects the polarity of the fifth communication port CP5 (=polarity of eleventh contact CC11) after the output setting and determines that the attached interchangeable lens 100 supports the specific function only in a case where the detected polarity is at the HIGH level (first polarity). That is, the camera-side determination unit 72 determines that there is the interchangeable lens 100 having the compatibility.

Similarly, the lens-side determination unit 132 detects the polarity of the fifth communication port LP5 (=polarity of eleventh contact LC11) after the output setting and determines that the camera 10 which is the attachment destination supports the specific function only in a case where the detected polarity is at the HIGH level (first polarity). That is, the lens-side determination unit 132 determines that there is the camera 10 having the compatibility.

FIG. 11 is a table showing a relationship between the output settings of the camera-side communication contact and the lens-side communication contact according to a support situation to the specific function and detected polarities.

As shown in FIG. 11, in a case where the camera 10 and the interchangeable lens 100 support the specific function, the output settings of the camera-side communication contact (eleventh contact CC11) and the lens-side communication contact (eleventh contact LC11) are set to the HIGH level (first polarity). On the other hand, in a case where the camera 10 and the interchangeable lens 100 do not support the specific function, the output settings of the camera-side communication contact (eleventh contact CC11) and the lens-side communication contact (eleventh contact LC11) are set to the LOW level (second polarity).

Further, both the camera-side communication contact (eleventh contact CC11) and the lens-side communication contact (eleventh contact LC11) after the output settings are at the HIGH level (first polarity) only in a case where both of the eleventh contacts CC11 and LC11 after the output settings are set to the HIGH level (first polarity). Both of the eleventh contacts CC11 and LC11 after the output settings are at the LOW level (second polarity) in a case where at least one of the eleventh contact CC11 or the eleventh contact LC11 after the output settings is set to the LOW level (second polarity).

In this manner, in the camera system 1 of the embodiment, in the case where the polarities of the camera-side communication contact and the lens-side communication contact are detected, it is possible to determine the presence or absence of the compatibility between the camera 10 and the interchangeable lens 100.

[Action of Camera System]

«Attachment of Interchangeable Lens»

The lens-side mount 104 provided in the interchangeable lens 100 is attached to the camera-side mount 14 provided in the camera 10 to attach the interchangeable lens 100 to the camera 10. In this case, the interchangeable lens 100 is rotated with respect to the camera 10 for the attachment.

The interchangeable lens 100 is attached to the camera 10 to connect the lens-side contact group LCG provided in the lens-side mount 104 to the camera-side contact group CCG provided in the camera-side mount 14.

In the case where the interchangeable lens 100 is attached to the camera 10, the lens-side contact group LCG is disposed in an order of the lens detection contact (first contact LC1), the plurality of power contacts (second contact LC2 to fourth contact LC4), the plurality of ground contacts (fifth contact LC5 and sixth contact LC6), and the plurality of communication contacts (seventh contact LC7 to twelfth contact LC12) along the rotation direction. Therefore, it is possible for the power contacts (second contact LC2 to fourth contact LC4) to touch more contacts of the camera-side contact group CCG. Accordingly, it is possible to improve a self-cleaning effect of the plurality of power contacts (second contact LC2 to fourth contact LC4) of the lens-side contact group LCG. As a result, it is possible to reduce touch resistance of the plurality of power contacts (second contact LC2 to fourth contact LC4) of the lens-side contact group LCG and thus to efficiently supply the power.

«Detection of Interchangeable Lens Attachment»

The camera microcomputer 34 detects the presence or absence of the attachment of the interchangeable lens 100 based on the polarity of the first contact (lens detection contact) CC1 of the camera-side contact group CCG.

In a case where the interchangeable lens 100 is not attached, the first contact CC1 on the camera side is pulled up by the pull-up resistor CR1 and thus is at the HIGH level (high potential).

On the other hand, in the case where the interchangeable lens 100 is attached to the camera 10, the first contact (lens detection contact) LC1 on the interchangeable lens side is connected to the first contact CC1 on the camera side as shown in FIG. 9. Since the first contact LC1 on the interchangeable lens side is grounded, in a case where the first contact LC1 on the interchangeable lens side is connected to the first contact CC1 on the camera side, the first contact CC1 on the camera side is at the LOW level (low potential).

The camera microcomputer 34 detects the presence or absence of the attachment of the interchangeable lens 100 based on the polarity (HIGH level or LOW level) of the lens detection port CP0 connected to the first contact CC1 on the camera side. That is, it is determined that the interchangeable lens 100 is not attached in a case where potential of the lens detection port CP0 is at the HIGH level, and it is discriminated that the interchangeable lens 100 is attached in a case where potential of the lens detection port CP0 is at the LOW level to detect the presence or absence of the attachment of the interchangeable lens 100.

The first contact CC1 which is the lens detection contact is disposed at a head of the rotation direction R of the interchangeable lens 100 in the case where the interchangeable lens 100 is attached to the camera 10. Accordingly, it is possible to prevent the contact other than the first contact LC1 on the interchangeable lens side from touching the first contact CC1 on the camera side in a case where the interchangeable lens 100 is attached and detached. Accordingly, it is possible to prevent erroneous detection.

«Activation of Lens Microcomputer»

In a case where the attachment of the interchangeable lens 100 is detected, the camera microcomputer 34 starts the supplying of the lens-drive power to the power supply unit 42. That is, the camera microcomputer 34 controls the power supply unit 42 and the lens-drive power switch unit 44 such that the pieces of lens-drive power LV1, LV2, and LV3 are supplied to the plurality of power contacts (second contact CC2, third contact CC3, and fourth contact CC4) on the camera side. Accordingly, the pieces of lens-drive power LV1, LV2, and LV3 are respectively supplied to the plurality of power contacts (second contact CC2, third contact CC3, and fourth contact CC4) on the camera side.

Further, in a case where the pieces of lens-drive power LV1, LV2, and LV3 are supplied to the plurality of power contacts (second contact CC2, third contact CC3, and fourth contact CC4) on the camera side, the pieces of lens-drive power LV1, LV2, and LV3 are supplied to the interchangeable lens 100 through the plurality of power contacts (second contact LC2, third contact LC3, and fourth contact LC4) on the interchangeable lens side connected to the plurality of power contacts (second contact CC2, third contact CC3, and fourth contact CC4) on the camera side.

In a case where the pieces of lens-drive power LV1, LV2, and LV3 are supplied to the interchangeable lens 100, the system power of the lens microcomputer 114 is generated by using one of the pieces of lens-drive power LV1, LV2, and LV3. The system power of the lens microcomputer 114 is generated by the lens-side system power generation unit 112. The lens-side system power generation unit 112 generates the system power (+3.3 V) by using the first lens-drive power LV1 (+5 V) having the lowest voltage among the plurality of pieces of lens-drive power LV1, LV2, and LV3 supplied from the camera-side, and supplies the generated system power to the lens microcomputer 114.

In a case where the system power is normally supplied to the lens microcomputer 114, the lens microcomputer 114 is activated.

«Detection of Normal Supplying of System Power to Lens Microcomputer»

The camera microcomputer 34 detects that the system power is normally supplied to the lens microcomputer 114 based on the polarity of a specific contact of the camera-side contact group CCG. The specific contact herein refers to a contact to be connected to the contact to which the pull-up resistor is connected on the interchangeable lens side.

On the interchangeable lens-side, the contacts to which the pull-up resistors LR7, LR8, and LR12 are connected are the seventh contact LC7, the eighth contact LC8, and the twelfth contact LC12. The contacts on the camera side to be connected to these contacts are the seventh contact CC7, the eighth contact CC8, and the twelfth contact CC12.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, and the sixth communication port CP6 to be connected to the twelfth contact CC12 of the camera-side contact group CCG to detect that the system power is normally supplied to the lens microcomputer 114. Specifically, in a case where it is detected that the polarities of the first communication port CP1, the second communication port CP2, and the sixth communication port CP6 are at the HIGH level, it is determined that the system power is normally supplied to the lens microcomputer 114. Accordingly, it is possible to appropriately detect that the system power is normally supplied to the lens microcomputer 114 on the camera side even in the case where the system power of the lens microcomputer 114 is generated on the interchangeable lens side. In particular, more accurate detection is possible by discriminating the polarities of the plurality of contacts as in the camera system 1 of the embodiment.

In a case where the system power is normally supplied to the lens microcomputer 114 and the lens microcomputer 114 is normally activated, the lens microcomputer 114 switches the polarity of the first communication port LP1 to the LOW level. As a result, the polarities of the seventh contact LC7 on the interchangeable lens side and the seventh contact CC7 on the camera side are switched from the HIGH level to the LOW level. The camera microcomputer 34 detects that the seventh contact CC7 is switched to the LOW level to detect that the lens microcomputer 114 is activated. That is, the lens microcomputer 114 switches the polarity of the first communication port LP1 to the LOW level to notify the camera microcomputer 34 of the normal activation. The lens microcomputer 114 switches the polarity of the first communication port LP1 to the LOW level after the lapse of a certain period of time from the activation.

«Discrimination whether Interchangeable Lens is Regular Product»

The camera microcomputer 34 discriminates whether the attached interchangeable lens 100 is a regular interchangeable lens based on the polarities of the specific contacts of the camera-side contact group CCG. The specific contacts herein are the contacts to be connected to the contacts to which the pull-up resistors LR7, LR8, and LR12 are connected, and the contact to which the pull-down resistor LR9 is connected on the interchangeable lens side.

On the interchangeable lens-side, the contacts to which the pull-up resistors LR7, LR8, and LR12 are connected are the seventh contact LC7, the eighth contact LC8, and the twelfth contact LC12. The contacts on the camera side to be connected to these contacts are the seventh contact CC7, the eighth contact CC8, and the twelfth contact CC12.

Further, the contact to which the pull-down resistor LR9 is connected is the ninth contact LC9 on the interchangeable lens side. The contact on the camera side to be connected to this contact is the ninth contact CC9.

The camera microcomputer 34 discriminates the polarities (HIGH level or LOW level) of the first communication port CP1 to be connected to the seventh contact CC7 of the camera-side contact group CCG, the second communication port CP2 to be connected to the eighth contact CC8 of the camera-side contact group CCG, the third communication port CP3 to be connected to the ninth contact CC9 of the camera-side contact group CCG, and the sixth communication port CP6 to be connected to the twelfth contact CC12 of the camera-side contact group CCG to discriminate whether the attached interchangeable lens 100 is the regular interchangeable lens. Specifically, in a case where it is detected that the polarities of the first communication port CP1, the second communication port CP2, and the sixth communication port CP6 are at the HIGH level and the polarity of the third communication port CP3 is at the LOW level, the camera microcomputer 34 discriminates that the attached interchangeable lens 100 is the regular interchangeable lens.

In this manner, it is possible to easily discriminate whether the attached interchangeable lens 100 is the regular interchangeable lens by discriminating the polarities of the specific contacts at the time of attaching the interchangeable lens 100.

«Compatibility Determination»

In the case where the interchangeable lens 100 is attached to the camera 10, the presence or absence of the compatibility is determined in both the camera 10 and the interchangeable lens 100. That is, it is determined whether a counterpart supports the specific function in both the camera 10 and the interchangeable lens 100. As described above, in the camera system 1 of the embodiment, the function to be the determination target is set as the function of transmitting lens information from the interchangeable lens 100 to the camera 10 by using the camera-side extension communication contact (twelfth contact CC12) and the lens-side extension communication contact (twelfth contact LC12), and it is determined whether the camera 10 and the interchangeable lens 100 support the function. Hereinafter, this specific function to be set as the determination target is referred to as a lens information acquisition function. The determination is performed by the following procedure.

<Polarity Setting on Camera Side>

The camera microcomputer 34 functioning as the camera-side communication contact polarity setting unit 70 sets the polarity of the fifth communication port CP5 at a timing of starting the supplying of the lens-drive power to the interchangeable lens 100.

Here, in a case where the camera 10 supports a lens information acquisition function, the camera microcomputer 34 sets the polarity of the fifth communication port CP5 to the HIGH level which is the first polarity. On the other hand, in a case where the camera 10 does not support the lens information acquisition function, the camera microcomputer 34 sets the polarity of the fifth communication port CP5 to the LOW level which is the second polarity.

The polarity of the fifth communication port CP5 is set to the HIGH level (first polarity) to set the eleventh contact CC11 which is the camera-side communication contact to the HIGH level (first polarity). Further, the polarity of the fifth communication port CP5 is set to the LOW level (second polarity) to set the eleventh contact CC11 to the LOW level (second polarity).

<Polarity Setting on Lens Side>

The lens microcomputer 114 functioning as the lens-side communication contact polarity setting unit 130 sets the polarity of the fifth communication port LP5 at a timing of the activation thereof. As described above, since the lens microcomputer 114 is activated by normally supplying the power, the polarity of the fifth communication port LP5 is set at the timing of the activation thereof. More specifically, the polarity of the fifth communication port LP5 is set after the activation thereof and before notifying the camera side of the activation thereof.

Here, in a case where the interchangeable lens 100 supports the lens information acquisition function, the lens microcomputer 114 sets the polarity of the fifth communication port LP5 to the HIGH level which is the first polarity. On the other hand, in a case where the interchangeable lens 100 does not support the lens information acquisition function, the lens microcomputer 114 sets the polarity of the fifth communication port LP5 to the LOW level which is the second polarity.

The polarity of the fifth communication port LP5 is set to the HIGH level (first polarity) to set the eleventh contact LC11 which is the lens-side communication contact to the HIGH level (first polarity). Further, the polarity of the fifth communication port LP5 is set to the LOW level (second polarity) to set the eleventh contact LC11 to the LOW level (second polarity).

<Compatibility Determination on Camera Side>

The camera microcomputer 34 functioning as the camera-side determination unit 72 detects the polarity of the fifth communication port CP5 (eleventh contact CC11) at a timing of detecting that the lens microcomputer 114 is activated to determine the presence or absence of the compatibility. Specifically, the camera microcomputer 34 detects the polarity of the fifth communication port CP5 at a timing of detecting that the first communication port CP1 is switched to the LOW level to determine the presence or absence of the compatibility.

As described above, the fifth communication port CP5 is at the HIGH level only in the case where the fifth communication ports CP5 and LP5 are set to the HIGH level in both the camera 10 and the interchangeable lens 100. The case where the fifth communication ports CP5 and LP5 are set to the HIGH level in both the camera 10 and the interchangeable lens 100 refers to the case where both the camera 10 and the interchangeable lens 100 support the lens information acquisition function. Accordingly, in the case where the polarity of the fifth communication port CP5 is at the HIGH level, the camera microcomputer 34 determines that the attached interchangeable lens 100 supports the lens information acquisition function. On the other hand, in the case where the polarity of the fifth communication port CP5 is at the LOW level, the camera microcomputer 34 determines that there is no compatibility. The case where there is no compatibility refers to the case where the camera-side does not support the lens information acquisition function, the interchangeable lens-side does not support the lens information acquisition function, or both the camera-side and the interchangeable lens-side do not support the lens information acquisition function.

<Compatibility Determination on Interchangeable Lens Side>

The lens microcomputer 114 functioning as the lens-side determination unit 132 detects the polarity of the fifth communication port LP5 (eleventh contact LC11) at a timing of giving a notification of the activation of the lens microcomputer 114 to determine the presence or absence of the compatibility. Specifically, the lens microcomputer 114 detects the polarity of the fifth communication port LP5 at a timing of switching the first communication port LP1 to the LOW level to determine the presence or absence of the compatibility.

Similarly to the camera-side, the fifth communication port LP5 on the interchangeable lens side is at the HIGH level only in the case where the fifth communication ports CP5 and LP5 are set to the HIGH level in both the camera 10 and the interchangeable lens 100. As described above, the case where the fifth communication ports CP5 and LP5 are set to the HIGH level in both the camera 10 and the interchangeable lens 100 refers to the case where both the camera 10 and the interchangeable lens 100 support the lens information acquisition function. Accordingly, in the case where the polarity of the fifth communication port LP5 is at the HIGH level, the lens microcomputer 114 determines that the camera 10 which is the attachment destination supports the lens information acquisition function. On the other hand, in the case where the polarity of the fifth communication port LP5 is at the LOW level, the lens microcomputer 114 determines that there is no compatibility. The case where there is no compatibility refers to the case where the camera-side does not support the lens information acquisition function, the interchangeable lens-side does not support the lens information acquisition function, or both the camera-side and the interchangeable lens-side do not support the lens information acquisition function.

In this manner, it is possible to determine the presence or absence of the compatibility in both the camera 10 and the interchangeable lens 100 by detecting the polarities of the fifth communication port CP5 (eleventh contact CC11) on the camera side and the fifth communication port LP5 (eleventh contact LC11) on the interchangeable lens side.

<Determination Example>

A case where the camera system 1 is composed of three cameras and three interchangeable lenses is considered. The three cameras are set as a first camera, a second camera, and the third camera, and the three interchangeable lenses are set as a first interchangeable lens, a second interchangeable lens, and a third interchangeable lens. For the cameras, it is assumed that only the first camera supports the specific function, and others do not support the specific function. Further, for the interchangeable lenses, it is assumed that only the first interchangeable lens supports the specific function, and others do not support the specific function.

In this case, only in a case where the first camera and the first interchangeable lens are combined, the polarities of the fifth communication ports CP5 and LP5 are at the HIGH level. In other combinations, that is, in the combinations of the first camera and the second interchangeable lens, the first camera and the third interchangeable lens, the second camera and the first interchangeable lens, the second camera and the second interchangeable lens, the second camera and the third interchangeable lens, the third camera and the first interchangeable lens, the third camera and the second interchangeable lens, and the third camera and the third interchangeable lens, the polarities of the fifth communication ports CP5 and LP5 are at the LOW level.

Therefore, in the case where the polarities of the fifth communication ports CP5 and LP5 are detected in both the camera and the interchangeable lens, it is possible to determine the presence or absence of the compatibility in both the camera 10 and the interchangeable lens 100. Specifically, in the case where the polarities of the fifth communication ports CP5 and LP5 are at the HIGH level in both the camera and the interchangeable lens, it is possible to determine that both the camera and the interchangeable lens support the specific function. On the other hand, in the case where the polarities of the fifth communication ports CP5 and LP5 are at the LOW level in both the camera and the interchangeable lens, it is possible to determine that at least any one of the fifth communication port CP5 or the fifth communication port LP5 does not support the specific function. That is, it is possible to determine that there is no compatibility.

«Acquisition of Lens Information»

In the case where both the camera 10 and the interchangeable lens 100 support the lens information acquisition function, that is, there is the compatibility between the camera 10 and the interchangeable lens 100, acquisition processing of the lens information is performed.

The interchangeable lens 100 transmits the lens information to the camera 10 and the transmitted lens information is received by the camera 10 to perform the acquisition processing of the lens information. The transmission of the lens information is performed by the single-line serial communication and is performed by using the camera-side extension communication contact (twelfth contact CC12) and the lens-side extension communication contact (twelfth contact LC12).

Here, the lens information refers to information indicating a specification of the interchangeable lens 100. The lens information includes, for example, lens model data, lens characteristic data, lens characteristic correction data, and the like. The lens model data includes a lens model name, a focal length, a maximum F-number, a maker name, a product identification (ID), and the like. The lens characteristic data includes brightness shading data, color shading data, distortion data, aberration data, and the like. The lens characteristic correction data includes brightness shading correction data, color shading correction data, distortion correction data, aberration correction data, and the like. The lens information is stored in the ROM of the lens microcomputer 114.

The acquisition processing of the lens information is performed by the following procedure.

In the compatibility determination described above, in a case where it is determined that the camera 10 which is the attachment destination supports the lens information acquisition function, a communication setting is performed in order to perform the single-line serial communication. The communication setting is sequentially implemented, and the communication setting on the camera side is performed and then the communication setting on the interchangeable lens side is performed. In order to surely complete the communication setting on the camera side in a case where the interchangeable lens starts the communication, the communication setting on the camera side is implemented earlier than the communication setting on the interchangeable lens side.

In a case where the communication setting is completed, the lens microcomputer 114 outputs the lens information from the sixth communication port LP6 (TXD port).

The lens information output from the sixth communication port LP6 of the lens microcomputer 114 is transmitted to the camera-side through the twelfth contact LC12 which is the lens-side extension communication contact.

The lens information transmitted to the camera-side is received through the twelfth contact CC12 which is the camera-side extension communication contact and is input to the sixth communication port CP6 (RXD port) of the camera microcomputer 34. Accordingly, the lens information of the attached interchangeable lens 100 is acquired on the camera side.

The acquired lens information is used for controlling the interchangeable lens 100 and the like.

«Communication Setting»

The presence or absence of the compatibility is determined and then the communication setting is performed in both the camera 10 and the interchangeable lens 100. Specifically, various settings required for performing the three-line serial communication are performed between the camera 10 and the interchangeable lens 100.

The communication setting is sequentially implemented, and the communication setting of the interchangeable lens-side is performed and then the communication setting of the camera-side is performed. More specifically, in a case where a certain period of time (for example, 2.5 ms) elapses after the determination of the presence or absence of the compatibility, the communication setting of the interchangeable lens-side is performed. In a case where a certain period of time (for example, 2.5 ms) further elapses, the communication setting of the camera-side is performed. Accordingly, it is possible to surely complete the communication settings before the camera starts the communication. As described above, the three-line serial communication is performed with the camera as the SPI master and the interchangeable lens as the SPI slave in the camera system 1 of the embodiment. Therefore, the camera-side has a trigger for starting the communication. As described above, it is possible to surely complete the communication setting on the interchangeable lens side before the camera starts the communication by implementing the communication setting on the interchangeable lens side earlier than the communication setting on the camera side. Accordingly, it is possible to surely realize the communication and to reduce a time to start the communication.

In a case where a certain period of time elapses after the determination of the presence or absence of the compatibility, the lens microcomputer 114 performs various settings required for performing the three-line serial communication with the camera microcomputer 34. In a case where a certain period of time further elapses, the camera microcomputer 34 performs various settings required for performing the three-line serial communication with the lens microcomputer 114.

This communication setting processing is performed in parallel with the acquisition processing of the lens information described above. Accordingly, it is possible to speed up activation.

«Switching of Usage of Camera-Side Extension Communication Contact and Lens-Side Extension Communication Contact»

After the lens information is acquired, the camera-side extension communication contact (twelfth contact CC12) and the lens-side extension communication contact (twelfth contact LC12) are used for another usage. Specifically, the contacts are used as contacts for notifying the camera 10 of a state of the interchangeable lens 100 from the interchangeable lens 100.

In a case where the transmission of the lens information is completed, the lens microcomputer 114 performs a setting required for using the lens-side extension communication contact (twelfth contact LC12) as a communication contact for giving a notification of the state. Similarly, the camera microcomputer 34 performs a setting required for using the camera-side extension communication contact (twelfth contact CC12) as a communication contact for giving a notification of the state.

Accordingly, it is possible to effectively use the camera-side extension communication contact and the lens-side extension communication contact also after the transmission of the lens information.

Similar processing is processed also in a case where the camera 10 or the interchangeable lens 100 does not support the specific function, the lens information acquisition function. That is, the setting required for using the extension communication contact as the contact for giving a notification of the state of the interchangeable lens 100.

«Interchangeable Lens Drive»

In a case where the communication is established between the camera microcomputer 34 and the lens microcomputer 114, the interchangeable lens 100 is at a standby state. Hereinafter, the operation is possible in response to the instruction from the camera 10.

The lens microcomputer 114 communicates with the camera microcomputer 34 using the contacts for the synchronous serial communication to receive an instruction of the drive from the camera microcomputer 34. The lens microcomputer 114 controls the lens drive unit 110 in response to the received instruction to operate the interchangeable lens 100.

In this case, the lens drive unit 110 operates by receiving the supplying of the power from the camera 10. The plurality of pieces of lens-drive power are supplied through the plurality of power contacts (second contact CC2 to fourth contact CC4 on camera-side and second contact LC2 to fourth contact LC4 on interchangeable lens-side). Each of the pieces of lens-drive power LV1, LV2, and LV3 has different voltage and is supplied to the corresponding drive unit. For example, in the interchangeable lens 100 provided with the focus drive unit 110A and the stop drive unit 110C, the first lens-drive power LV1 (+5 V) having the lowest voltage is supplied to the stop drive unit 110C. Further, the third lens-drive power LV3 (+10 V) having the highest voltage is supplied to the focus drive unit 110A.

In this manner, since the power having the voltage corresponding to each drive unit is supplied from the camera-side, there is no need to generate the power on the interchangeable lens side and thus it is possible to simplify the configuration of the interchangeable lens 100. Further, since noise countermeasure is also unnecessary, it is possible to further simplify the configuration of the interchangeable lens 100.

Furthermore, it is possible to efficiently supply the pieces of power to the lens by supplying the pieces of power to the interchangeable lens through the plurality of power contacts. For example, in a case where large power is required on the interchangeable lens side, a loss in a contact portion becomes large in a case where the power is supplied from one power contact. However, it is possible to reduce the loss in the contact portion by employing the configuration of supplying the pieces of power to the interchangeable lens through the plurality of power contacts and thus to efficiently supply the pieces of power. That is, it is possible to obtain a large contact area by employing the configuration of supplying the pieces of power to the interchangeable lens through the plurality of power contacts and thus to efficiently supply the pieces of power due to the reduction of the loss.

In the camera system 1 of the embodiment, the contacts for the system power can be removed whereas the number of the power contacts increases. Therefore, it is also possible to suppress the increase in the number of contacts.

«Individual On and Off of Lens-Drive Power»

As described above, the plurality of pieces of lens-drive power having different voltages are supplied from the camera 10 to the interchangeable lens 100.

However, not all of the pieces of lens-drive power are always used depending on the interchangeable lens 100, and there is a case where only a part of the pieces of lens-drive power is used. For example, in a case where each drive unit operates at the same operation voltage or the like, pieces of lens-drive power having operation voltages other than the operation voltage are not used.

The supplying of the pieces of lens-drive power having the voltages unused on the interchangeable lens side is stopped. Accordingly, it is possible to achieve power saving.

Which voltage lens-drive power is required is different for each interchangeable lens. The camera microcomputer 34 discriminates the lens-drive power having the required voltage based on the lens information acquired from the interchangeable lens 100 to supply only the lens-drive power having the required voltage from the power supply unit 42 to the lens. Specifically, the processing is performed as follows.

First, a lens-drive power having a voltage required for the attached interchangeable lens 100 is discriminated based on the lens information acquired from the interchangeable lens 100. The ROM provided in the camera microcomputer 34 stores a determination table, and the camera microcomputer 34 discriminates the lens-drive power having the voltage required for the attached interchangeable lens 100 with reference to the determination table. Information on the lens-drive power having the required voltage is associated with each interchangeable lens (lens model name) constituting the camera system 1 and is recorded in the determination table.

Next, the camera microcomputer 34 controls the lens-drive power switch unit 44 based on a discrimination result to stop the supplying of the lens-drive power unused on the interchangeable lens side. For example, in a case where the second lens-drive power LV2 having the intermediate voltage is unused on the interchangeable lens side, the supplying of the second lens-drive power LV2 is stopped. Accordingly, only required lens-drive power is supplied.

Since the first lens-drive power LV1 having the lowest voltage is used for the system power of the lens microcomputer 114, the first lens-drive power LV1 having the lowest voltage is lens-drive power that is used always. Therefore, the power whose supplying is actually stopped is the second lens-drive power LV2 having the intermediate voltage or the third lens-drive power LV3 having the highest voltage.

In this manner, it is possible to efficiently supply the power and thus to achieve power saving by stopping the supplying of the lens-drive power unused on the interchangeable lens side.

The lens-drive power having the required voltage is discriminated with reference to the determination table provided on the camera side in this example, but the lens information transmitted from the interchangeable lens may include the lens-drive power having the required voltage.

«Detachment of Interchangeable Lens»

In a case where the interchangeable lens 100 is detached from the camera 10, the interchangeable lens 100 is rotated in a direction opposite to the direction in which the interchangeable lens 100 is attached to detach the interchangeable lens 100 from the camera 10. In this case, it is possible to safely detach the interchangeable lens 100 by disposing the power contacts of the interchangeable lens 100 (second contact LC2, third contact LC3, and fourth contact LC4) on the rear side in the rotation direction (front side with respect to rotation direction R at the time of attaching interchangeable lens 100) with respect to the ground contacts of the interchangeable lens 100 (fifth contact LC5 and sixth contact LC6).

That is, the power contacts of the interchangeable lens 100 touch the ground contacts of the camera 10 immediately after the interchangeable lens 100 is rotated in the detached direction by disposing the power contacts adjacent to the rear side of the ground contacts with respect to the rotation direction at the time of detaching the interchangeable lens 100. That is, the power contacts of the interchangeable lens 100 touch the ground contacts of the camera 10 without touching other contacts. Accordingly, it is possible to appropriately process charges remaining in the power contacts and the lines of the power contacts and thus to safely detach the interchangeable lens 100.

Further, it is possible to appropriately process charges remaining on the interchangeable lens side even in a case where the power contacts touch each other by disposing the plurality of power contacts in the descending order of the voltage with respect to the rotation direction at the time of detaching the interchangeable lens 100 (ascending order with respect to rotation direction R at the time of attaching interchangeable lens 100). That is, in the case where the interchangeable lens 100 is rotated to be detached, the power contacts on the interchangeable lens side always touch the power contacts on the camera side that supply the pieces of power having the voltages higher than the power contacts on the interchangeable lens side or the ground contacts. Therefore, even in the case where the charges remain in the power contacts on the interchangeable lens side and in the lines thereof, it is possible to appropriately process the charges. Accordingly, it is possible to safely detach the interchangeable lens 100.

Second Embodiment

[Configuration of Camera System]

Figure 12:
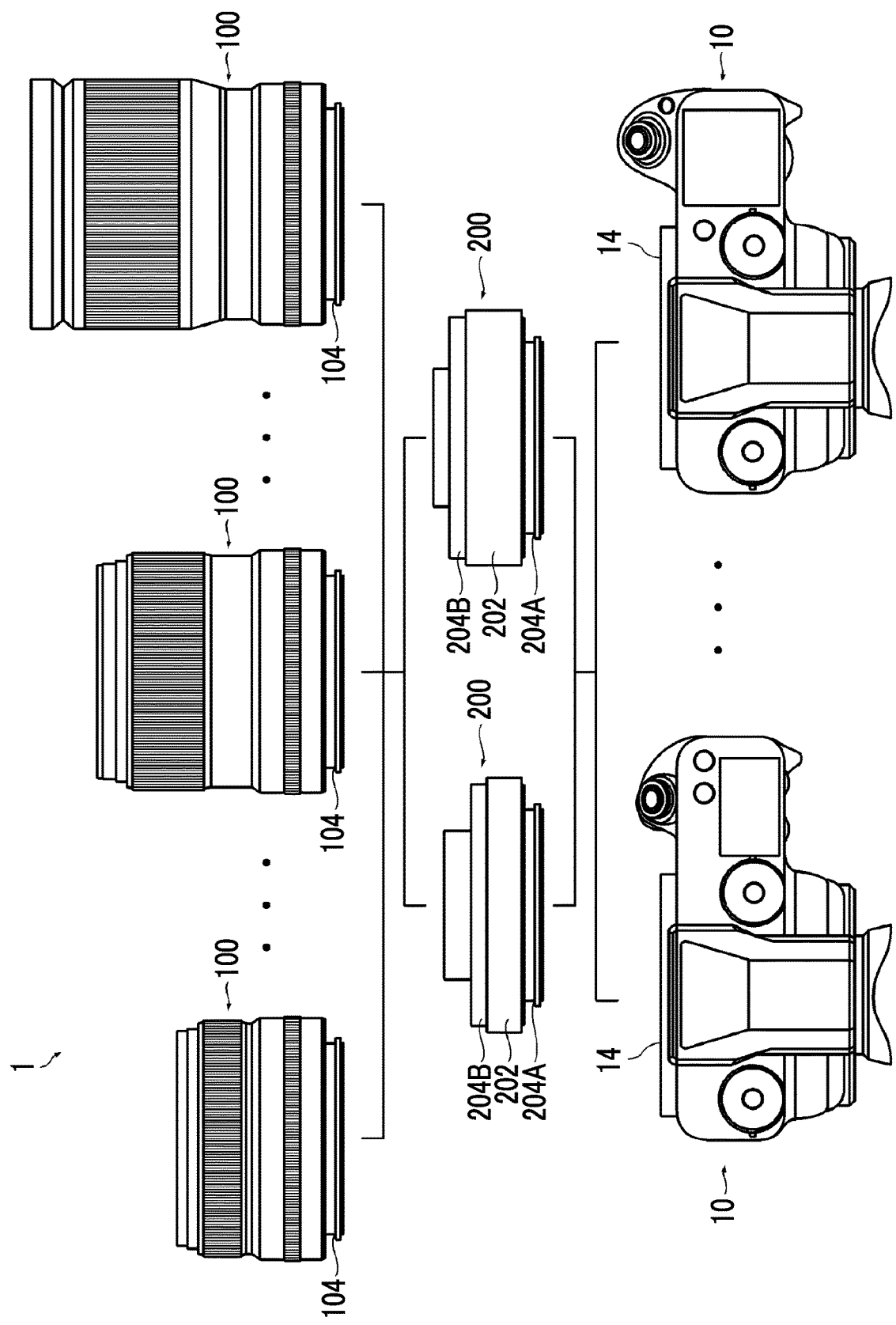
FIG. 12 is a system configuration diagram according to a second embodiment of the lens-interchangeable camera system.

FIG. 12 is a system configuration diagram according to a second embodiment of the lens-interchangeable camera system.

As shown in FIG. 12, the camera system 1 of the embodiment further comprises an accessory 200 to be attachably and detachably attached between the camera 10 and the interchangeable lens 100. At least one accessory 200 is provided. In the embodiment, two accessories 200 are provided. The accessory 200 is composed of, for example, an extender, an extension tube, or the like. In the embodiment, both of the two accessories 200 are composed of the extender. In this case, the two accessories 200 are provided with extender lenses in the barrels of the accessories. One of the two accessories 200 is composed of the extender that extends the focal length by 1.4 times, and the other is composed of the extender that extends the focal length by 2 times.

In the camera system 1 of the embodiment, the presence or absence of the support for a function of communicating with the accessory 200 is determined as the presence or absence of the support for the specific function. That is, there are the camera 10 and the interchangeable lens 100 comprising the function of communicating with the accessory 200, and the presence or absence of the support for the function is determined in both the camera 10 and the interchangeable lens 100.

«Appearance Configuration of Accessory»

The accessory 200 comprises an accessory-side first mount 204A on a base end side of an accessory body 202 thereof and comprises an accessory-side second mount 204B on a front end side thereof.

The accessory-side first mount 204A is a mount for attaching the accessory 200 to the camera 10. The accessory-side first mount 204A has the same structure as the lens-side mount 104 provided in the interchangeable lens 100.

The accessory-side second mount 204B is a mount for attaching the interchangeable lens 100 to the accessory 200. The accessory-side second mount 204B has the same structure as the camera-side mount 14 provided in the camera 10.

The accessory 200 is attached to the camera 10 through the accessory-side first mount 204A. In the camera 10 to which the accessory 200 is attached, the interchangeable lens 100 is attached to the accessory-side second mount 204B of the accessory 200.

«Electric Configuration of Accessory»

Figure 13:
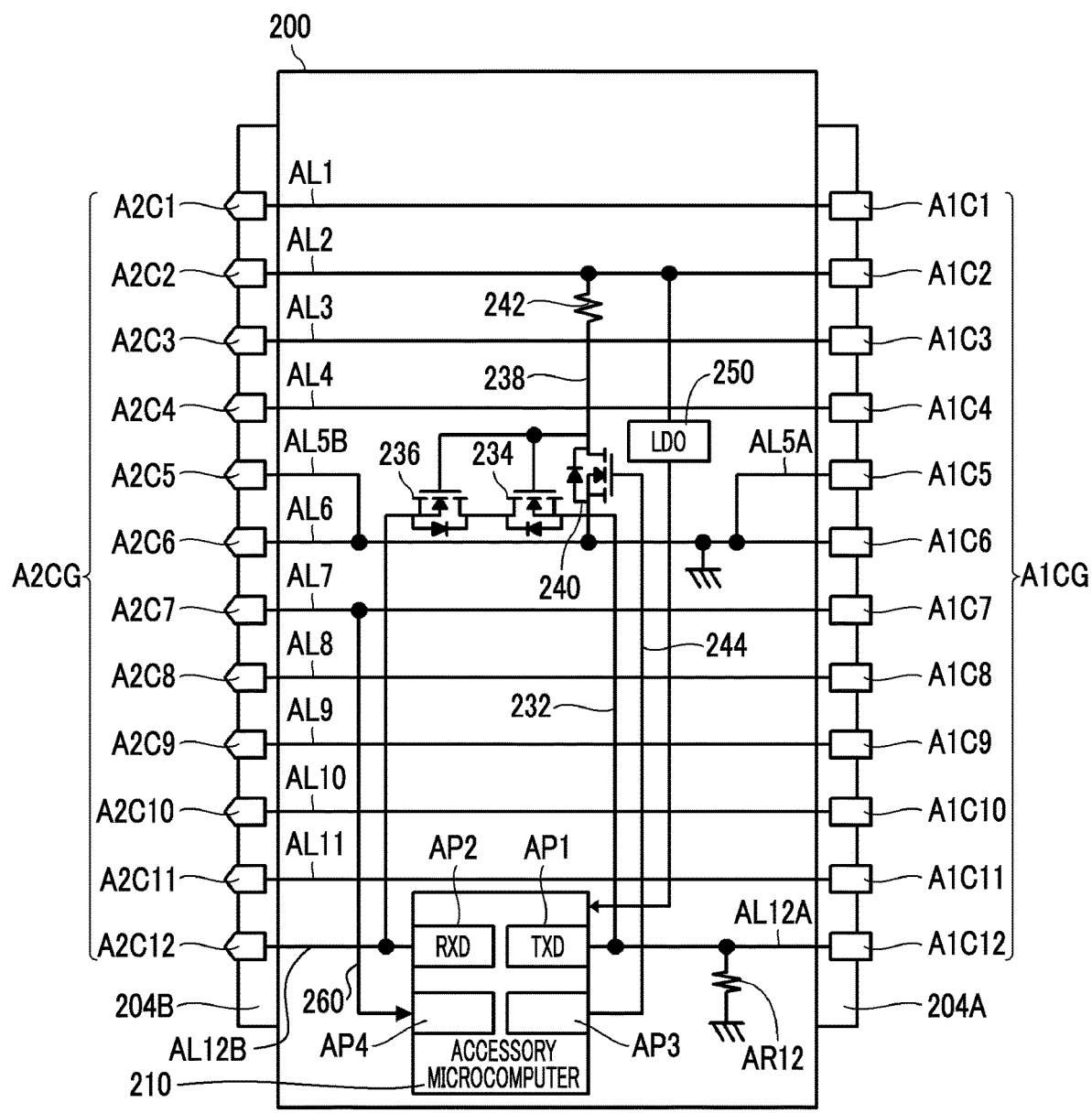
FIG. 13 is a diagram showing an electric configuration of an accessory.

FIG. 13 is a diagram showing an electric configuration of an accessory.

<Accessory-Side First Contact Group and Accessory-Side Second Contact Group>

(A) Accessory-Side First Contact Group

The accessory-side first mount 204A of the accessory 200 is provided with an accessory-side first contact group A1CG composed of a plurality of contacts A1C1 to A1C12. The accessory-side first contact group A1CG is provided corresponding to the camera-side contact group CCG. Therefore, the accessory-side first contact group A1CG is configured to have the same number of contacts as the contacts constituting the camera-side contact group CCG, and each of the contacts A1C1 to A1C12 is disposed at the same interval as the contacts CC1 to CC12 constituting the camera-side contact group CCG.

In the case where the accessory 200 is attached to the camera 10, each of the contacts A1C1 to A1C12 of the accessory-side first contact group A1CG is connected to the corresponding contacts CC1 to CC12 of the camera-side contact group CCG. That is, the first contact A1C1 of the accessory-side first contact group A1CG is connected to the first contact CC1 of the camera-side contact group CCG, the second contact A1C2 of the accessory-side first contact group A1CG is connected to the second contact CC2 of the camera-side contact group CCG, . . . , and the twelfth contact A1C12 of the accessory-side first contact group A1CG is connected to the twelfth contact CC12 of the camera-side contact group CCG.

Since the first contact CC1 of the camera-side contact group CCG constitutes the lens detection contact, the first contact A1C1 of the accessory-side first contact group A1CG also constitutes the lens detection contact.

Further, since the second contact CC2, the third contact CC3, and the fourth contact CC4 of the camera-side contact group CCG respectively constitute the power contacts, the second contact A1C2, the third contact A1C3, and the fourth contact A1C4 of the accessory-side first contact group A1CG also respectively constitute the corresponding power contacts.

The second contact A1C2 is a contact that supplies the lens-drive power LV1 having the lowest voltage, and the fourth contact A1C4 is a contact that supplies the lens-drive power LV3 having the highest voltage. Further, the third contact A1C3 is a contact that supplies the lens-drive power LV2 having the intermediate voltage.

Further, since the fifth contact CC5 and the sixth contact CC6 of the camera-side contact group CCG respectively constitute the ground contacts, the fifth contact A1C5 and the sixth contact A1C6 of the accessory-side first contact group A1CG also respectively constitute the corresponding ground contacts.

Furthermore, Since the seventh contact CC7 to the twelfth contact CC12 of the camera-side contact group CCG respectively constitute the communication contacts, the seventh contact A1C7 to the twelfth contact A1C12 of the accessory-side first contact group A1CG also respectively constitute the corresponding communication contacts. In particular, the twelfth contact A1C12 constitutes an accessory-side first extension communication contact. In a case where the accessory 200 is attached to the camera 10, the twelfth contact A1C12 is connected to the twelfth contact CC12 of the camera 10 which is the camera-side extension communication contact.

(B) Accessory-Side Second Contact Group

The accessory-side second mount 204B of the accessory 200 is provided with an accessory-side second contact group A2CG composed of a plurality of contacts A2C1 to A2C12. The accessory-side second contact group A2CG is provided corresponding to the lens-side contact group LCG. Therefore, the accessory-side second contact group A2CG is configured to have the same number of contacts as the contacts constituting the lens-side contact group LCG, and each of the contacts A2C1 to A2C12 is disposed at the same interval as the contacts CC1 to CC12 constituting the lens-side contact group LCG.

In a case where the interchangeable lens 100 is attached to the accessory 200, each of the contacts LC1 to LC12 of the lens-side contact group LCG is connected to the corresponding contacts A2C1 to A2C12 of the accessory-side second contact group A2CG. That is, the first contact LC1 of the lens-side contact group LCG is connected to the first contact A2C1 of the accessory-side second contact group A2CG, the second contact LC2 of the lens-side contact group LCG is connected to the second contact A2C2 of the accessory-side second contact group A2CG, . . . , and the twelfth contact LC12 of the lens-side contact group LCG is connected to the twelfth contact A2C12 of the accessory-side second contact group A2CG.

Since the first contact LC1 of the lens-side contact group LCG constitutes the lens detection contact, the first contact A2C1 of the accessory-side second contact group A2CG also constitutes the lens detection contact.

Further, since the second contact LC2, the third contact LC3, and the fourth contact LC4 of the lens-side contact group LCG respectively constitute the power contacts, the second contact A2C2, the third contact A2C3, and the fourth contact A2C4 of the accessory-side second contact group A2CG also respectively constitute the corresponding power contacts.

The second contact A2C2 is a contact that supplies the lens-drive power LV1 having the lowest voltage, and the fourth contact A2C4 is a contact that supplies the lens-drive power LV3 having the highest voltage. Further, the third contact A2C3 is a contact that supplies the lens-drive power LV2 having the intermediate voltage.

Further, since the fifth contact LC5 and the sixth contact LC6 of the lens-side contact group LCG respectively constitute the ground contacts, the fifth contact A2C5 and the sixth contact A2C6 of the accessory-side second contact group A2CG also respectively constitute the corresponding ground contacts.

Furthermore, since the seventh contact LC7 to the twelfth contact LC12 of the lens-side contact group LCG respectively constitute the communication contacts, the seventh contact A2C7 to the twelfth contact A2C12 of the accessory-side second contact group A2CG also respectively constitute the corresponding communication contacts. In particular, the twelfth contact A2C12 constitutes an accessory-side second extension communication contact. In a case where the interchangeable lens 100 is attached, the twelfth contact A2C12 is connected to the twelfth contact LC12 of the interchangeable lens 100 which is the lens-side extension communication contact.

<Relationship Between Accessory-Side First Contact Group and Accessory-Side Second Contact Group>

(A) First Contact

The first contact A1C1 constituting the lens detection contact in the accessory-side first contact group A1CG and the first contact A2C1 constituting the lens detection contact in the accessory-side second contact group A2CG are connected to each other by a first connection line AL1 in the accessory. Accordingly, it is possible to electrically connect the first contact CC1 of the camera 10 and the first contact LC1 of the interchangeable lens 100 also in a case where the accessory 200 is attached between the camera 10 and the interchangeable lens 100.

(B) Second Contact to Fourth Contact

The second contact A1C2 constituting the first power contact in the accessory-side first contact group A1CG and the second contact A2C2 constituting the first power contact in the accessory-side second contact group A2CG are connected to each other by a second connection line AL2 constituting an accessory-side power line in the accessory. Accordingly, it is possible to electrically connect the second contact CC2 of the camera 10 and the second contact LC2 of the interchangeable lens 100 also in the case where the accessory 200 is attached between the camera 10 and the interchangeable lens 100. In this case, the second connection line AL2 functions as a line that supplies the first lens-drive power LV1 having the lowest voltage from the camera 10 to the interchangeable lens 100.

The third contact A1C3 constituting the second power contact in the accessory-side first contact group A1CG and the third contact A2C3 constituting the second power contact in the accessory-side second contact group A2CG are connected to each other by a third connection line AL3 constituting the accessory-side power line in the accessory. Accordingly, it is possible to electrically connect the third contact CC3 of the camera 10 and the third contact LC3 of the interchangeable lens 100 also in the case where the accessory 200 is attached between the camera 10 and the interchangeable lens 100. In this case, the third connection line AL3 functions as a line that supplies the second lens-drive power LV2 having the intermediate voltage from the camera 10 to the interchangeable lens 100.

The fourth contact A1C4 constituting the third power contact in the accessory-side first contact group A1CG and the fourth contact A2C4 constituting the third power contact in the accessory-side second contact group A2CG are connected to each other by a fourth connection line AL4 constituting the accessory-side power line in the accessory. Accordingly, it is possible to electrically connect the fourth contact CC4 of the camera 10 and the fourth contact LC4 of the interchangeable lens 100 also in the case where the accessory 200 is attached between the camera 10 and the interchangeable lens 100. In this case, the fourth connection line AL4 functions as a line that supplies the third lens-drive power LV3 having the highest voltage from the camera 10 to the interchangeable lens 100.

(C) Fifth Contact and Sixth Contact

The sixth contact A1C6 constituting a second ground contact in the accessory-side first contact group A1CG and the sixth contact A2C6 constituting the second ground contact in the accessory-side second contact group A2CG are connected to each other by a sixth connection line AL6 constituting an accessory-side ground line in the accessory. Accordingly, it is possible to electrically connect the sixth contact CC6 of the camera 10 and the sixth contact LC6 of the interchangeable lens 100 also in the case where the accessory 200 is attached between the camera 10 and the interchangeable lens 100.

The fifth contact A1C5 constituting a first ground contact in the accessory-side first contact group A1CG and the fifth contact A2C5 constituting the first ground contact in the accessory-side second contact group A2CG are connected to the sixth connection line AL6 respectively through fifth connection lines AL5A and AL5B in the accessory. Accordingly, it is possible to electrically connect the fifth contact CC5 of the camera 10 and the fifth contact LC5 of the interchangeable lens 100 also in the case where the accessory 200 is attached between the camera 10 and the interchangeable lens 100.

(D) Seventh Contact to Twelfth Contact

The seventh contact A1C7 constituting the communication contact in the accessory-side first contact group A1CG and the seventh contact A2C7 constituting the communication contact in the accessory-side second contact group A2CG are connected to each other by a seventh connection line AL7 constituting an accessory-side communication line in the accessory. Accordingly, it is possible to electrically connect the seventh contact CC7 of the camera 10 and the seventh contact LC7 of the interchangeable lens 100 also in the case where the accessory 200 is attached between the camera 10 and the interchangeable lens 100.

An eighth contact A1C8 constituting the communication contact in the accessory-side first contact group A1CG and an eighth contact A2C8 constituting the communication contact in the accessory-side second contact group A2CG are connected to each other by an eighth connection line AL8 constituting an accessory-side communication line in the accessory. Accordingly, it is possible to electrically connect the eighth contact CC8 of the camera 10 and the eighth contact LC8 of the interchangeable lens 100 also in the case where the accessory 200 is attached between the camera 10 and the interchangeable lens 100.

A ninth contact A1C9 constituting the communication contact in the accessory-side first contact group A1CG and a ninth contact A2C9 constituting the communication contact in the accessory-side second contact group A2CG are connected to each other by a ninth connection line AL9 constituting an accessory-side communication line in the accessory. Accordingly, it is possible to electrically connect the ninth contact CC9 of the camera 10 and the ninth contact LC9 of the interchangeable lens 100 also in the case where the accessory 200 is attached between the camera 10 and the interchangeable lens 100.

A tenth contact A1C10 constituting the communication contact in the accessory-side first contact group A1CG and a tenth contact A2C10 constituting the communication contact in the accessory-side second contact group A2CG are connected to each other by a tenth connection line AL10 constituting an accessory-side communication line in the accessory. Accordingly, it is possible to electrically connect the tenth contact CC10 of the camera 10 and the tenth contact LC10 of the interchangeable lens 100 also in the case where the accessory 200 is attached between the camera 10 and the interchangeable lens 100.

An eleventh contact A1C11 constituting the communication contact in the accessory-side first contact group A1CG and an eleventh contact A2C11 constituting the communication contact in the accessory-side second contact group A2CG are connected to each other by an eleventh connection line AL11 constituting an accessory-side communication line in the accessory. Accordingly, it is possible to electrically connect the eleventh contact CC11 of the camera 10 and the eleventh contact CC11 of the interchangeable lens 100 also in the case where the accessory 200 is attached between the camera 10 and the interchangeable lens 100.

Here, since the ninth contact, the tenth contact, and the eleventh contact are the contacts used for the three-line serial communication, the ninth connection line AL9, the tenth connection line AL10, and the eleventh connection line AL11 are used for the three-line serial communication.

The twelfth contact A1C12 constituting the accessory-side first extension communication contact in the accessory-side first contact group A1CG and the twelfth contact A2C12 constituting the accessory-side second extension communication contact in the accessory-side second contact group A2CG are connected to an accessory microcomputer 210 in the accessory respectively through twelfth connection lines AL12A and AL12B.

<Accessory Microcomputer>

The accessory microcomputer 210 controls an operation of the accessory 200.

The accessory microcomputer 210 comprises a CPU, a ROM, and a RAM, and executes a prescribed program to provide various functions. The ROM stores various pieces of data and the like required for the control in addition to various programs executed by the CPU.

Figure 14:
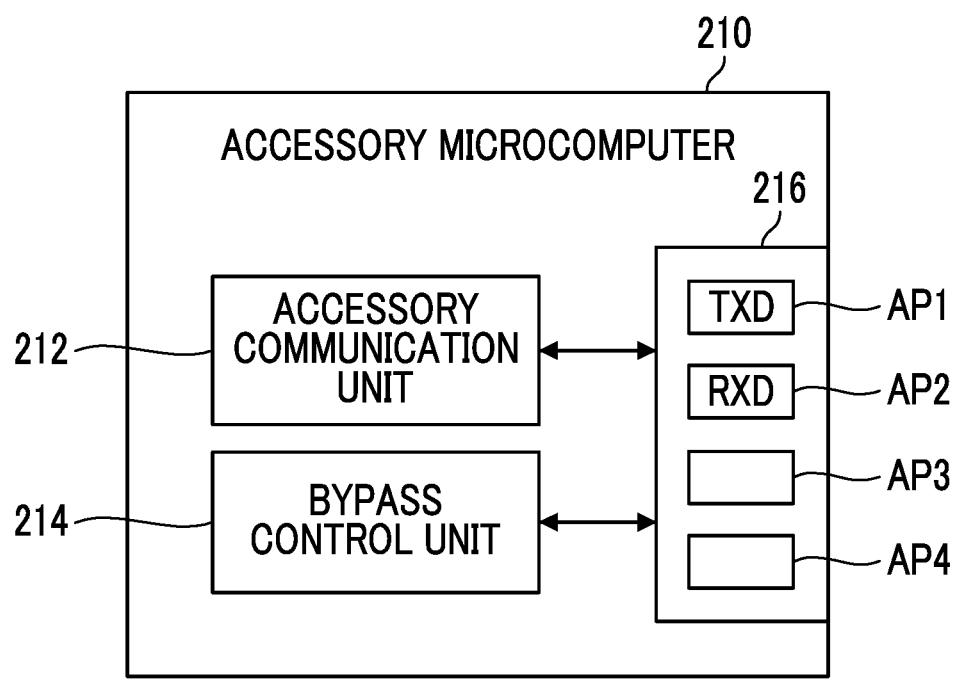
FIG. 14 is a block diagram showing an example of a function realized by an accessory microcomputer.

FIG. 14 is a block diagram showing an example of a function realized by an accessory microcomputer.

As shown in FIG. 14, the accessory microcomputer 210 executes the prescribed program to function as an accessory communication unit 212, a bypass control unit 214, and the like.

The accessory communication unit 212 communicates with the camera 10 and the interchangeable lens 100 to which the accessory 200 is attached. The communication is performed through an accessory microcomputer input and output port 216. The accessory microcomputer input and output port 216 comprises a first port AP1 and a second port AP2 for performing the single-line serial communication between the camera 10 and the interchangeable lens 100. The first port AP1 functions as the TXD port that outputs the data. The first port AP1 is connected to the twelfth contact A1C12 of the accessory-side first contact group A1CG through the twelfth connection line AL12A (refer to FIG. 13). The second port AP2 functions as the RXD port that receives the data. The second port AP2 is connected to the twelfth contact A2C12 of the accessory-side second contact group A2CG through the twelfth connection line AL12B (refer to FIG. 13).

Accordingly, the camera microcomputer 34 is connected to the accessory microcomputer 210 in a communicable manner through the twelfth contact CC12 of the camera-side contact group CCG and the twelfth contact A1C12 of the accessory-side first contact group A1CG. Further, the lens microcomputer 114 is connected to the accessory microcomputer 210 in a communicable manner through the twelfth contact LC12 of the lens-side contact group LCG and the twelfth contact A2C12 of the accessory-side second contact group A2CG.

The bypass control unit 214 is a control unit that controls on and off of a bypass mechanism for the camera microcomputer 34 and the lens microcomputer 114 to communicate without passing through the accessory microcomputer 210. The bypass mechanism is composed as follows.

<Bypass Mechanism>

(A) Configuration of Bypass Mechanism

As shown in FIG. 13, a bypass line 232 is connected between the twelfth contact A1C12 of the accessory-side first contact group A1CG and the twelfth contact A2C12 of the accessory-side second contact group A2CG so as to bypass the accessory microcomputer 210.

A first field-effect transistor (FET) 234 as a first switch and a second FET 236 as a second switch are connected to the bypass line 232.

A source contact of the first FET 234 is connected to the twelfth contact A1C12 of the accessory-side first contact group A1CG through the bypass line 232. Further, a drain contact of the first FET 234 is connected to a drain contact of the second FET 236 through the bypass line 232.

Further, a source contact of the second FET 236 is connected to the twelfth contact A2C12 of the accessory-side second contact group A2CG through the bypass line 232.

Gate contacts of the first FET 234 and the second FET 236 are respectively connected to a line 238 that connects the second connection line AL2 and the sixth connection line AL6.

The third FET 240 as a third switch and a pull-up resistor 242 are connected to the line 238.

As described above, since the second connection line AL2 functions as the line that supplies the first lens-drive power LV1 having the lowest voltage, the gate contacts of the first FET 234 and the second FET 236 connected to the line 238 are respectively pulled up to potential of the first lens-drive power LV1.

A drain contact of the third FET 240 is connected to the pull-up resistor 242 through the line 238. Further, a source contact of the third FET 240 is connected to the sixth connection line AL6 through the line 238. Since the sixth connection line AL6 functions as the ground line, the source contact of the third FET 240 is grounded.

Further, the gate contact of the third FET 240 is connected to the third port AP3 of the accessory microcomputer 210 through the line 244. The accessory microcomputer 210 functioning as the bypass control unit 214 controls the polarity (HIGH level or LOW level) of the third port AP3 to control the on and off of the bypass mechanism.

(B) Operation of Bypass Mechanism

In the case where the accessory 200 is attached, a mode in which the camera microcomputer 34 and the lens microcomputer 114 communicate with passing through the accessory microcomputer 210 is set as a normal communication mode, and a mode in which the camera microcomputer 34 and the lens microcomputer 114 communicate without passing through the accessory microcomputer 210 is set as the bypass mode. The bypass mechanism is turned off in the normal communication mode, and the bypass mechanism is turned on in the bypass mode.

(1) Normal Communication Mode

The bypass mechanism is turned off in the normal communication mode. In this case, the accessory microcomputer 210 sets the polarity of the third port AP3 of the accessory microcomputer input and output port 216 thereof to the HIGH level. Accordingly, the gate contact of the third FET 240 is set to the HIGH level, and the third FET 240 as the switch is turned on.

On the other hand, the third FET 240 as the switch is turned on to respectively set the gate contacts of the first FET 234 and the second FET 236 to the LOW level. Accordingly, the first FET 234 and the second FET 236 as the switch are turned off. As a result, the bypass line 232 is disconnected, and the bypass mechanism is turned off.

Accordingly, the camera microcomputer 34 and the lens microcomputer 114 are communicable through the accessory microcomputer 210. More specifically, the accessory microcomputer 210 and the camera microcomputer 34 are connected in a communicable manner, and the accessory microcomputer 210 and the lens microcomputer 114 are connected in a communicable manner.

The communication herein is the single-line serial communication (unidirectional start-stop synchronous serial communication by single-line). In this case, the data is transmitted from the lens microcomputer 114 to the accessory microcomputer 210, and the data is transmitted from the accessory microcomputer 210 to the camera microcomputer 34.

(2) Bypass Mode

The bypass mechanism is turned on in the bypass mode. In this case, the accessory microcomputer 210 sets the polarity of the third port AP3 of the accessory microcomputer input and output port 216 thereof to the LOW level. Accordingly, the third FET 240 as the switch is turned off.

On the other hand, in the case where the third FET 240 as the switch is turned off, the gate contacts of the first FET 234 and the second FET 236 are respectively set to the HIGH level. Accordingly, the first FET 234 and the second FET 236 as the switch are turned on. As a result, the bypass line 232 is conductive, and the bypass mechanism is turned on.

Accordingly, the setting is made that the camera microcomputer 34 and the lens microcomputer 114 can directly communicate without passing through the accessory microcomputer 210.

<Accessory-Side System Power Generation Unit>

System power for operating the accessory microcomputer 210 is generated by an accessory-side system power generation unit 250 provided in the accessory. The accessory-side system power generation unit 250 generates the system power of the accessory microcomputer 210 by using the lens-drive power to be supplied from the camera 10 similarly to the lens-side system power generation unit 112 provided in the interchangeable lens 100.

Here, the accessory microcomputer 210 is configured to operate at a voltage lower than each drive unit constituting the lens drive unit 110 provided in the interchangeable lens 100. For example, the accessory microcomputer 210 is configured to operate at +3.3 V.

The accessory-side system power generation unit 250 generates the system power (+3.3 V) of the accessory microcomputer 210 by using the lens-drive power LV1 (+5 V) having the lowest voltage among the plurality of pieces of lens-drive power LV1 to LV3 to be supplied from the camera 10. Therefore, the accessory-side system power generation unit 250 is connected to a second connection line AL2 connected to a second contact which is the power contact.

The accessory-side system power generation unit 250 generates the system power by the voltage drop caused by the resistor similarly to the lens-side system power generation unit 112. Accordingly, it is possible to prevent the occurrence of the noise accompanied by the generation of the system power. The accessory-side system power generation unit 250 is composed of, for example, the LDO regulator.

<Another Configuration>

The twelfth contact A1C12 of the accessory-side first contact group A1CG is grounded through a pull-down resistor AR12 and is pulled down to the ground potential. Accordingly, in the case where the accessory 200 is attached to the camera 10, the twelfth contact CC12 of the camera 10 is set to the LOW level (second polarity). The camera microcomputer 34 can detect that the accessory 200 is attached to the camera 10 by detecting that the twelfth contact CC12 is at the LOW level (second polarity).

The pull-down resistor AR12 to be connected to the twelfth contact A1C12 of the accessory-side first contact group A1CG has a resistance value larger than a pull-up resistor LR12 connected to the twelfth contact LC12 of the interchangeable lens 100. For example, the pull-up resistor LR12 connected to the twelfth contact LC12 of the interchangeable lens 100 is configured to be 2.2 kΩ, and the pull-down resistor AR12 connected to the twelfth contact A1C12 of the accessory-side first contact group A1CG is configured to be 220 kΩ. Accordingly, for example, even in a case where a mode of the accessory 200 is set to the bypass mode, it is possible to set the twelfth contact CC12 of the camera 10 to the LOW level (second polarity).

In this case, the pull-up resistor LR12 connected to the twelfth contact LC12 (lens-side extension communication contact) of the interchangeable lens 100 functions as a lens-side extension communication contact polarity setting unit, and the pull-down resistor AR12 connected to the twelfth contact A1C12 (accessory-side first extension communication contact) of the accessory 200 functions as an accessory-side first extension communication contact polarity setting unit. Further, the camera microcomputer 34 functions as an accessory detection unit. The camera microcomputer 34 executes a predetermined program to provide the function as the accessory detection unit.

Further, the accessory microcomputer input and output port 216 of the accessory microcomputer 210 comprises a fourth port AP4. The fourth port AP4 functions as a communication port for input and is connected to the seventh connection line AL7 through a line 260. Accordingly, the accessory microcomputer 210 can receive the information to be transmitted through the seventh connection line AL7.

[Action of Camera System]

Figure 15:
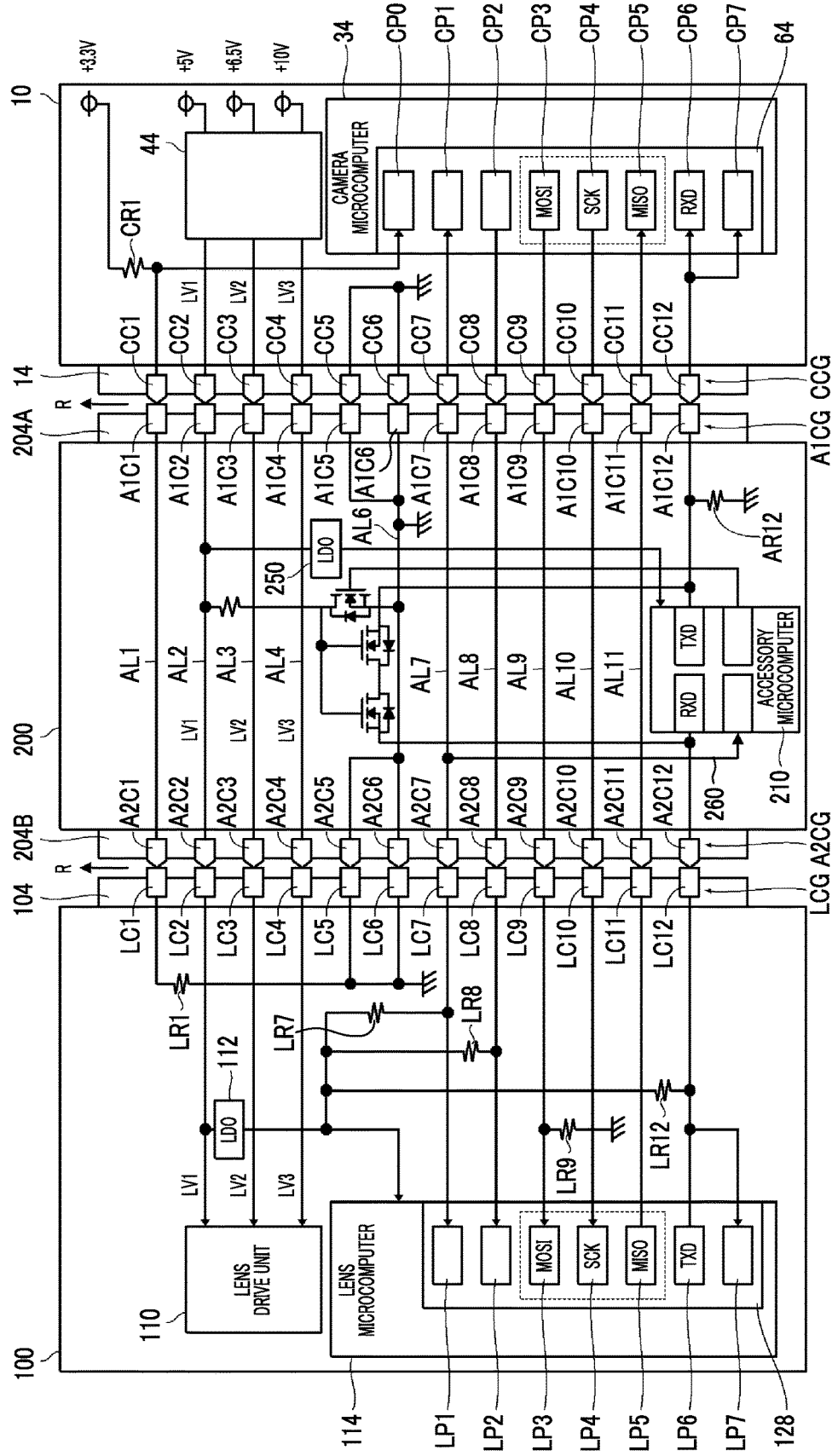
FIG. 15 is a diagram showing a mutual electric connection in a case where the accessory is attached between the camera and the interchangeable lens.

FIG. 15 is a diagram showing a mutual electric connection in a case where the accessory is attached between the camera and the interchangeable lens.

«Attachment of Accessory»

The accessory-side first mount 204A provided in the accessory 200 is attached to the camera-side mount 14 provided in the camera 10 to attach the accessory 200 to the camera 10. In this case, the accessory 200 is rotated with respect to the camera 10 for the attachment.

Further, the lens-side mount 104 provided in the interchangeable lens 100 is attached to the accessory-side second mount 204B provided in the accessory 200 to attach the interchangeable lens 100 to the accessory 200. In this case, the interchangeable lens 100 is rotated with respect to the accessory 200 for the attachment.

Accordingly, the accessory 200 is attached between the interchangeable lens 100 and the camera 10. The lens-side contact group LCG of the interchangeable lens 100 is connected to the accessory-side second contact group A2CG of the accessory 200 due to the attachment of the accessory 200 therebetween. Further, the camera-side contact group CCG of the camera 10 is connected to the accessory-side first contact group A1CG of the accessory 200.

«Electric Connection between Camera and Interchangeable Lens»

(A) First Contact

The first contact CC1 of the camera 10 which is the lens detection contact is electrically connected to the first contact LC1 of the interchangeable lens 100 through the first connection line AL1 of the accessory 200 due to the attachment of the accessory 200 therebetween. Accordingly, the attachment of the interchangeable lens 100 can be detected in the camera 10.

(B) Second Contact to Fourth Contact

The second contact CC2 of the camera 10 which is the first power contact is electrically connected to the second contact LC2 of the interchangeable lens 100 through the second connection line AL2 of the accessory 200 due to the attachment of the accessory 200 therebetween. Further, the third contact CC3 of the camera 10 which is the second power contact is electrically connected to the third contact LC3 of the interchangeable lens 100 through the third connection line AL3 of the accessory 200. Further, the fourth contact CC4 of the camera 10 which is the third power contact is electrically connected to the fourth contact LC4 of the interchangeable lens 100 through the fourth connection line AL4 of the accessory 200.

Accordingly, it is possible to supply the pieces of lens-drive power LV1, LV2, and LV3 from the camera 10 to the interchangeable lens 100.

(C) Fifth Contact and Sixth Contact

The fifth contact CC5 and the sixth contact CC6 of the camera 10 which are the ground contacts are electrically connected to the fifth contact LC5 and the sixth contact LC6 of the interchangeable lens 100 through the fifth connection lines AL5A and AL5B and the sixth connection line AL6 of the accessory 200 due to the attachment of the accessory 200 therebetween.

(D) Seventh Contact to Twelfth Contact

The seventh contact CC7 to the eleventh contact CC11 of the camera 10 which are the communication contacts are electrically connected to the seventh contact LC7 to the eleventh contact LC11 of the interchangeable lens 100 through the seventh connection line AL7 to the eleventh connection line AL11 of the accessory 200 due to the attachment of the accessory 200 therebetween. Accordingly, the three-line serial communication or the like is possible between the camera 10 and the interchangeable lens 100.

Further, the twelfth contact CC12 of the camera 10 which is the camera-side extension communication contact is electrically connected to the accessory microcomputer 210 through the twelfth contact A1C12 of the accessory 200 which is the accessory-side first extension communication contact and the twelfth connection line AL12A due to the attachment of the accessory 200 therebetween. Further, the twelfth contact LC12 of the interchangeable lens 100 which is the lens-side extension communication contact is electrically connected to the accessory microcomputer 210 through the twelfth contact A2C12 of the accessory 200 which is the accessory-side second extension communication contact and the twelfth connection line AL12B. Accordingly, the communication is possible between the camera microcomputer 34 and the accessory microcomputer 210, and between the lens microcomputer 114 and the accessory microcomputer 210.

«Detection of Accessory Attachment»

As described above, the camera microcomputer 34 can detect the presence or absence of the attachment of the accessory 200 by discriminating the polarity of the twelfth contact CC12.

As described above, in the case where the accessory 200 is attached to the camera 10, the twelfth contact CC12 of the camera 10 is set to the LOW level. The camera microcomputer 34 determines that the accessory 200 is attached to the camera 10 by detecting that the twelfth contact CC12 is at the LOW level.

«Activation of Accessory Microcomputer»

In a case where the pieces of lens-drive power LV1, LV2, and LV3 are supplied from the camera 10 to the interchangeable lens 100, a part of the pieces of power is supplied to the accessory-side system power generation unit 250. Specifically, the first lens-drive power LV1 (+5 V) having the lowest voltage is supplied to the accessory-side system power generation unit 250. The accessory-side system power generation unit 250 generates the system power (+3.3 V) of the accessory microcomputer 210 by using the supplied lens-drive power LV1 and supplies the generated system power to the accessory microcomputer 210. Accordingly, the accessory microcomputer 210 is activated.

«Acquisition of Accessory Information»

In a case where the camera 10 and the interchangeable lens 100 comprise the function of communicating with the accessory 200, accessory information is transmitted from the accessory 200 to the camera 10.

Here, the accessory information refers to information indicating a specification of the accessory 200. The accessory information includes, for example, accessory model data, accessory attachment position data, optical correction data, and the like. The accessory model data includes, for example, an accessory model name, an accessory type, a maker name, the product ID, and the like. The accessory attachment position data includes data on a valid attachment position of the accessory, data on the number of attachments, and the like. The optical correction data includes correction data of an image in the case where the accessory is attached and the like. The accessory information is stored in the ROM of the accessory microcomputer 210. The accessory 200 communicates with the camera microcomputer 34 and transmits the accessory information to the camera microcomputer 34.

In this case, the accessory microcomputer 210 adds the accessory information to the lens information acquired in advance and transmits the accessory information to the camera microcomputer 34. That is, the accessory microcomputer 210 communicates with the lens microcomputer 114 to acquire the lens information from the lens microcomputer 114 before communicating with the camera microcomputer 34 to transmit the accessory information to the camera microcomputer 34. The accessory microcomputer 210 adds the accessory information to the acquired lens information and transmits the added information to the camera microcomputer 34.

The acquisition of the lens information and the accessory information in such a method can be realized only in a case where both the camera 10 and the interchangeable lens 100 comprise the function of communicating with the accessory 200.

In a case where the camera 10 and the interchangeable lens 100 are attached, the presence or absence of the function of communicating with the accessory 200 is determined in both the camera 10 and the interchangeable lens 100 as the determination of the presence or absence of the compatibility.

A specific determination method is the same as the method described in the first embodiment. That is, the polarities of the eleventh contact CC11 on the camera side which is the camera-side communication contact and the eleventh contact LC11 on the interchangeable lens side which is the lens-side communication contact are detected, and it is determined that there is the compatibility in the case where the polarities of both contacts are at the HIGH level. That is, it is determined that both the camera 10 and the interchangeable lens 100 comprise the function of communicating with the accessory 200.

The polarity setting is performed as follows. That is, in a case where the camera 10 comprises the function of communicating with the accessory 200, the polarity of the eleventh contact CC11 is set to the HIGH level (first polarity) on the camera side. On the other hand, in a case where the camera 10 does not comprise the function of communicating with the accessory 200, the polarity of the eleventh contact CC11 is set to the LOW level (second polarity). Further, in a case where the interchangeable lens 100 comprises the function of communicating with the accessory 200, the polarity of the eleventh contact LC11 is set to the HIGH level (first polarity) on the interchangeable lens side. On the other hand, in a case where the interchangeable lens 100 does not comprise the function of communicating with the accessory 200, the polarity of the eleventh contact LC11 is set to the LOW level (second polarity).

In this case, the polarities of the eleventh contact CC11 and the eleventh contact LC11 are at the HIGH level (first polarity) only in a case where both the camera 10 and the interchangeable lens 100 comprise the function of communicating with the attached accessory 200.

The acquisition processing of the lens information and the accessory information is performed by the following procedure.

In the compatibility determination described above, in a case where it is determined that both the camera 10 and the interchangeable lens 100 comprise the function of communicating with the accessory 200, the lens microcomputer 114 outputs the lens information from the sixth communication port LP6 (TXD port).

The lens information output from the sixth communication port LP6 of the lens microcomputer 114 is transmitted to the camera-side through the twelfth contact LC12 which is the lens-side extension communication contact.

The lens information transmitted to the camera-side is received by the accessory microcomputer 210 through the twelfth contact A2C12 of the accessory-side second contact group A2CG of the accessory 200.

In a case where the lens information is received from the interchangeable lens 100, the accessory microcomputer 210 adds own accessory information to the lens information and transmits the information to the camera 10. The transmitted information (lens information +accessory information) is output from the twelfth contact A1C12 of the accessory-side first contact group A1CG of the accessory 200 and is received by the camera microcomputer 34 through the twelfth contact CC12 of the camera 10.

Accordingly, the camera 10 can acquire the pieces of information on the attached accessory 200 and the interchangeable lens 100 at the same time.

In a case where the interchangeable lens 100 is directly attached to the camera 10 while no accessory 200 is attached and it is determined that there is the compatibility, only the lens information is transmitted to the camera 10 similarly to the first embodiment described above.

«Communication Setting»

Similarly to the camera system 1 of the first embodiment described above, the communication setting is performed in both the camera 10 and the interchangeable lens 100 after the determination of the presence or absence of the compatibility. The communication setting is performed in parallel with the acquisition processing of the lens information and the accessory information described above. Accordingly, it is possible to speed up activation.

«Switching of Usage of Camera-Side Extension Communication Contact and Lens-Side Extension Communication Contact»

Similarly to the camera system 1 of the first embodiment described above, after the lens information and the accessory information are acquired, the camera-side extension communication contact (twelfth contact CC12) and the lens-side extension communication contact (twelfth contact LC12) are used for another usage. Specifically, the contacts are used as contacts for notifying the camera 10 of a state of the interchangeable lens 100 from the interchangeable lens 100. In this case, the accessory 200 is switched to the bypass mode. Accordingly, the camera 10 can directly communicate with the interchangeable lens 100 without passing through the accessory 200.

Another Embodiment

[Determination Target]

In a case where the presence or absence of the compatibility is determined, the function to be the determination target is not particularly limited. The presence or absence of the support for the function set in advance is determined.

[Detection of Accessory]

In the embodiment described above, the lens information is transmitted from the lens to the camera and the accessory information is added to the lens information to detect the presence or absence of the attachment of the accessory and the type of the accessory. However, the detection processing of the accessory may be performed separately from the acquisition of the lens information. For example, data for accessory detection not including the lens information may be transmitted from the lens to the camera and the accessory information may be added to the data for accessory detection to detect the presence or absence of the attachment of the accessory and the type of the accessory. In this case, the lens information is separately acquired. For example, the lens information is acquired by the three-line serial communication. In this case, a transmission request of the lens information is transmitted from the camera side to the lens side. The lens-side transmits the lens information to the camera-side in response to the transmission request.

[Configuration of Camera-Side Communication Contact and Lens-Side Communication Contact]

In the embodiment described above, in order to make the compatibility determination based on the polarity of the contact possible, both the camera-side communication contact and the lens-side communication contact are composed of the contacts in which the open drain output is possible. However, the configuration for making the compatibility determination based on the polarity of the contact possible is not limited thereto. In addition, for example, the same function can be realized by constituting both the camera-side communication contact and the lens-side communication contact with contacts in which an open collector output is possible. Further, the same function can be realized by constituting one of the camera-side communication contact and the lens-side communication contact with the contact in which the open drain output is possible and by constituting the other thereof with the contact in which the open collector output is possible.

[Enhancement of Lens-Drive power]

The power supply unit 42 may comprise a function of enhancing a supplying capacity of specific power (supplying capacity enhancement function) so as to be able to enhance the supplying capacity of the lens-drive power. In this case, the power supply unit 42 enhances the supplying capacity of the lens-drive power having the highest voltage among the plurality of pieces of lens-drive power to be supplied.

It may be adopted a form of increasing the voltage to be supplied and/or a form of increasing a current amount to be supplied as a form for enhancing the supplying capacity.

The camera microcomputer 34 enhances the supplying capacity of the lens-drive power having the highest voltage as necessary. For example, in a case where an interchangeable lens whose drive performance is improved by enhancing the supplying capacity of the lens-drive power is attached, the supplying capacity of the lens-drive power having the highest voltage is enhanced.

Whether a lens is the interchangeable lens whose drive performance is improved by enhancing the supplying capacity of the lens-drive power is different for each interchangeable lens. Information on the interchangeable lens whose drive performance is improved by enhancing the supplying capacity of the lens-drive power is stored in the ROM of the lens microcomputer 114 and is transmitted to the camera 10 including the lens information.

The camera microcomputer 34 determines whether an attached interchangeable lens is the interchangeable lens whose drive performance is improved by enhancing the supplying capacity of the lens-drive power based on the acquired lens information. That is, it is discriminated whether the supplying of the lens-drive power with enhanced supplying capacity is necessary. In a case where it is discriminated that the supplying of the lens-drive power with enhanced supplying capacity is necessary, the supplying capacity enhancement function of the power supply unit 42 is operated. Accordingly, the lens-drive power with enhanced supplying capacity is supplied from the power supply unit 42. In this case, as described above, the supplying capacity of the lens-drive power having the highest voltage is enhanced and supplied.

In this manner, it is possible to appropriately supply the power required for each interchangeable lens by enhancing the supplying capacity of the lens-drive power as necessary. Further, accordingly, it is possible to achieve high performance of the interchangeable lens.

[Configuration of Camera System]

The camera is composed of the digital camera in the embodiment described above, but the invention may also be employed for a so-called silver salt camera.

The interchangeable lens provided with the AF function and the stop is described as an example of the interchangeable lens in the embodiment described above, the function provided in the interchangeable lens is not limited thereto. In addition, for example, an electric zoom function and the like may be provided. In an interchangeable lens provided with the electric zoom function, a zoom drive unit that drives a zoom lens which is an optical member for zoom is provided.

As described above, a known accessory such as the extender or the extension tube the accessory may be adopted as the accessory. In a case where the accessory is provided with the drive unit, the drive unit is driven by using the lens-drive power similarly to the case of the interchangeable lens.

[Type of Lens-Drive Power]

A type of the lens-drive power to be supplied from the camera to the interchangeable lens is set as appropriate depending on an interchangeable lens constituting the camera system. For example, in a case where one of the interchangeable lenses constituting the camera system comprises four optical member drive units (for example, focus drive unit, camera shake correction mechanism drive unit, stop drive unit, and zoom drive unit) and each optical member drive unit operates at a different operation voltage, four types of the lens-drive power are supplied from the camera. In this case, four contacts as the power contacts are provided in the camera-side contact group and the lens-side contact group.

[Ground Contact]

The two ground contacts are provided in the embodiment described above, but one ground contact may be provided. As in the camera system of the embodiment described above, it is possible to more stably supply the power by comprising the plurality of ground contacts.

The independent two ground contacts are provided in the embodiment described above, the two ground contacts may be connected to each other. Accordingly, it is possible to enlarge the area of the contact and thus to more stably supply the power.

[Detection of Normal Supplying of System Power to Lens Microcomputer]

In the embodiment described above, the polarities of the specific contacts are discriminated and the normal supplying of the system power to the lens microcomputer is detected. However, at least one contact for discriminating the polarity may be used. That is, at least one contact may be pulled up to the potential of the system power through the pull-up resistor on the interchangeable lens side. In this case, at least one contact excluding the power contact and the ground contact is used as the contact for detection.

As in the camera system 1 of the embodiment described above, it is possible to more accurately detect that the system power is normally supplied to the lens microcomputer by discriminating the polarities of the plurality of contacts.

[Configuration of Performing Various Pieces of Processing]

The camera control unit performing the various pieces of processing is composed of the microcomputer (camera microcomputer) in the embodiment described above, but a hardware configuration for performing the various pieces of processing is not limited thereto. The hardware configuration may be composed of various processors. The various processors include a CPU which is a general processor functioning as a processing unit that performs various pieces of processing by executing software (program), a programmable logic device (PLD) which is a processor whose circuit configuration can be changed after manufacturing such as a field programmable gate array (FPGA), an exclusive electric circuit which is a processor having a circuit configuration that is exclusively designed for executing specific processing such as an application specific integrated circuit (ASIC), and the like.

One processing unit may be composed of one of these various processors or may be composed of two processors or more having the same type or different types. For example, one processing unit may be composed of a plurality of FPGAs or may be composed of a combination of the CPU and the FPGA.

Further, a plurality of processing units may be composed as one processor. A first example of constituting the plurality of processing units as one processor is a form in which one processor is composed of a combination of one or more CPUs, as represented by computers such as a client and a server, and software, and this processor functions as the plurality of processing units. A second example thereof is a form in which a processor, as represented by a system on chip (SoC) or the like, that realizes the functions of the entire system including the plurality of processing units by one integrated circuit (IC) chip is used. In this manner, the various processing units are composed by using one or more processors of the various processors described above as the hardware configuration.

Furthermore, more specifically, the hardware configuration of these various processors is an electric circuit that combines circuit elements such as semiconductor elements.

EXPLANATION OF REFERENCES

1: camera system
10: camera
12: camera body
14: camera-side mount
16: image sensor
18: shutter
20: image sensor drive unit
22: shutter drive unit
24: analog signal processing unit
26: display unit
28: image data storage unit
30: camera operation unit
32: power source unit
34: camera microcomputer
40: battery
42: power supply unit
44: lens-drive power switch unit
50: digital signal processing unit
52: display control unit
54: recording control unit
56: power control unit
58: lens-drive power switch control unit
60: lens attachment detection unit
62: camera communication unit
64: camera microcomputer input and output port
70: camera-side communication contact polarity setting unit
72: camera-side determination unit
100: interchangeable lens
102: lens barrel 104: lens-side mount
106A: focus lens
106C: stop
110: lens drive unit
110A: focus drive unit
110C: stop drive unit
112: lens-side system power generation unit
114: lens microcomputer
120: focus drive control unit
124: stop drive control unit
126: lens communication unit
128: lens microcomputer input and output port
130: lens-side communication contact polarity setting unit
132: lens-side determination unit
200: accessory
202: accessory body
204A: accessory-side first mount
204B: accessory-side second mount
210: accessory microcomputer
212: accessory communication unit
214: bypass control unit
216: accessory microcomputer input and output port
232: bypass line
234: first FET
236: second FET
238: line
240: third FET
242: pull-up resistor
244: line
250: accessory-side system power generation unit
260: line
A1CG: accessory-side first contact group
A1C1: first contact constituting accessory-side first contact group
A1C2: second contact constituting accessory-side first contact group
A1C3: third contact constituting accessory-side first contact group
A1C4: fourth contact constituting accessory-side first contact group
A1C5: fifth contact constituting accessory-side first contact group
A1C6: sixth contact constituting accessory-side first contact group
A1C7: seventh contact constituting accessory-side first contact group
A1C8: eighth contact constituting accessory-side first contact group
A1C9: ninth contact constituting accessory-side first contact group
A1C10: tenth contact constituting accessory-side first contact group
A1C11: eleventh contact constituting accessory-side first contact group
A1C12: twelfth contact constituting accessory-side first contact group
A2CG: accessory-side second contact group
A2C1: first contact constituting accessory-side second contact group
A2C2: second contact constituting accessory-side second contact group
A2C3: third contact constituting accessory-side second contact group
A2C4: fourth contact constituting accessory-side second contact group
A2C5: fifth contact constituting accessory-side second contact group
A2C6: sixth contact constituting accessory-side second contact group
A2C7: seventh contact constituting accessory-side second contact group
A2C8: eighth contact constituting accessory-side second contact group
A2C9: ninth contact constituting accessory-side second contact group
A2C10: tenth contact constituting accessory-side second contact group
A2C11: eleventh contact constituting accessory-side second contact group
A2C12: twelfth contact constituting accessory-side second contact group
ALL first connection line of accessory
AL2: second connection line of accessory
AL3: third connection line of accessory
AL4: fourth connection line of accessory
AL5A: fifth connection line of accessory
AL5B: fifth connection line of accessory
AL6: sixth connection line of accessory
AL7: seventh connection line of accessory
AL8: eighth connection line of accessory
AL9: ninth connection line of accessory
AL10: tenth connection line of accessory
AL11: eleventh connection line of accessory
AL12A: twelfth connection line of accessory
AL12B: twelfth connection line of accessory
AP1: first port of accessory microcomputer
AP2: second port of accessory microcomputer
AP3: third port of accessory microcomputer
AP4: fourth port of accessory microcomputer
AR12: pull-down resistor
CCG: camera-side contact group
CC1: first contact constituting camera-side contact group
CC2: second contact constituting camera-side contact group
CC3: third contact constituting camera-side contact group
CC4: fourth contact constituting camera-side contact group
CC5: fifth contact constituting camera-side contact group
CC6: sixth contact constituting camera-side contact group
CC7: seventh contact constituting camera-side contact group
CC8: eighth contact constituting camera-side contact group
CC9: ninth contact constituting camera-side contact group
CC10: tenth contact constituting camera-side contact group
CC11: eleventh contact constituting camera-side contact group
CC12: twelfth contact constituting camera-side contact group
CP0: lens detection port of camera microcomputer
CP1: first communication port of camera microcomputer
CP2: second communication port of camera microcomputer
CP3: third communication port of camera microcomputer
CP4: fourth communication port of camera microcomputer
CP5: fifth communication port of camera microcomputer
CP6: sixth communication port of camera microcomputer
CP7: seventh communication port of camera microcomputer
CR1: pull-up resistor
LCG: lens-side contact group
LC1: first contact constituting lens-side contact group
LC2: second contact constituting lens-side contact group
LC3: third contact constituting lens-side contact group
LC4: fourth contact constituting lens-side contact group
LC5: fifth contact constituting lens-side contact group
LC6: sixth contact constituting lens-side contact group
LC7: seventh contact constituting lens-side contact group
LC8: eighth contact constituting lens-side contact group LC9: ninth contact constituting lens-side contact group
LC10: tenth contact constituting lens-side contact group
LC11: eleventh contact constituting lens-side contact group
LC12: twelfth contact constituting lens-side contact group
LP1: first communication port of lens microcomputer
LP2: second communication port of lens microcomputer
LP3: third communication port of lens microcomputer
LP4: fourth communication port of lens microcomputer
LP5: fifth communication port of lens microcomputer
LP6: sixth communication port of lens microcomputer
LP7: seventh communication port of lens microcomputer
LR1: pull-down resistor
LR7: pull-up resistor
LR8: pull-up resistor
LR9: pull-down resistor
LR12: pull-up resistor
LV1: first lens-drive power
LV2: second lens-drive power
LV3: third lens-drive power
R: rotation direction

What is claimed is:

1. An interchangeable lens to be attachably and detachably attached to a camera, the interchangeable lens comprising:
   a lens-side communication contact configured to be connected to a camera-side communication contact provided in the camera; and
   a lens-side processor configured to:
      set a polarity of the lens-side communication contact to a first polarity in a case where the interchangeable lens supports a specific function, and set the polarity of the lens-side communication contact to a second polarity in a case where the interchangeable lens does not support the specific function; and
      in a case where the polarity of the lens-side communication contact is set to the first polarity, in a state where the camera-side communication contact and the lens-side communication contact are connected to each other, keep setting of the polarity of the lens-side communication contact unchanged when it is detected that a polarity of the camera-side communication contact is set to the first polarity, and change setting of the polarity of the lens-side communication contact to the second polarity when it is detected that the polarity of the camera-side communication contact is not set to the first polarity.

2. The interchangeable lens according to claim 1,
   wherein the lens-side communication contact is one of a plurality of contacts to be used for serial communication between the interchangeable lens and the camera, and
   wherein the lens-side processor detects the polarity of the lens-side communication contact, determines whether or not the camera supports the specific function based on the detected polarity, and then performs a communication setting of the plurality of contacts to be used for the serial communication with the camera.

3. The interchangeable lens according to claim 2,
   wherein the lens-side processor performs the communication setting of the plurality of contacts to be used for the serial communication with the camera after a fixed period of time has passed since it is determined whether or not the camera supports the specific function.

4. A camera to which an interchangeable lens is attachably and detachably attached, the camera comprising:
   a camera-side communication contact configured to be connected to a lens-side communication contact provided in the interchangeable lens; and
   a camera-side processor configured to:
      set a polarity of the camera-side communication contact to a first polarity in a case where the camera supports a specific function, and set the polarity of the camera-side communication contact to a second polarity in a case where the camera does not support the specific function; and
      in a case where the polarity of the camera-side communication contact is set to the first polarity, in a state where the camera-side communication contact and the lens-side communication contact are connected to each other, keep setting of the polarity of the camera-side communication contact unchanged when it is detected that a polarity of the lens-side communication contact is set to the first polarity, and change setting of the polarity of the camera-side communication contact to the second polarity when it is detected that the polarity of the lens-side communication contact is not set to the first polarity.

5. The camera according to claim 4,
   wherein the camera-side communication contact is one of a plurality of contacts to be used for serial communication between the camera and the interchangeable lens, and
   wherein the camera-side processor detects the polarity of the camera-side communication contact, determines whether or not the interchangeable lens supports the specific function based on the detected polarity, and then performs a communication setting of the plurality of contacts to be used for the serial communication with the interchangeable lens.

6. The camera according to claim 5,
   wherein the camera-side processor performs the communication setting of the plurality of contacts to be used for the serial communication with the interchangeable lens after a fixed period of time has passed since it is determined whether or not the interchangeable lens supports the specific function.

7. A camera system including a camera and an interchangeable lens configured to be attachably and detachably attached to the camera,
   wherein the camera comprises:
      a camera-side communication contact; and
      a camera-side processor configured to set a polarity of the camera-side communication contact to a first in a case where the camera supports a specific function, and set the polarity of the camera-side communication contact to a second polarity in a case where the camera does not support the specific function,
   wherein the interchangeable lens comprises:
      a lens-side communication contact configured to be connected to the camera-side communication contact; and
      a lens-side processor configured to set a polarity of the lens-side communication contact to the first polarity in a case where the interchangeable lens supports the specific function, and set the polarity of the lens-side communication contact to the second polarity in a case where the interchangeable lens does not support the specific function, and
   wherein, in a state where the camera-side communication contact and the lens-side communication contact are connected to each other, in a case where it is detected that both of the polarity of the camera-side communication contact and the polarity of the lens-side communication contact are set to the first polarity, the camera-side processor and the lens-side processor keep the polarity of the camera-side communication contact and the polarity of the lens-side communication contact unchanged, and in a case where it is detected that at least one of the polarity of the camera-side communication contact and the polarity of the lens-side communication contact is set to the second polarity, the camera-side processor and the lens-side processor set both of the polarity of the camera-side communication contact and the polarity of the lens-side communication contact to the second polarity.

8. The camera system according to claim 7,
wherein the camera-side communication contact and the lens-side communication contact are respectively one of a plurality of contacts to be used for serial communication between the camera and the interchangeable lens,
wherein the camera-side processor detects the polarity of the camera-side communication contact, determines whether or not the interchangeable lens supports the specific function based on the detected polarity, and then performs a communication setting of the plurality of contacts to be used for the serial communication with the interchangeable lens, and
wherein the lens-side processor detects the polarity of the lens-side communication contact, determines whether or not the camera supports the specific function based on the detected polarity, and then performs a communication setting of the plurality of contacts to be used for the serial communication with the camera.

9. The camera system according to claim 7,
wherein the lens-side processor performs the communication setting of the plurality of contacts to be used for the serial communication with the camera after a fixed period of time has passed since it is determined whether or not the camera supports the specific function.

10. The camera system according to claim 9,
the camera-side processor performs the communication setting after the communication setting performed by the lens-side processor.

11. The camera system according to claim 7, further comprising
an accessory to be attachably and detachably attached between the camera and the interchangeable lens,
wherein in a case where the accessory is attached, the specific function is a function of communicating with the attached accessory.

12. The camera system according to claim 11,
wherein the camera further comprises a camera-side extension communication contact,
wherein the interchangeable lens further comprises a lens-side extension communication contact to be connected to the camera-side extension communication contact in a case of being attached to the camera,
wherein the accessory comprises an accessory-side first extension communication contact to be connected to the camera-side extension communication contact in a case of being attached to the camera and an accessory-side second extension communication contact to be connected to the lens-side extension communication contact in a case where the interchangeable lens is attached,
wherein in a case where the interchangeable lens is directly attached to the camera, the camera communicates with the interchangeable lens through the camera-side extension communication contact and the lens-side extension communication contact, and
wherein in the case where the accessory is attached and both the camera and the interchangeable lens support the specific function, the camera communicates with the accessory through the camera-side extension communication contact and the accessory-side first extension communication contact and the interchangeable lens communicates with the accessory through the lens-side extension communication contact and the accessory-side second extension communication contact.

13. The camera system according to claim 12,
wherein in the case where the accessory is attached and both the camera and the interchangeable lens support the specific function, the camera communicates with the accessory through the camera-side extension communication contact and the accessory-side first extension communication contact to acquire information on the accessory from the accessory.

14. The camera system according to claim 13,
wherein in the case where the accessory is attached and both the camera and the interchangeable lens support the specific function, the interchangeable lens communicates with the accessory through the lens-side extension communication contact and the accessory-side second extension communication contact to transmit information on the interchangeable lens to the accessory, and the accessory communicates with the camera through the accessory-side first extension communication contact and the camera-side extension communication contact to add the information on the accessory to the information on the interchangeable lens received from the interchangeable lens and to transmit the added information to the camera.

15. The camera system according to claim 13,
wherein the camera acquires the information on the accessory and then communicates with the interchangeable lens through the camera-side extension communication contact, the accessory-side first extension communication contact, the accessory-side second extension communication contact, and the lens-side extension communication contact to acquire information on a state of the interchangeable lens from the interchangeable lens.

16. The camera system according to claim 12,
wherein the interchangeable lens further comprises a lens-side extension communication contact polarity setting resistor configured to set a polarity of the lens-side extension communication contact to the first polarity,
wherein the accessory further comprises an accessory-side first extension communication contact polarity setting resistor configured to set a polarity of the accessory-side first extension communication contact to the second polarity, and
wherein the camera-side processor detects a polarity of the camera-side extension communication contact to detect attachment of the accessory, and determines that the accessory is attached in a case where the polarity of the camera-side extension communication contact is the first polarity and determines that the accessory is not attached in a case where the polarity of the camera-side extension communication contact is the second polarity.

17. A method of setting an interchangeable lens which is configured to be attachably and detachably attached to a camera and includes a lens-side communication contact configured to be connected to a camera-side communication contact provided in the camera, the method comprising:

setting a polarity of the lens-side communication contact to a first polarity in a case where the interchangeable lens supports a specific function, and setting the polarity of the lens-side communication contact to a second polarity in a case where the interchangeable lens does not support the specific function; and in a case where the polarity of the lens-side communication contact is set to the first polarity, in a state where the camera-side communication contact and the lens-side communication contact are connected to each other, keeping setting of the polarity of the lens-side communication contact unchanged when it is detected that a polarity of the camera-side communication contact is set to the first polarity, and changing setting of the polarity of the lens-side communication contact to the second polarity when it is detected that the polarity of the camera-side communication contact is not set to the first polarity.

18. A method of setting a camera to which an interchangeable lens can be attachably and detachably attached and includes a camera-side communication contact configured to be connected to a lens-side communication contact provided in the interchangeable lens, the method comprising:

setting a polarity of the camera-side communication contact to a first polarity in a case where the camera supports a specific function, and setting the polarity of the camera-side communication contact to a second polarity in a case where the camera does not support the specific function; and in a case where the polarity of the camera-side communication contact is set to the first polarity, in a state where the camera-side communication contact and the lens-side communication contact are connected to each other, keeping setting of the polarity of the camera-side communication contact unchanged when it is detected that a polarity of the lens-side communication contact is set to the first polarity, and changing setting of the polarity of the camera-side communication contact to the second polarity when it is detected that the polarity of the lens-side communication contact is not set to the first polarity.

19. A compatibility determination method of a camera system comprising a camera and an interchangeable lens to be attachably and detachably attached to the camera, the compatibility determination method comprising:

detecting attachment of the interchangeable lens to the camera;

setting a polarity of the camera-side communication contact provided in the camera to a first polarity or a second polarity, in which the polarity of the camera-side communication contact is set to the first polarity in a case where the camera supports a specific function and the polarity of the camera-side communication contact is set to the second polarity in a case where the camera does not support the specific function;

setting a polarity of the lens-side communication contact provided in the interchangeable lens to the first polarity or the second polarity, in which the polarity of the lens-side communication contact is set to the first polarity in a case where the interchangeable lens supports the specific function and the polarity of the lens-side communication contact is set to the second polarity in a case where the interchangeable lens does not support the specific function;

determining whether the interchangeable lens attached to the camera supports the specific function based on the polarity of the camera-side communication contact, in which it is determined that the interchangeable lens supports the specific function in a case where the polarity of the camera-side communication contact is the first polarity; and determining whether the camera to which the interchangeable lens is attached supports the specific function based on the polarity of the lens-side communication contact, in which it is determined that the camera supports the specific function in a case where the polarity of the lens-side communication contact is the first polarity, wherein, in a state where the camera-side communication contact and the lens-side communication contact are connected to each other, in a case where the polarity of the camera-side communication contact and the polarity of the lens-side communication contact are set to the first polarity, the setting of the polarities is kept unchanged, and in a case where at least one of the polarity of the camera-side communication contact and the polarity of the lens-side communication contact is set to the second polarity, the setting of the polarities are set to the second polarity.

20. A non-transitory, computer-readable tangible recording medium having thereon computer instructions that, when executed by a computer, cause the computer to perform a method of setting an interchangeable lens which is configured to be attachably and detachably attached to a camera and includes a lens-side communication contact configured to be connected to a camera-side communication contact provided in the camera, the method including:

setting a polarity of the lens-side communication contact to a first polarity in a case where the interchangeable lens supports a specific function, and setting the polarity of the lens-side communication contact to a second polarity in a case where the interchangeable lens does not support the specific function; and in a case where the polarity of the lens-side communication contact is set to the first polarity, in a state where the camera-side communication contact and the lens-side communication contact are connected to each other, keeping setting of the polarity of the lens-side communication contact unchanged when it is detected that a polarity of the camera-side communication contact is set to the first polarity, and changing setting of the polarity of the lens-side communication contact to the second polarity when it is detected that the polarity of the camera-side communication contact is not set to the first polarity.

21. A non-transitory, computer-readable tangible recording medium having thereon computer instructions that, when executed by a computer, cause the computer to perform a method of setting a camera to which an interchangeable lens can be attachably and detachably attached and includes a camera-side communication contact configured to be connected to a lens-side communication contact provided in the interchangeable lens, the method comprising:

setting a polarity of the camera-side communication contact to a first polarity in a case where the camera supports a specific function, and setting the polarity of the camera-side communication contact to a second polarity in a case where the camera does not support the specific function; and in a case where the polarity of the camera-side communication contact is set to the first polarity, in a state where the camera-side communication contact and the lens-side communication contact are connected to each other, keeping setting of the polarity of the camera-side communication contact unchanged when it is detected that a polarity of the lens-side communication contact is set to the first polarity, and changing setting of the polarity of the camera-side communication contact to the second polarity when it is detected that the polarity of the lens-side communication contact is not set to the first polarity.

22. A non-transitory, computer-readable tangible recording medium having thereon computer instructions that, when executed by a computer, cause the computer to perform a compatibility determination method of a camera system comprising a camera and an interchangeable lens to be attachably and detachably attached to the camera, the compatibility determination method comprising:

detecting attachment of the interchangeable lens to the camera;

setting a polarity of the camera-side communication contact provided in the camera to a first polarity or a second polarity, in which the polarity of the camera-side communication contact is set to the first polarity in a case where the camera supports a specific function and the polarity of the camera-side communication contact is set to the second polarity in a case where the camera does not support the specific function;

setting a polarity of the lens-side communication contact provided in the interchangeable lens to the first polarity or the second polarity, in which the polarity of the lens-side communication contact is set to the first polarity in a case where the interchangeable lens supports the specific function and the polarity of the lens-side communication contact is set to the second polarity in a case where the interchangeable lens does not support the specific function;

determining whether the interchangeable lens attached to the camera supports the specific function based on the polarity of the camera-side communication contact, in which it is determined that the interchangeable lens supports the specific function in a case where the polarity of the camera-side communication contact is the first polarity; and determining whether the camera to which the interchangeable lens is attached supports the specific function based on the polarity of the lens-side communication contact, in which it is determined that the camera supports the specific function in a case where the polarity of the lens-side communication contact is the first polarity, wherein, in a state where the camera-side communication contact and the lens-side communication contact are connected to each other, in a case where the polarity of the camera-side communication contact and the polarity of the lens-side communication contact are set to the first polarity, the setting of the polarities is kept unchanged, and in a case where at least one of the polarity of the camera-side communication contact and the polarity of the lens-side communication contact is set to the second polarity, the setting of the polarities are set to the second polarity.

* * * * *